US008404014B2

(12) United States Patent
Israel et al.

(10) Patent No.: US 8,404,014 B2
(45) Date of Patent: Mar. 26, 2013

(54) AEROSOL SEPARATOR

(75) Inventors: Joseph Israel, St. Louis Park, MN (US); Eugene Dunn, Coon Rapids, MN (US); Keh B. Dema, Maple Grove, MN (US); Paul Kojetin, Rosemount, MN (US); Leanne Kojetin, legal representative, Rosemount, MN (US); Robert M. Rogers, Minnetonka, MN (US); Lorraine Keating-Klika, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 853 days.

(21) Appl. No.: 11/884,743

(22) PCT Filed: Feb. 21, 2006

(86) PCT No.: PCT/US2006/006106
§ 371 (c)(1),
(2), (4) Date: Jul. 14, 2010

(87) PCT Pub. No.: WO2006/091594
PCT Pub. Date: Aug. 31, 2006

(65) Prior Publication Data
US 2011/0154790 A1 Jun. 30, 2011

Related U.S. Application Data

(60) Provisional application No. 60/656,806, filed on Feb. 22, 2005.

(51) Int. Cl.
*B01D 46/00* (2006.01)
(52) U.S. Cl. ............. 55/385.3; 55/423; 55/498; 55/524; 55/527; 55/528; 55/DIG. 19

(58) Field of Classification Search .................... 55/330, 55/385.3, 485, 524, 527, 528, 350.1, 480, 55/505; 95/273, 285; 123/198 E; 210/767, 210/508, 484, 489, 496, 497.2
See application file for complete search history.

(56) References Cited

U.S. PATENT DOCUMENTS

| 431,108 | A | 7/1890 | Cowley |
| 657,860 | A | 9/1900 | Cummings |
| 2,764,602 | A | 9/1956 | Ahlbrecht |
| 2,764,603 | A | 9/1956 | Ahlbrecht |
| 2,801,706 | A | 8/1957 | Asker |
| 2,803,656 | A | 8/1957 | Ahlbrecht |

(Continued)

FOREIGN PATENT DOCUMENTS

| DE | 4344819 | 7/1994 |
| DE | 202005020566 | 5/2005 |

(Continued)

OTHER PUBLICATIONS

Donaldson Company Torit® brochure entitled "HEPA & 95% DOP Panel Filters", 4 pages (2004).

(Continued)

*Primary Examiner* — Duane Smith
*Assistant Examiner* — Minh-Chau Pham
(74) *Attorney, Agent, or Firm* — Pauly, Devries Smith & Deffner, L.L.C.

(57) ABSTRACT

An arrangement separating a hydrophobic liquid phase from gaseous stream, for crankcase ventilation arrangements as described. The arrangement includes a media stage including media formed from a vacuum forming process and including at least 50%, by weight, bi-component fiber therein. Useable media formulations and arrangements are described.

10 Claims, 24 Drawing Sheets

U.S. PATENT DOCUMENTS

| | | |
|---|---|---|
| 3,019,127 A | 1/1962 | Czerwonka et al. |
| 3,073,735 A | 1/1963 | Till et al. |
| 3,147,064 A | 9/1964 | Brown |
| 3,252,270 A | 5/1966 | Pall et al. |
| 3,255,131 A | 6/1966 | Ahlbrecht |
| 3,279,151 A | 10/1966 | Kauer, Jr. et al. |
| 3,303,621 A | 2/1967 | Hill |
| 3,448,038 A | 6/1969 | Pall et al. |
| 3,450,755 A | 6/1969 | Ahlbrecht |
| 3,505,794 A | 4/1970 | Nutter et al. |
| 3,589,956 A | 6/1971 | Kranz et al. |
| 3,595,731 A | 7/1971 | Davies et al. |
| 3,616,160 A | 10/1971 | Wincklhofer et al. |
| 3,616,183 A | 10/1971 | Brayford et al. |
| 3,620,819 A | 11/1971 | Croce |
| 3,639,195 A | 2/1972 | Sanders |
| 3,653,181 A | 4/1972 | Becker |
| 3,676,242 A | 7/1972 | Prentice |
| 3,705,480 A | 12/1972 | Wireman |
| 3,714,763 A | 2/1973 | Suzuki |
| 3,728,848 A | 4/1973 | Vest |
| 3,744,256 A | 7/1973 | Cobb et al. |
| 3,826,067 A | 7/1974 | Wilder et al. |
| 3,841,953 A | 10/1974 | Lohkamp et al. |
| 3,849,241 A | 11/1974 | Butin et al. |
| 3,878,014 A | 4/1975 | Melead |
| 3,891,417 A | 6/1975 | Wade |
| 3,900,648 A | 8/1975 | Smith |
| 3,917,448 A | 11/1975 | Wood |
| 3,934,238 A | 1/1976 | Pavlov |
| 3,937,860 A | 2/1976 | Gusman et al. |
| 3,971,373 A | 7/1976 | Braun |
| 3,972,694 A | 8/1976 | Head |
| 3,998,988 A | 12/1976 | Shimomai et al. |
| 4,042,522 A | 8/1977 | Falk |
| 4,045,350 A | 8/1977 | Kupf et al. |
| 4,047,914 A | 9/1977 | Hansen et al. |
| 4,069,158 A | 1/1978 | Bertocchio et al. |
| 4,069,244 A | 1/1978 | Mueller |
| 4,079,675 A | 3/1978 | Beumel |
| 4,088,726 A | 5/1978 | Cumbers |
| 4,090,967 A | 5/1978 | Falk |
| 4,100,324 A | 7/1978 | Anderson et al. |
| 4,102,785 A | 7/1978 | Head et al. |
| 4,111,815 A | 9/1978 | Walker et al. |
| 4,160,059 A | 7/1979 | Samejima |
| 4,161,422 A | 7/1979 | Lawson et al. |
| 4,161,590 A | 7/1979 | Mueller |
| 4,161,602 A | 7/1979 | Mueller |
| 4,169,754 A | 10/1979 | Perrotta |
| 4,177,141 A | 12/1979 | Nakamura et al. |
| 4,189,338 A | 2/1980 | Ejima et al. |
| 4,196,027 A | 4/1980 | Walker et al. |
| 4,210,540 A | 7/1980 | Perrotta |
| 4,211,819 A | 7/1980 | Kunimune et al. |
| 4,227,904 A | 10/1980 | Kasmark, Jr. |
| 4,231,768 A | 11/1980 | Seibert et al. |
| 4,234,655 A | 11/1980 | Kunimune et al. |
| 4,239,278 A | 12/1980 | Skilliter |
| 4,239,516 A | 12/1980 | Klein |
| 4,254,731 A | 3/1981 | Taylor |
| 4,267,016 A | 5/1981 | Okazaki et al. |
| 4,269,888 A | 5/1981 | Ejima et al. |
| 4,272,318 A | 6/1981 | Walker et al. |
| 4,274,914 A | 6/1981 | Keith et al. |
| 4,309,475 A | 1/1982 | Hoffman, Jr. |
| 4,318,774 A | 3/1982 | Powell et al. |
| 4,327,936 A | 5/1982 | Sekiguchi |
| 4,370,152 A | 1/1983 | Luper |
| 4,388,086 A | 6/1983 | Bauer |
| 4,423,995 A | 1/1984 | Karis |
| 4,429,001 A | 1/1984 | Kolpin et al. |
| 4,443,233 A | 4/1984 | Moran |
| 4,457,974 A | 7/1984 | Summers |
| 4,460,642 A | 7/1984 | Errede et al. |
| 4,487,617 A | 12/1984 | Dienes et al. |
| 4,500,384 A | 2/1985 | Tomioka et al. |
| 4,501,598 A | 2/1985 | Long |
| RE31,849 E | 3/1985 | Klein |
| 4,504,289 A | 3/1985 | Walker |
| 4,516,994 A | 5/1985 | Kocher |
| 4,536,440 A | 8/1985 | Berg |
| 4,545,789 A | 10/1985 | Lato |
| 4,548,624 A | 10/1985 | Walker |
| 4,551,378 A | 11/1985 | Carey, Jr. |
| 4,552,603 A | 11/1985 | Harris, Jr. et al. |
| 4,555,430 A | 11/1985 | Mays |
| 4,579,774 A | 4/1986 | Kuwazuru et al. |
| 4,597,218 A | 7/1986 | Friemel et al. |
| 4,604,205 A | 8/1986 | Ayers |
| 4,610,678 A | 9/1986 | Weisman et al. |
| 4,627,863 A | 12/1986 | Klein |
| 4,650,506 A | 3/1987 | Barris et al. |
| 4,657,804 A | 4/1987 | Mays et al. |
| 4,659,467 A | 4/1987 | Spearman |
| 4,661,132 A | 4/1987 | Thornton et al. |
| 4,676,807 A | 6/1987 | Miller |
| 4,677,929 A | 7/1987 | Harris |
| 4,681,801 A | 7/1987 | Elan et al. |
| 4,684,576 A | 8/1987 | Tabor et al. |
| 4,688,511 A | 8/1987 | Gerlach et al. |
| 4,689,057 A | 8/1987 | Gasper |
| 4,713,285 A | 12/1987 | Klein |
| 4,726,817 A | 2/1988 | Roger |
| 4,729,371 A | 3/1988 | Krueger et al. |
| 4,732,809 A | 3/1988 | Harris, Jr. et al. |
| 4,734,208 A | 3/1988 | Pall et al. |
| 4,753,730 A | 6/1988 | Maurer |
| 4,759,782 A | 7/1988 | Miller et al. |
| 4,764,189 A | 8/1988 | Yanagawa et al. |
| 4,765,812 A | 8/1988 | Homonoff et al. |
| 4,765,915 A | 8/1988 | Diehl |
| 4,807,619 A | 2/1989 | Dyrud et al. |
| 4,814,033 A | 3/1989 | Spearman et al. |
| 4,816,224 A | 3/1989 | Vogel et al. |
| 4,836,931 A * | 6/1989 | Spearman et al. ............ 210/484 |
| 4,838,903 A | 6/1989 | Thomaides et al. |
| 4,838,905 A | 6/1989 | Billiet et al. |
| 4,840,838 A | 6/1989 | Wyss |
| 4,868,032 A | 9/1989 | Elan et al. |
| 4,874,666 A | 10/1989 | Kubo et al. |
| 4,886,058 A | 12/1989 | Brostrom et al. |
| 4,889,764 A | 12/1989 | Chenoweth et al. |
| 4,904,385 A | 2/1990 | Wessling et al. |
| 4,910,064 A | 3/1990 | Sabee |
| 4,911,789 A | 3/1990 | Rieunier et al. |
| 4,917,714 A | 4/1990 | Kinsley, Jr. |
| 4,919,753 A | 4/1990 | Johnson et al. |
| 4,933,129 A | 6/1990 | Huykman |
| 4,983,434 A | 1/1991 | Sassa |
| 5,022,964 A | 6/1991 | Crane et al. |
| 5,027,781 A | 7/1991 | Lewis |
| 5,034,040 A | 7/1991 | Walcott |
| 5,042,468 A | 8/1991 | Lambert |
| 5,045,210 A | 9/1991 | Chen et al. |
| 5,057,368 A | 10/1991 | Largman et al. |
| 5,066,538 A | 11/1991 | Huykman |
| 5,068,141 A | 11/1991 | Kubo et al. |
| 5,080,791 A | 1/1992 | Sims |
| 5,082,476 A | 1/1992 | Kahlbaugh et al. |
| 5,087,278 A | 2/1992 | Suzuki |
| 5,089,119 A | 2/1992 | Day et al. |
| 5,092,911 A | 3/1992 | Williams |
| 5,104,537 A | 4/1992 | Stifelman et al. |
| 5,108,827 A | 4/1992 | Gessner |
| 5,110,330 A | 5/1992 | Loughron |
| 5,129,923 A | 7/1992 | Hunter et al. |
| 5,131,387 A | 7/1992 | French et al. |
| 5,135,792 A | 8/1992 | Hogan |
| 5,147,553 A | 9/1992 | Waite |
| 5,147,721 A | 9/1992 | Baron et al. |
| 5,167,764 A | 12/1992 | Nielsen et al. |
| 5,167,765 A | 12/1992 | Nielsen et al. |
| 5,190,569 A | 3/1993 | McGrath |
| 5,190,812 A | 3/1993 | Joseph et al. |
| 5,208,098 A | 5/1993 | Stover |
| 5,212,131 A | 5/1993 | Belding |

| | | | | | | |
|---|---|---|---|---|---|---|
| 5,238,474 A | 8/1993 | Kahlbaugh et al. | 5,800,587 A | 9/1998 | Kahlbaugh et al. | |
| 5,246,474 A | 9/1993 | Greatorex | 5,800,884 A | 9/1998 | D'Anna et al. | |
| 5,246,772 A | 9/1993 | Manning | 5,804,286 A | 9/1998 | Quantrille et al. | |
| 5,275,743 A | 1/1994 | Miller et al. | 5,820,646 A | 10/1998 | Gillingham et al. | |
| 5,283,106 A | 2/1994 | Seiler et al. | 5,837,018 A | 11/1998 | Goerg | |
| 5,284,704 A | 2/1994 | Kochesky et al. | 5,837,627 A | 11/1998 | Halabisky et al. | |
| 5,284,997 A | 2/1994 | Spearman et al. | 5,840,245 A | 11/1998 | Coombs et al. | |
| 5,302,443 A | 4/1994 | Manning et al. | 5,853,439 A | 12/1998 | Gieseke et al. | |
| 5,307,796 A | 5/1994 | Kronzer et al. | 5,883,439 A * | 3/1999 | Saitoh | 257/787 |
| 5,328,758 A | 7/1994 | Markell et al. | 5,885,390 A | 3/1999 | Alkire et al. | |
| 5,332,426 A | 7/1994 | Tang et al. | 5,885,696 A | 3/1999 | Groeger | |
| 5,334,446 A | 8/1994 | Quantrille et al. | 5,911,213 A | 6/1999 | Ahlborn et al. | |
| 5,336,286 A | 8/1994 | Alexander et al. | 5,932,104 A | 8/1999 | Kawamura | |
| 5,342,418 A | 8/1994 | Jesse | 5,935,879 A | 8/1999 | Helwig et al. | |
| 5,344,698 A | 9/1994 | Rock et al. | 5,935,883 A | 8/1999 | Pike | |
| 5,354,603 A | 10/1994 | Errede et al. | 5,948,344 A | 9/1999 | Cusick et al. | |
| 5,364,456 A | 11/1994 | Kahlbaugh et al. | 5,952,092 A | 9/1999 | Groeger et al. | |
| 5,366,631 A | 11/1994 | Adiletta | 5,952,252 A | 9/1999 | Shawver et al. | |
| 5,380,580 A | 1/1995 | Rogers et al. | 5,954,962 A | 9/1999 | Adiletta | |
| 5,405,682 A | 4/1995 | Shawyer et al. | 5,965,091 A | 10/1999 | Navarre et al. | |
| 5,415,676 A | 5/1995 | Tokar et al. | 5,965,468 A | 10/1999 | Marmon et al. | |
| 5,423,892 A | 6/1995 | Kahlbaugh et al. | 5,972,166 A | 10/1999 | Helwig et al. | |
| 5,436,980 A | 7/1995 | Weeks et al. | 5,972,477 A | 10/1999 | Kim et al. | |
| 5,454,945 A | 10/1995 | Spearman | 5,972,808 A | 10/1999 | Groeger et al. | |
| 5,458,960 A | 10/1995 | Nieminen et al. | 5,976,998 A | 11/1999 | Sandor et al. | |
| 5,468,572 A | 11/1995 | Zguris et al. | 5,981,410 A | 11/1999 | Hansen et al. | |
| 5,472,467 A | 12/1995 | Pfeffer | 5,989,432 A | 11/1999 | Gildersleeve et al. | |
| 5,478,466 A | 12/1995 | Heilmann et al. | 5,989,688 A | 11/1999 | Barge et al. | |
| 5,486,410 A | 1/1996 | Groeger et al. | 5,993,501 A | 11/1999 | Cusick et al. | |
| 5,508,079 A | 4/1996 | Grant et al. | 5,993,905 A | 11/1999 | Sheehan | |
| 5,508,093 A | 4/1996 | Mehdorn | 5,993,943 A | 11/1999 | Bodaghi et al. | |
| 5,509,340 A | 4/1996 | Kawamura | 6,007,608 A | 12/1999 | Johnson | |
| 5,545,453 A | 8/1996 | Grant | 6,007,898 A | 12/1999 | Kim et al. | |
| 5,545,475 A | 8/1996 | Korleski | 6,013,587 A | 1/2000 | Truong et al. | |
| 5,565,062 A | 10/1996 | Nass et al. | 6,024,782 A | 2/2000 | Freund et al. | |
| 5,575,832 A | 11/1996 | Boyd | 6,041,782 A | 3/2000 | Angadjivand et al. | |
| 5,580,459 A | 12/1996 | Powers et al. | 6,045,597 A | 4/2000 | Choi | |
| 5,581,647 A | 12/1996 | Onishi et al. | 6,071,419 A | 6/2000 | Beier et al. | |
| 5,584,784 A | 12/1996 | Wu | 6,071,641 A | 6/2000 | Zguris et al. | |
| 5,597,654 A | 1/1997 | Scholz et al. | 6,077,391 A | 6/2000 | Girondi | |
| 5,603,747 A | 2/1997 | Matuda et al. | 6,099,726 A | 8/2000 | Gembolis et al. | |
| 5,605,746 A | 2/1997 | Groeger et al. | 6,103,181 A | 8/2000 | Berger | |
| 5,607,490 A | 3/1997 | Taniguchi et al. | 6,103,643 A | 8/2000 | Forsten | |
| 5,607,735 A | 3/1997 | Brown | 6,110,249 A | 8/2000 | Medcalf et al. | |
| 5,614,283 A | 3/1997 | Potnis et al. | 6,114,262 A | 9/2000 | Groh et al. | |
| 5,616,408 A | 4/1997 | Oleszczuk et al. | 6,136,058 A | 10/2000 | Miller | |
| 5,620,641 A | 4/1997 | Berger | 6,139,595 A | 10/2000 | Herman et al. | |
| 5,620,785 A | 4/1997 | Watt et al. | 6,143,049 A * | 11/2000 | Gieseke et al. | 55/385.3 |
| 5,633,082 A | 5/1997 | Berger | 6,143,441 A | 11/2000 | Zguris | |
| 5,638,569 A | 6/1997 | Newell | 6,146,436 A | 11/2000 | Hollingsworth et al. | |
| 5,643,467 A | 7/1997 | Romanco | 6,152,120 A | 11/2000 | Julazadeh | |
| 5,643,653 A | 7/1997 | Griesbach et al. | 6,156,682 A | 12/2000 | Fletemier et al. | |
| 5,645,057 A | 7/1997 | Watt et al. | 6,156,842 A | 12/2000 | Hoenig et al. | |
| 5,645,689 A | 7/1997 | Ruf et al. | 6,165,572 A | 12/2000 | Kahlbaugh et al. | |
| 5,645,690 A | 7/1997 | Cox, Jr. | 6,169,045 B1 | 1/2001 | Pike et al. | |
| 5,652,048 A | 7/1997 | Haynes et al. | 6,171,355 B1 * | 1/2001 | Gieseke et al. | 55/330 |
| 5,662,728 A | 9/1997 | Groeger | 6,171,369 B1 | 1/2001 | Schultink et al. | |
| 5,665,235 A | 9/1997 | Gildersleeve et al. | 6,171,684 B1 | 1/2001 | Kahlbaugh et al. | |
| 5,667,562 A | 9/1997 | Midkiff | 6,174,603 B1 | 1/2001 | Berger | |
| 5,669,949 A | 9/1997 | Dudrey et al. | 6,183,536 B1 | 2/2001 | Schultink et al. | |
| 5,672,399 A | 9/1997 | Kahlbaugh et al. | 6,186,992 B1 | 2/2001 | Roe et al. | |
| 5,672,415 A | 9/1997 | Sawyer et al. | 6,187,073 B1 * | 2/2001 | Gieseke et al. | 55/485 |
| 5,677,058 A | 10/1997 | Neal et al. | 6,190,768 B1 | 2/2001 | Turley et al. | |
| 5,679,042 A | 10/1997 | Varona | 6,197,709 B1 | 3/2001 | Tsai et al. | |
| 5,681,469 A | 10/1997 | Barboza et al. | 6,200,669 B1 | 3/2001 | Marmon et al. | |
| 5,705,119 A | 1/1998 | Takeuchi et al. | 6,203,713 B1 | 3/2001 | Tanny | |
| 5,709,735 A | 1/1998 | Midkiff et al. | 6,241,886 B1 | 6/2001 | Kitagawa et al. | |
| 5,711,878 A | 1/1998 | Ogata et al. | 6,251,224 B1 | 6/2001 | Dong | |
| 5,721,180 A | 2/1998 | Pike et al. | 6,264,044 B1 | 7/2001 | Meyering et al. | |
| 5,728,187 A | 3/1998 | Kern et al. | 6,267,252 B1 | 7/2001 | Amsler | |
| 5,728,298 A | 3/1998 | Hamlin | 6,267,843 B1 | 7/2001 | Helwig et al. | |
| 5,753,002 A | 5/1998 | Glucksman | 6,290,739 B1 * | 9/2001 | Gieseke et al. | 55/330 |
| 5,755,963 A | 5/1998 | Sugiura et al. | 6,300,261 B1 | 10/2001 | Young et al. | |
| 5,779,847 A | 7/1998 | Groeger | 6,301,887 B1 | 10/2001 | Gorel et al. | |
| 5,783,505 A | 7/1998 | Duckett | 6,306,539 B1 | 10/2001 | Zguris | |
| 5,785,725 A | 7/1998 | Cusick et al. | 6,316,107 B1 | 11/2001 | Lubnin et al. | |
| 5,792,711 A | 8/1998 | Roberts | 6,330,883 B1 | 12/2001 | Berger | |
| 5,795,835 A | 8/1998 | Bruner et al. | 6,351,078 B1 | 2/2002 | Wang et al. | |
| 5,800,586 A | 9/1998 | Cusick et al. | 6,352,947 B1 | 3/2002 | Haley et al. | |

| | | | | | |
|---|---|---|---|---|---|
| 6,355,076 B2 * | 3/2002 | Gieseke et al. ............ 55/330 | 6,874,641 B2 | 4/2005 | Clary |
| 6,355,079 B1 | 3/2002 | Sorvari et al. | 6,875,249 B2 | 4/2005 | Gogins |
| 6,364,976 B2 | 4/2002 | Fletemier et al. | 6,878,191 B2 | 4/2005 | Escaffre et al. |
| 6,365,001 B1 | 4/2002 | Helwig et al. | 6,883,321 B2 | 4/2005 | Fornof |
| 6,371,977 B1 | 4/2002 | Bumbarger et al. | 6,916,752 B2 | 7/2005 | Berrigan et al. |
| 6,372,004 B1 | 4/2002 | Schultink et al. | 6,918,939 B2 | 7/2005 | Dworatzek et al. |
| 6,384,369 B1 | 5/2002 | Stenersen et al. | 6,923,182 B2 | 8/2005 | Angadjivand et al. |
| 6,395,153 B1 | 5/2002 | Matousek et al. | 6,924,028 B2 | 8/2005 | Chung et al. |
| 6,406,789 B1 | 6/2002 | McDaniel et al. | 6,926,961 B2 | 8/2005 | Roth |
| 6,409,785 B1 | 6/2002 | Smithies et al. | 6,936,554 B1 | 8/2005 | Singer |
| 6,409,787 B1 | 6/2002 | Smithies et al. | 6,939,386 B2 | 9/2005 | Sato et al. |
| 6,419,721 B1 | 7/2002 | Hunter | 6,939,492 B2 | 9/2005 | Jackson et al. |
| 6,419,839 B1 | 7/2002 | Cox et al. | 6,942,711 B2 | 9/2005 | Faulkner et al. |
| 6,420,626 B1 | 7/2002 | Erspamer et al. | 6,955,708 B1 | 10/2005 | Julos et al. |
| 6,428,610 B1 | 8/2002 | Tsai et al. | 6,955,775 B2 | 10/2005 | Chung et al. |
| 6,440,192 B2 | 8/2002 | Guerin et al. | 6,962,615 B2 | 11/2005 | Staudenmayer et al. |
| 6,458,456 B1 | 10/2002 | Zainiev et al. | 6,966,940 B2 | 11/2005 | Krisko et al. |
| 6,478,953 B2 | 11/2002 | Spearman et al. | 6,991,113 B2 | 1/2006 | Nakajima |
| 6,479,147 B2 | 11/2002 | Lubnin et al. | 6,997,208 B2 | 2/2006 | Mack |
| 6,488,811 B1 | 12/2002 | Dong | 7,008,144 B2 | 3/2006 | McGinn |
| 6,492,183 B1 | 12/2002 | Perman et al. | 7,008,465 B2 | 3/2006 | Graham et al. |
| 6,495,286 B2 | 12/2002 | Zguris et al. | 7,011,011 B2 | 3/2006 | Jessberger et al. |
| 6,495,656 B1 | 12/2002 | Haile et al. | 7,017,563 B2 | 3/2006 | Dworatzed et al. |
| 6,497,950 B1 | 12/2002 | Haile et al. | 7,029,516 B2 | 4/2006 | Campbell et al. |
| 6,503,447 B1 | 1/2003 | Mondjian et al. | 7,033,410 B2 | 4/2006 | Hilpert et al. |
| 6,511,774 B1 | 1/2003 | Tsukuda et al. | 7,033,493 B2 | 4/2006 | McGarvey et al. |
| 6,514,306 B1 | 2/2003 | Rohrbach et al. | 7,037,569 B2 | 5/2006 | Curro et al. |
| 6,517,612 B1 | 2/2003 | Crouch et al. | 7,049,254 B2 | 5/2006 | Bansal et al. |
| 6,517,725 B2 | 2/2003 | Spearman et al. | 7,070,640 B2 | 7/2006 | Chung et al. |
| 6,521,012 B2 | 2/2003 | Lamon et al. | 7,081,145 B2 | 7/2006 | Gieseke et al. |
| 6,521,321 B2 | 2/2003 | Kahlbaugh et al. | 7,090,715 B2 | 8/2006 | Chung et al. |
| 6,528,439 B1 | 3/2003 | Stokes et al. | 7,094,270 B2 | 8/2006 | Shultink et al. |
| 6,530,366 B2 | 3/2003 | Geiger et al. | 7,115,150 B2 | 10/2006 | Johnson et al. |
| 6,530,969 B2 * | 3/2003 | Gieseke et al. ............ 55/330 | 7,125,470 B2 | 10/2006 | Graef et al. |
| 6,540,801 B2 * | 4/2003 | Gieseke et al. ............ 55/330 | 7,163,349 B2 | 1/2007 | Pollicicchio et al. |
| 6,541,114 B2 | 4/2003 | Katou et al. | 7,182,537 B2 | 2/2007 | Pollicicchio et al. |
| 6,551,608 B2 | 4/2003 | Yao | 7,182,804 B2 | 2/2007 | Gieseke et al. |
| 6,555,489 B1 | 4/2003 | Pfeffer | 7,267,789 B2 | 9/2007 | Chhabra et al. |
| 6,576,034 B2 | 6/2003 | Berger | 7,288,338 B2 | 10/2007 | Zguris |
| 6,579,342 B2 | 6/2003 | Wang et al. | 7,309,372 B2 | 12/2007 | Kahlbaugh et al. |
| 6,585,808 B2 | 7/2003 | Burban et al. | 7,314,497 B2 | 1/2008 | Kahlbaugh et al. |
| 6,607,997 B1 | 8/2003 | Cox et al. | 7,520,994 B2 | 4/2009 | Dong et al. |
| 6,613,704 B1 | 9/2003 | Arnold et al. | 7,896,941 B2 | 3/2011 | Choi |
| 6,616,723 B2 | 9/2003 | Berger | 7,918,913 B2 | 4/2011 | Kalayci et al. |
| 6,624,099 B1 | 9/2003 | Shah | 7,985,344 B2 | 7/2011 | Dema et al. |
| H2086 H | 10/2003 | Amsler | 8,021,455 B2 | 9/2011 | Adamek et al. |
| 6,645,388 B2 | 11/2003 | Sheikh-Ali | 8,021,547 B2 | 9/2011 | Hukki |
| 6,646,179 B1 | 11/2003 | Melius et al. | 8,057,567 B2 | 11/2011 | Webb et al. |
| 6,649,547 B1 | 11/2003 | Arnold et al. | 2001/0000375 A1 | 4/2001 | Kobayashi et al. |
| 6,652,614 B2 | 11/2003 | Gieseke et al. | 2001/0033932 A1 | 10/2001 | Katou et al. |
| 6,653,381 B2 | 11/2003 | Thames | 2002/0007167 A1 | 1/2002 | Dan et al. |
| 6,673,864 B2 | 1/2004 | Patel et al. | 2002/0013111 A1 | 1/2002 | Dugan et al. |
| 6,682,576 B1 | 1/2004 | Kiyotani et al. | 2002/0016120 A1 | 2/2002 | Nagano et al. |
| 6,682,809 B2 | 1/2004 | Van Rheenen | 2002/0083690 A1 | 7/2002 | Emig et al. |
| 6,695,148 B2 | 2/2004 | Homonoff et al. | 2002/0116910 A1 | 8/2002 | Berger |
| 6,705,270 B1 | 3/2004 | Rau et al. | 2002/0121194 A1 | 9/2002 | Buchwald et al. |
| 6,706,086 B2 | 3/2004 | Emig et al. | 2002/0127939 A1 | 9/2002 | Hwo et al. |
| 6,723,142 B2 | 4/2004 | Emerson et al. | 2002/0148876 A1 | 10/2002 | Prittie |
| 6,723,149 B2 | 4/2004 | Ernst et al. | 2002/0193030 A1 | 12/2002 | Yao et al. |
| 6,723,669 B1 | 4/2004 | Clark et al. | 2003/0019193 A1 | 1/2003 | Chinn et al. |
| 6,740,142 B2 | 5/2004 | Buettner et al. | 2003/0022575 A1 | 1/2003 | Yoneda et al. |
| 6,743,273 B2 | 6/2004 | Chung et al. | 2003/0051455 A1 | 3/2003 | Gieseke et al. |
| 6,758,873 B2 | 7/2004 | Gieseke et al. | 2003/0082979 A1 | 5/2003 | Bean et al. |
| 6,770,356 B2 | 8/2004 | O'Donnell et al. | 2003/0084788 A1 | 5/2003 | Fraser, Jr. |
| 6,792,925 B2 | 9/2004 | Dworatzek et al. | 2003/0087568 A1 | 5/2003 | Kinn et al. |
| 6,797,377 B1 | 9/2004 | DeLucia et al. | 2003/0089092 A1 | 5/2003 | Bause et al. |
| 6,815,383 B1 | 11/2004 | Arnold | 2003/0096549 A1 | 5/2003 | Ortega et al. |
| 6,818,037 B2 | 11/2004 | Tamaka et al. | 2003/0099576 A1 | 5/2003 | Li et al. |
| 6,821,321 B2 | 11/2004 | Chinn et al. | 2003/0106294 A1 | 6/2003 | Chung et al. |
| 6,821,672 B2 | 11/2004 | Zguris | 2003/0109190 A1 | 6/2003 | Geel |
| 6,835,311 B2 | 12/2004 | Koslow | 2003/0139110 A1 | 7/2003 | Nagaoka et al. |
| 6,848,866 B1 | 2/2005 | McGinn | 2003/0145569 A1 | 8/2003 | Sato et al. |
| 6,849,330 B1 | 2/2005 | Morin et al. | 2003/0148691 A1 | 8/2003 | Pelham, Sr. et al. |
| 6,852,148 B2 | 2/2005 | Gieseke et al. | 2003/0150820 A1 | 8/2003 | Dussaud et al. |
| 6,858,057 B2 | 2/2005 | Healey | 2003/0211069 A1 | 11/2003 | Deckner et al. |
| 6,860,917 B2 | 3/2005 | Henrichsen et al. | 2003/0211799 A1 | 11/2003 | Yao et al. |
| 6,866,692 B2 | 3/2005 | Emerson et al. | 2004/0031253 A1 | 2/2004 | Staudenmayer et al. |
| 6,872,431 B2 | 3/2005 | Kahlbaugh et al. | 2004/0038014 A1 | 2/2004 | Schaefer et al. |
| 6,872,674 B2 | 3/2005 | Williams et al. | 2004/0083692 A1 | 5/2004 | Dworatzek et al. |

| | | |
|---|---|---|
| 2004/0112429 A1 | 6/2004 | Mack |
| 2004/0116026 A1 | 6/2004 | Kubose et al. |
| 2004/0134355 A1 | 7/2004 | Kasmark, Jr. |
| 2004/0144071 A1 | 7/2004 | Hilpert et al. |
| 2004/0192141 A1 | 9/2004 | Yang et al. |
| 2004/0206232 A1 | 10/2004 | Jessberger et al. |
| 2004/0211400 A1 | 10/2004 | Basset |
| 2004/0217042 A1 | 11/2004 | Dworatzek et al. |
| 2004/0221436 A1 | 11/2004 | Ortega et al. |
| 2004/0242108 A1 | 12/2004 | Russell et al. |
| 2005/0000876 A1 | 1/2005 | Knight |
| 2005/0026526 A1 | 2/2005 | Verdegan et al. |
| 2005/0109683 A1 | 5/2005 | Joyce et al. |
| 2005/0160711 A1 | 7/2005 | Yang |
| 2005/0210844 A1 | 9/2005 | Kahlbaugh et al. |
| 2005/0211232 A1 | 9/2005 | Dushek et al. |
| 2005/0214188 A1 | 9/2005 | Rohrbach et al. |
| 2005/0215965 A1 | 9/2005 | Schmidt et al. |
| 2005/0233665 A1 | 10/2005 | Groten et al. |
| 2005/0266760 A1 | 12/2005 | Chhabra et al. |
| 2006/0004336 A1 | 1/2006 | Zhang et al. |
| 2006/0009106 A1 | 1/2006 | Nishimura et al. |
| 2006/0094320 A1 | 5/2006 | Chen et al. |
| 2006/0096263 A1* | 5/2006 | Kahlbaugh et al. ............. 55/527 |
| 2006/0096932 A1 | 5/2006 | Dema et al. |
| 2006/0101796 A1 | 5/2006 | Kern et al. |
| 2006/0121811 A1 | 6/2006 | Mangold et al. |
| 2006/0137317 A1 | 6/2006 | Bryner et al. |
| 2006/0207932 A1 | 9/2006 | Hajek et al. |
| 2006/0230731 A1 | 10/2006 | Kalayci et al. |
| 2006/0242933 A1 | 11/2006 | Webb et al. |
| 2006/0246798 A1 | 11/2006 | Reneker et al. |
| 2006/0266701 A1 | 11/2006 | Dickerson et al. |
| 2007/0021569 A1 | 1/2007 | Willis et al. |
| 2007/0062855 A1 | 3/2007 | Chase et al. |
| 2007/0210008 A1 | 9/2007 | Sprenger et al. |
| 2008/0035103 A1 | 2/2008 | Barris et al. |
| 2008/0245037 A1 | 10/2008 | Rogers et al. |
| 2009/0050578 A1* | 2/2009 | Israel et al. ................... 210/767 |
| 2009/0266759 A1 | 10/2009 | Green |
| 2010/0187171 A1 | 7/2010 | Gupta |
| 2010/0187712 A1 | 7/2010 | Gupta et al. |
| 2011/0215046 A1 | 9/2011 | Rogers et al. |
| 2011/0309012 A1 | 12/2011 | Rogers |

FOREIGN PATENT DOCUMENTS

| | | |
|---|---|---|
| EP | 1 141 454 A1 | 10/2001 |
| EP | 1141454 A1 | 10/2001 |
| EP | 1211342 A1 | 6/2002 |
| EP | 1 179 673 A3 | 12/2002 |
| EP | 1 382 809 A1 | 1/2004 |
| EP | 1 382 810 A1 | 1/2004 |
| EP | 1378283 B1 | 4/2007 |
| GB | 1532076 | 11/1978 |
| JP | 3270703 | 12/1991 |
| JP | 06233909 | 8/1994 |
| JP | 7-265640 | 10/1995 |
| JP | 8206421 | 8/1996 |
| JP | 10-165731 | 6/1998 |
| JP | 2002085918 | 3/2002 |
| JP | 2003-325411 | 11/2003 |
| JP | 2004-002176 | 1/2004 |
| JP | 2004-160361 | 6/2004 |
| JP | 2004160328 | 6/2004 |
| JP | 2004255230 | 8/2004 |
| JP | 2004305853 | 11/2004 |
| JP | 2004305853 A | 11/2004 |
| JP | 2006512530 | 4/2006 |
| WO | WO 93/10881 | 6/1993 |
| WO | WO-9310881 | 6/1993 |
| WO | WO 94/05396 | 3/1994 |
| WO | WO-9405396 | 3/1994 |
| WO | WO-9741167 | 11/1997 |
| WO | WO-9748846 | 12/1997 |
| WO | WO-9947211 | 9/1999 |
| WO | WO-0032295 | 6/2000 |
| WO | WO-0032854 | 6/2000 |
| WO | WO-0059969 | 10/2000 |
| WO | WO 01/03802 A1 | 1/2001 |
| WO | WO-0110929 | 2/2001 |
| WO | WO 01/41898 A1 | 6/2001 |
| WO | WO-0147618 | 7/2001 |
| WO | WO-0185824 | 11/2001 |
| WO | WO-0185824 A2 | 11/2001 |
| WO | WO 03/013732 A1 | 2/2003 |
| WO | WO 03/080905 A1 | 10/2003 |
| WO | WO-03080904 | 10/2003 |
| WO | WO-2004089509 | 10/2004 |
| WO | WO 2005/005696 A1 | 1/2005 |
| WO | WO 2005/005704 A2 | 1/2005 |
| WO | WO-2005075054 | 8/2005 |
| WO | WO 2005/082488 A2 | 9/2005 |
| WO | WO/2005/083240 A1 | 9/2005 |
| WO | WO-2005082488 | 9/2005 |
| WO | WO-2005083240 | 9/2005 |
| WO | WO-2005120678 | 12/2005 |
| WO | WO-2006052656 | 5/2006 |
| WO | WO-2006052732 | 5/2006 |
| WO | WO 2006/084282 A2 | 8/2006 |
| WO | WO-2009088647 | 7/2009 |

OTHER PUBLICATIONS

Donaldson Company brochure entitled "Cost Effective Emissions Solutions for Diesel Engines", 4 pages (2004).
File History of U.S. Appl. No. 10/589,512.
File History of U.S. Appl. No. 10/982,538.
File History of U.S. Appl. No. 11/267,958.
File History of U.S. Appl. No. 11/883,690.
Donaldson Company Torit® brochure entitled "HEPA & 95% DOP Panel Filters", 4 pages (2004).
Velcon Filters, Inc. Service Bulletin, May 2007 "Migration of Superabsorbent Polymer (SAP) Media Downstream of Filtration" http://www.velcon.com/doc/Vo16-Np1-05.21.07.pdf.
Frautmann, P. et al., "High Performance Nanofibre Coated Filter Media for Engine Intake Air Filtration," Filtration, vol. 6, No. 1, pp. 53-56 (2006).
Hansen, L. et al., "Water Absorption and Mechanical Properties of Electrospun Structured Hydrogels," Journal of Applied Polymer Science, vol. 95, pp. 427-434 (2005).
Ko, F. et al., "Electrospinning of Continuous Carbon Nanotube-Filled Nanofiber Yarns," Adv. Mater. vol. 15, No. 14, pp. 1161-1165 (Jul. 17, 2003).
Dahiya, A. et al., "Dry-Laid Nonwovens," http://www.engr.utk.edu/mse/pages/Textiles/Dry%20Laid%20Nonwovens.htm, 10 pages (Apr. 2004).
Hinds, W., Aerosol Technology Properties, Behavior, and Measurement of Airborne Particles, Second Edition, 3 pages (Copyright 1999).
Exhibit A, Pending claims for U.S. Appl. No. 11/883,690.
Exhibit B, Pending claims for U.S. Appl. No. 10/589,512.
Lennox-Kerr, "Advances in Textiles Techology", International Newsletters Ltd., UK Sep. 2003, vol. 153, 3 pages.
"Three-Dimensional Structure Incorporates Heterofil Fibre and Carbon Beads", Nonwovens Report, International Oct. 1995, No. 295, pp. 8-9.
"Filter Bag", Nonwoven Industry Mar. 1992, vol. 23, No. 3, pp. 5 and 68.
Hagewood, J., "Bicomponent Filtration: Variable Capacity Continuous Extended Area Filter", International Fiber Journal Feb. 1998, vol. 14, No. 1, pp. 58-67.
Zhao, R., "An Investigation of Bicomponent Polypropylene/Poly-(ethylene Terephthalate) Melt Blown Microfiber Nonwovens, A Dissertation", Front Cover Dec. 2001, pp. i-xix, pp. 1-207, 3 information pages.
"2.2 The Fourdrinier", http://www.paper.org.uk/papertech/data/unit_03/2_mechanical_methods/2-2_fourdrinier.... Sep. 24, 2007, 7 pages.
Puurtinen, "Multilayering of Fine Paper With 30 Layer Headbox and Roll and Blade Gap Former", Helsinki University of Technology, Laboratory of Paper Technology Reports, Series A19 May 14, 2004, pp. 1-54.
"Filtration—Daiwabo and Kyowa Jointly Produce Microfiber Filter", Nonwovens Markets Feb. 14, 1992, vol. 7, No. 4, p. 5.

Extended Euroepan Search Report, dated Mar. 3, 2011, in co-pending European Patent Application 10010696.2 (5 pages).

Extended European Search Report, dated Mar. 3, 2011, in co-pending European Patent Application 10010698.8 (4 pages).

"European Office Action Received", from the Euroepan Patent Office in EP Patent Application No. 06720573.2-1213, corresponding to U.S. Appl. No. 11/883,690, mailed May 13, 2011, (pp. 5), 5 pgs.

"Extended European Search Report", from EP Application No. 07119967.3, corresponding to U.S. Appl. No. 11/381,010, mailed May 6, 2008, pp. 1-6.

"Extended European Search Report", from EP Application No. 10010698.8, corresponding to U.S. Appl. No. 11/381,010, mailed Feb. 16, 2011, pp. 1-4.

"Extended European Search Report", from EP Application No. 10010697.0, corresponding to U.S. Patent Application No., mailed Mar. 9, 2011, pp. 1 4, 4 Pgs.

"Final Office Action Received", from JP Application No. 2007-540069, corresponding to U.S. Appl. No. 11/267,958, mailed Jul. 22, 2011, (pp. 18) Including English translation, 18.

"First Office Action Received", First Office Action for Chinese Application No. 201010255252.0, corresponding to U.S. Appl. No. 11/381,010, mailed May 25, 2011, (pp. 22) Including English translation, 22 pgs.

"Non Final Office Action", mailed Jul. 19, 2011 in co pending U.S. Appl. No. 11/883,690, "Aerosol Separator; and Method" (14 pages), 14 Pgs.

"Non Final Office Action", mailed Oct. 28, 2011 in co-pending U.S. Appl. No. 13/110,148, "Filter Medium and Structure" (30 pages), 30.

"Non Final Office Action", mailed Apr. 28, 2011 in co pending U.S. Appl. No. 11/381,010, "Filter Medium and Breather Filter Structure" (30 pages).

"Non-Final Office Action Received", mailed Dec. 22, 2011 in co-pending U.S. Appl. No. 13/222,063, "Filter Medium and Structure" (24 pages), 24.

"Notice of Allowance Received", mailed Jan. 17, 2012 in co-pending U.S. Appl. No. 11/883,690, "Aerosol Separator; and Method" (26 pages), 26.

"Notice of Allowance Received", mailed Aug. 31, 2011 in co-pending U.S. Appl. No. 11/381,010, "Filter Medium and Breather Filter Structure" (6 pages), 6.

"PCT International Search Report and Written Opinion", from International Application No. PCT/US2005/039793, corresponding to U.S. Appl. No. 10/982,538, mailed Mar. 23, 2006, pp. 1-11.

"PCT International Search Report and Written Opinion", from International Application No. PCT/US2008/054574, corresponding to U.S. Appl. No. 11/381,010, mailed Nov. 21, 2007, pp. 1-14.

"PCT International Search Report and Written Opinion", from International Application No. PCT/US2008/054574, corresponding to U.S. Appl. No. 12/036,022, mailed Aug. 29, 2008, pp. 1-11.

"Donaldson Company's New Formix Media Technology Lowers Compressor Operating Costs and Improves System performance." *Internet Citation*. May 2002.

Notice of Allowance, mailed May 7, 2012 in co-pending U.S. Appl. No. 13/110,148, "Filter Medium and Structure" (10 pages).

Notice of Allowance, mailed Jun. 25, 2012 in co-pending U.S. Appl. No. 13/222,063, "Filter Medium and Structure" (10 pages).

Non-Final Office Action, mailed Jun. 29, 2012 in co-pending U.S. Appl. No. 13/461,228, "Aerosol Separator and Method" (18 pages).

* cited by examiner

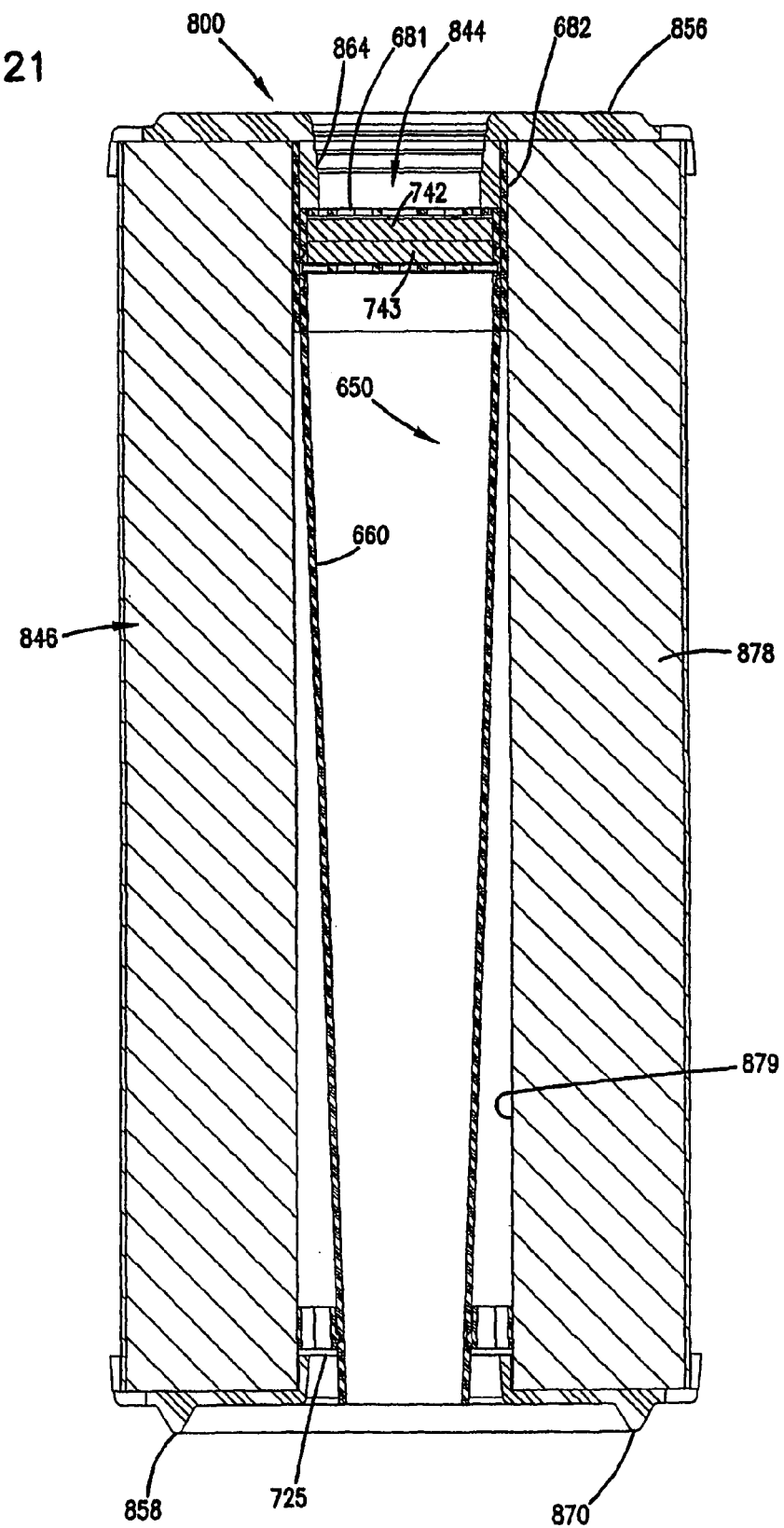

AEROSOL SEPARATOR

This application is being filed on 21 Aug. 2007 as a National Stage of PCT International Application No. PCT/US2006/006106 in the name of Donaldson Company, Inc., a U.S. national corporation, applicant for the designation of all countries except the US, and Joe Israel, Eugene Dunn, Keh B. Dema, Paul L. Kojetin, Robert M. Rogers, and Lorraine Keating, all US citizens, applicants for the designation of the US only, and claims priority to U.S. Provisional Application Ser. No. 60/656,806, filed 22 Feb. 2005.

This application incorporates the following U.S. patents herein by reference: U.S. Pat. Nos. 5,853,439; 6,171,355; 6,355,076; 6,143,049; 6,187,073; 6,290,739; 6,540,801; 6,530,969. This application incorporates by reference PCT Publication WO 01/47618 published on Jul. 5, 2001, and PCT Publication WO 00/32295 published on Jun. 8, 2000. This application incorporates by reference commonly assigned U.S. patent application Ser. No. 10/168,906 filed Jun. 20, 2002. This application incorporates by reference commonly assigned U.S. patent application Ser. No. 10/168,906 filed Jun. 20, 2002. This application also incorporates, with edits, portions of U.S. Provisional Application 60/547,759, filed Feb. 23, 2004 and U.S. Provisional Application filed Jan. 11, 2005 entitled Aerosol Separator; and, Methods, filed under Express Mail No.: EV 495871536 US. U.S. Provisional Application 60/547,759 and U.S. Provisional Application filed Jan. 11, 2005 entitled Aerosol Separator; and, Methods, filed under Express Mail No.: EV 495871536 US are incorporated herein by reference.

TECHNICAL FIELD

This disclosure relates to systems and methods for separating hydrophobic fluids (such as oils) which are entrained as aerosols, from gas streams (for example, air streams). Preferred arrangements also provide for filtration of other fine contaminants, for example carbon material, from the gas streams. Methods for conducting the separations are also provided.

BACKGROUND

Certain gas streams, such as blow-by gases from the crankcase of diesel engines, carry substantial amounts of entrained oils therein, as aerosol. The majority of the oil droplets within the aerosol are generally within the size of 0.1-5.0 microns.

In addition, such gas streams also carry substantial amounts of fine contaminant, such as carbon contaminants. Such contaminants generally have an average particle size of about 0.5-3.0 microns.

In some systems, it is desirable to vent such gases to the atmosphere. In general, it is preferred that before the gases are vented to the atmosphere, they be cleaned of a substantial portion of the aerosol and/or organic particulate contaminants therein.

In other instances, it is desirable to direct the air or gas stream into equipment. When such is the case, it may be desirable to separate aerosol and/or particulates from the stream during the circulation, in order to provide such benefits as: reduced negative effects on the downstream equipment; improved efficiency; recapture of otherwise lost oils; and/or to address environmental concerns.

A variety of efforts have been directed to the above types of concerns. The variables toward which improvements are desired generally concern the following: (a) size/efficiency concerns; that is, a desire for good efficiency of separation while at the same time avoidance of a requirement for a large separator system; (b) cost/efficiency; that is, a desire for good or high efficiency without the requirement of substantially expensive systems; (c) versatility; that is, development of systems that can be adapted for a wide variety of applications and uses, without significant re-engineering; and, (d) cleanability/regeneratability; that is, development of systems which can be readily cleaned (or regenerated) if such becomes desired, after prolonged use.

SUMMARY OF THE DISCLOSURE

According to the present disclosure, filter constructions for preferred use to filter blow-by gases from engine crankcases are provided. Example constructions are provided. Certain useable media compositions are described. Also provided are filter element arrangements and methods of assembly and use.

BRIEF DESCRIPTION OF THE DRAWINGS

FIG. 21 is a schematic cross-sectional view of another embodiment of a filter element constructed according to principles of this disclosure, and utilizing the pre-formed insert of FIGS. 16-20;

DETAILED DESCRIPTION

I. A Typical Application—Engine Crankcase Breather Filter

Pressure-charged diesel engines often generate "blow-by" gases, i.e., a flow of air-fuel mixture leaking past pistons from the combustion chambers. Such "blow-by gases" generally comprise a gas phase, for example air or combustion off gases, carrying therein: (a) hydrophobic fluid (e.g., oil including fuel aerosol) principally comprising 0.1-5.0 micron droplets (principally, by number); and, (b) carbon contaminant from combustion, typically comprising carbon particles, a majority of which are about 0.1-10 microns in size. Such "blow-by gases" are generally directed outwardly from the engine block, through a blow-by vent.

Herein when the term "hydrophobic" fluids is used in reference to the entrained liquid aerosol in gas flow, reference is meant to nonaqueous fluids, especially oils. Generally such materials are immiscible in water. Herein the term "gas" or variants thereof, used in connection with the carrier fluid, refers to air, combustion off gases, and other carrier gases for the aerosol.

The gases may carry substantial amounts of other components. Such components may include, for example, copper, lead, silicone, aluminum, iron, chromium, sodium, molybdenum, tin, and other heavy metals.

Engines operating in such systems as trucks, farm machinery, boats, buses, and other systems generally comprising diesel engines, may have significant gas flows contaminated as described above. For example, flow rates and volumes on the order of 2-50 cubic feet per minute (dm), typically 5 to 10 cfm, are fairly common.

Figure 1:
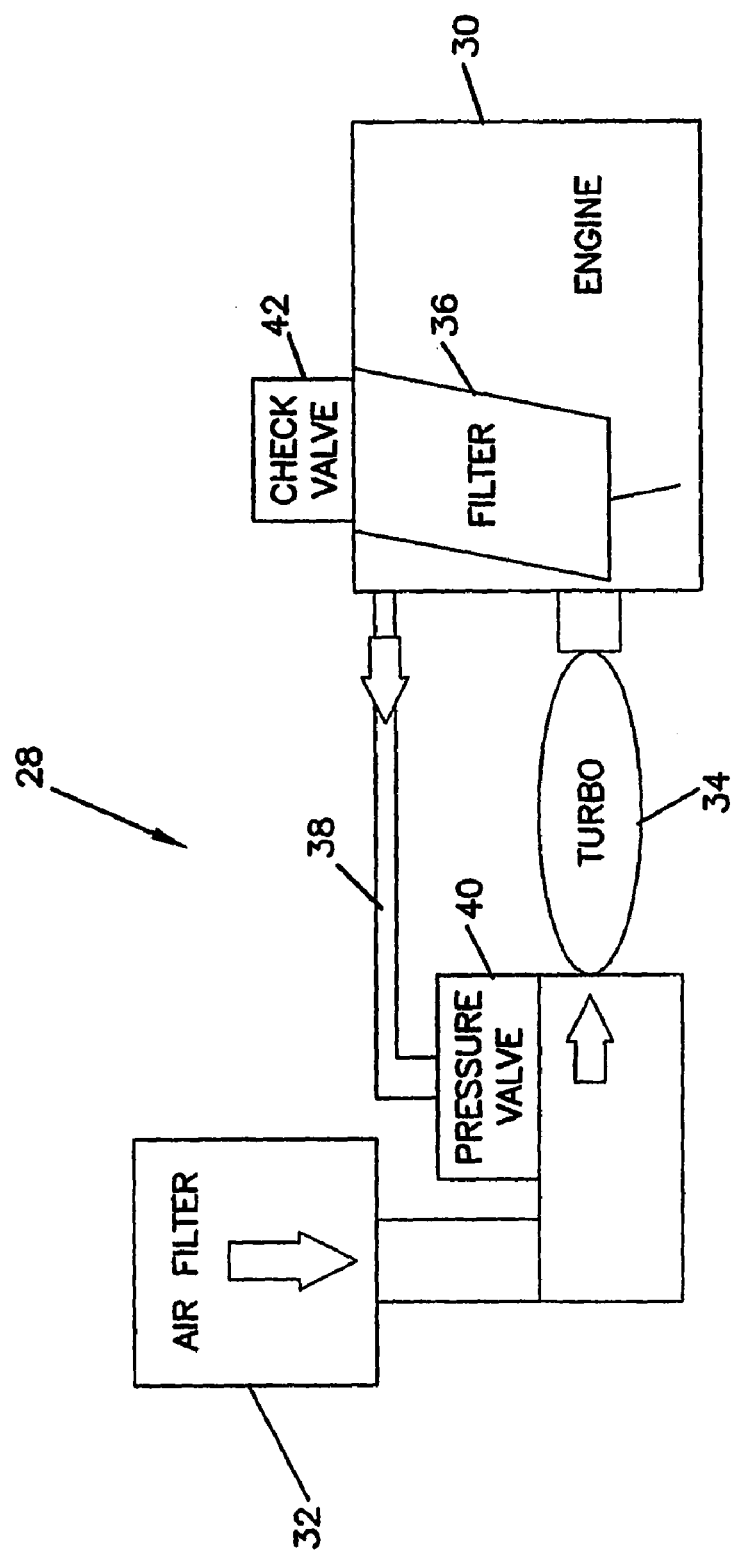
FIG. 1 is a schematic view of an engine system using a filter arrangement constructed according to principles of this disclosure.

FIG. 1 illustrates a schematic indicating a typical system 28 in which a coalescer/separator arrangement according to the present invention would be utilized. Referring to FIG. 1, block 30 represents a turbocharged diesel engine. Air is taken to the engine 30 through an air filter 32. Air filter or cleaner 32 cleans the air taken in from the atmosphere. A turbo 34 draws the clean air from the air filter 32 and pushes it into engine 30. While in engine 30, the air undergoes compression and combustion by engaging with pistons and fuel. During the combustion process, the engine 30 gives off blow-by gases. A filter arrangement 36 is in gas flow communication with engine 30 and cleans the blow-by gases. From filter arrangement 36, the air is directed through channel 38 and through a pressure valve 40. From there, the air is again pulled through by the turbo 34 and into the engine 30. Regulator valve or pressure valve 40 regulates the amount of pressure in the engine crankcase 30. Pressure valve 40 opens more and more, as the pressure in the engine crankcase increases, in order to try to decrease the pressure to an optimal level. The pressure valve 40 closes to a smaller amount when it is desirable to increase the pressure within the engine. A check valve 42 is provided, such that when the pressure exceeds a certain amount in the engine crankcase 30, the check valve 42 opens to the atmosphere, to prevent engine damage.

According to this disclosure, the filter arrangement 36 for separating a hydrophobic liquid phase from a gaseous stream (sometimes referred to herein as a coalescer/separator arrangement) is provided. In operation, a contaminated gas flow is directed into the coalescer/separator arrangement 36. Within the arrangement 36, the fine oil phase or aerosol phase (i.e., hydrophobic phase) coalesces. The arrangement 36 is constructed so that as the hydrophobic phase coalesces into droplets, it will drain as a liquid such that it can readily be collected and removed from the system.

II. Multi-Stage Oil Aerosol Separator Embodiment, FIGS. 2-9

Figure 2:
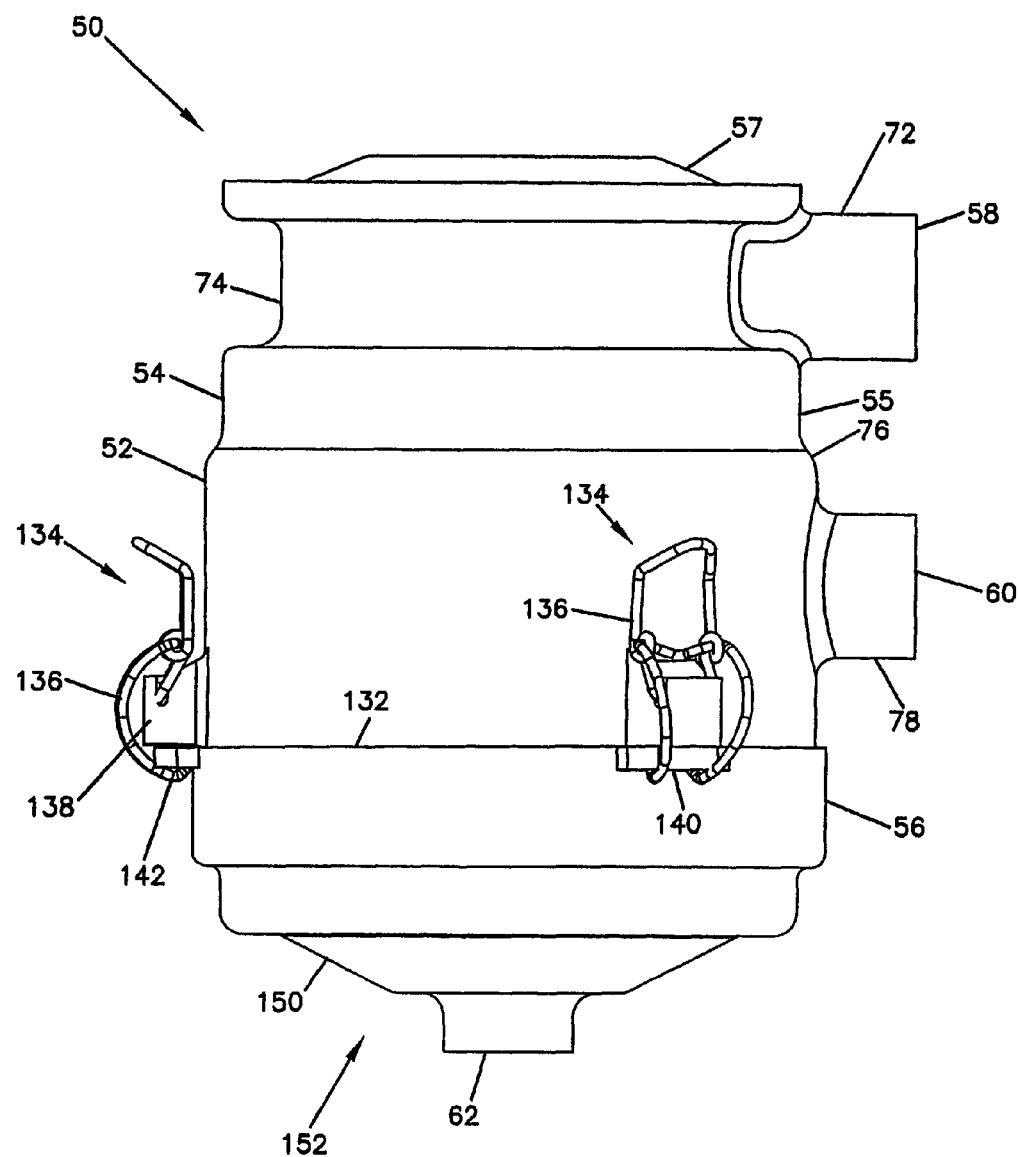
FIG. 2 is a schematic side elevational view of one embodiment of a filter arrangement, constructed according to principles of this disclosure.
Figure 3:
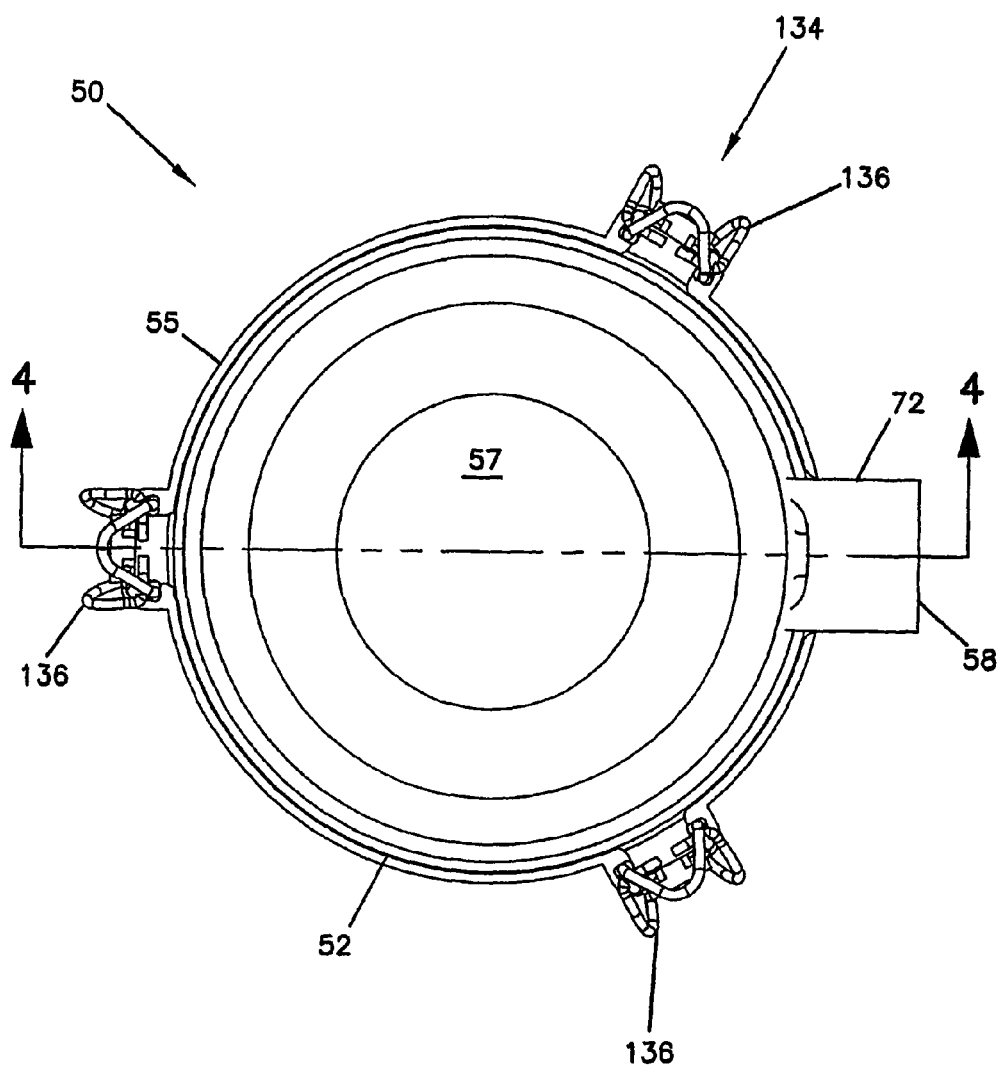
FIG. 3 is a schematic end view of the filter arrangement depicted in FIG. 2.

Referring to FIG. 2, an embodiment of a crankcase gas filter or filter arrangement 36 is depicted at reference numeral 50. The filter arrangement 50 depicted includes a housing 52. The depicted housing 52 has a two-piece construction. More specifically, housing 52 comprises a body assembly 54 and a removable cover member 56. The body assembly 54 includes body 55 and lid 57.

Figure 4:
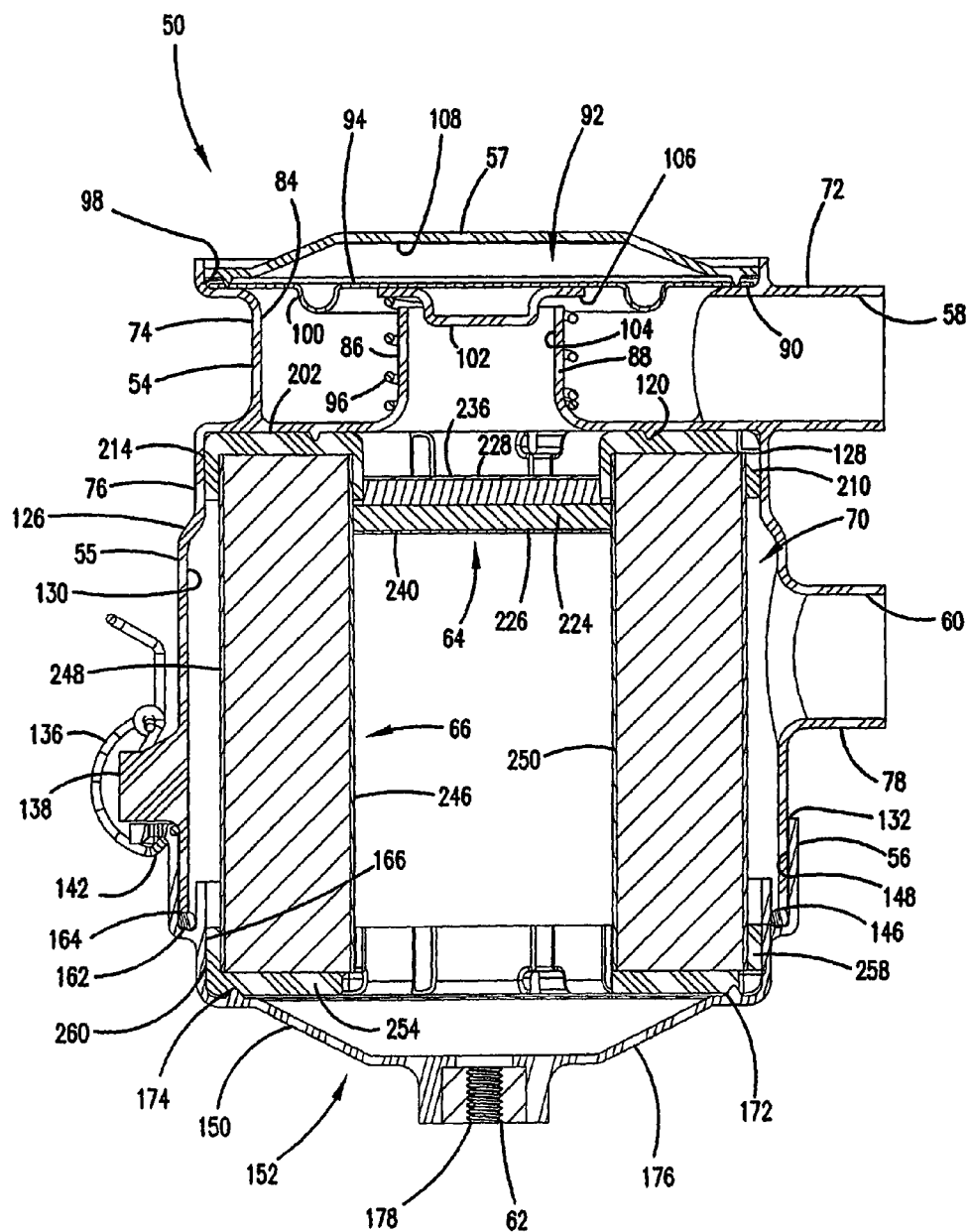
FIG. 4 is a schematic cross-sectional view of the filter arrangement depicted in FIGS. 2 and 3, and taken along the line 4-4 of FIG. 3.

Referring to FIGS. 2 and 4, the housing 52 depicted includes the following 3 ports: gas flow inlet port 58; gas flow outlet port 60; and liquid flow outlet port or liquid drain 62.

The filter arrangement 50 may be generally referenced herein as a "multi-stage" arrangement because it includes both: (a) a coalescer filter, to remove a liquid phase from a liquid entrained gas stream; and, (b) at least a single but could include multiple, downstream or second stage filters, for further purification of the air stream. In some arrangements, a separate coalescer filter is optional, and coalescing/drainage is provided in a single media pack with other stages. In FIG. 4, a cross-sectional view of the filter arrangement 50 including both the housing 52 and its internal components is depicted. In general, the filter arrangement 50 includes optional first stage coalescer filter 64, and a tubular construction of filter media 66.

In use, an air or gas stream to be modified is directed through the inlet port 58, and through the optional first stage coalescer filter 64. At least a portion of the liquid phase is coalesced and removed from the gaseous stream by the optional first stage coalescer filter 64. The liquid that is coalesced within the optional first stage coalescer filter 64 drains by gravity, and in the particular embodiment shown exits the housing 52 through the liquid flow outlet port 62. The gas phase is directed through the media construction 66. The media construction 66 provides for coalescing/drainage of entrained liquid and also removes at least a portion of solid particulates from the gas stream, and the cleaned gas stream is then directed outwardly from the housing 52 through the gas flow outlet 60.

Figure 5:
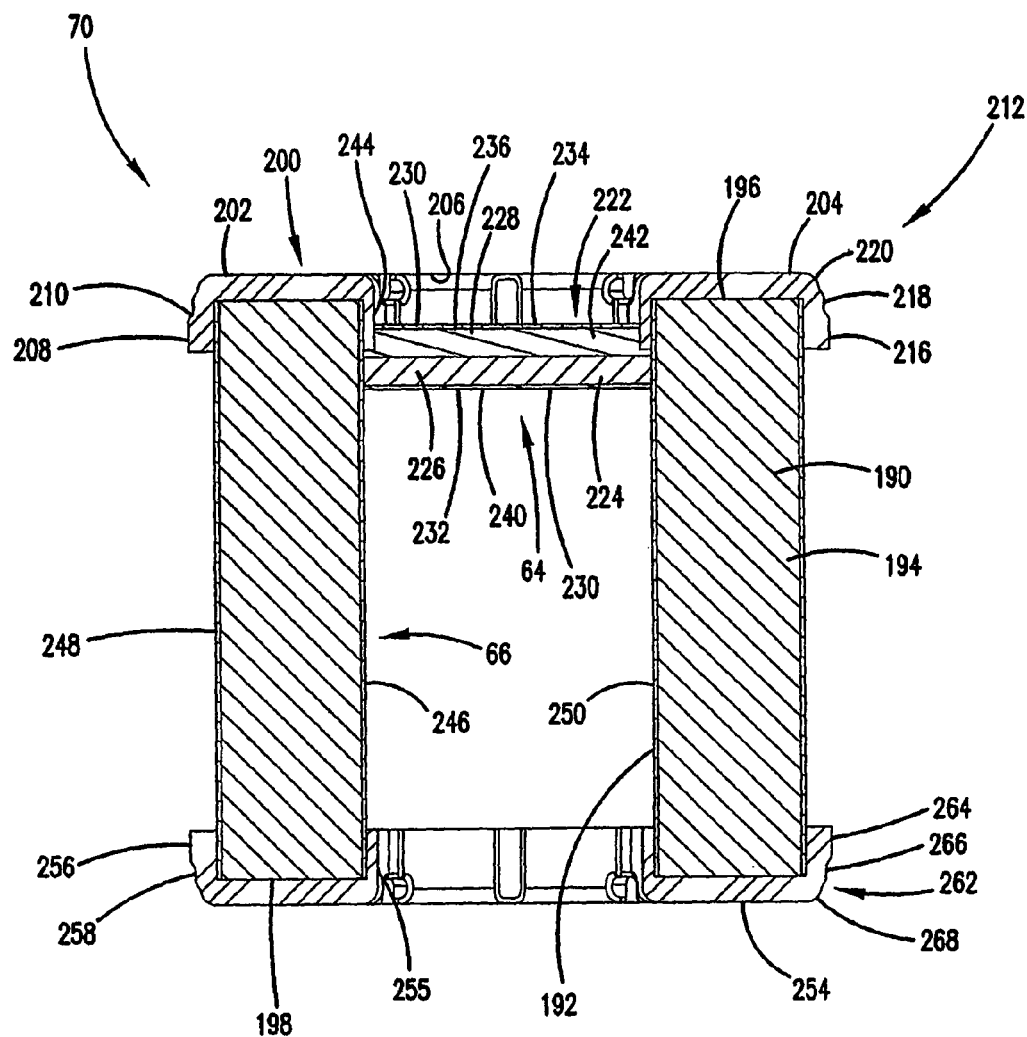
FIG. 5 is a schematic cross-sectional view of one embodiment of a filter element utilized in the filter arrangement of FIGS. 2-4; the cross-section being the same cross-section taken along the line 4-4, but depicting the filter element removed from the housing construction.

As can be seen in FIG. 5, the optional first stage coalescer filter 64 and tubular construction of media 66 are a single, unitary construction forming a filter arrangement or element 70. In the embodiment illustrated, the filter element 70 is removable and replaceable from the housing 52. By "unitary" in this context it is meant that the optional first stage coalescer filter 64 and the tubular construction of media 66 cannot be separated from one another without destroying a portion of the assembled element 70. In typical embodiments, end caps 202, 254 form part of the unitary construction.

In reference again to FIG. 4, for the housing 52 depicted, there is an inlet tube construction 72, a regulator valve housing 74, a canister portion 76, and a outlet tube construction 78. In the embodiment shown, each of the inlet tube construction 72, regulator valve housing 74, canister portion 76, and outlet tube construction 78 form a portion of the body 55. Together with the lid 57, the body 55 and lid 57 are part of the body assembly 54.

In the one shown, the inlet tube construction 72 is a cylindrical member 80 that defines the gas flow inlet port 58. In typical assemblies, the inlet tube construction 78 is in gas flow communication with the crankcase of engine 30, in order to treat blow-by gases emitted from the crankcase.

The regulator valve housing 74 depicted is immediately downstream of the inlet tube construction 72. The regulator valve housing 74 includes an outer surrounding wall 82 defining an open interior 84, where the gas to be treated is allowed to flow and collect before passing into the filter element 70. The regulator valve housing 74 also includes an internal wall 86 forming a neck 88. In the one illustrated, the regulator valve housing 74 also includes a shelf 90 for holding and supporting the lid 57 thereon. The neck 88 holds and supports a regulator valve assembly 92 (FIG. 4) between the canister portion 76 and the lid 57.

In reference to FIG. 4, the valve assembly 92 is constructed and arranged to regulate the gas flow from the crankcase of the engine 30 and through the filter element 70. While a variety of valve constructions are contemplated herein, the particular valve assembly 92 depicted includes diaphragm construction 94 and a biasing mechanism, such as spring 96. In FIG. 4, note that the diaphragm construction 94 is generally circular with an outermost rim 98 that is held by and rests upon shelf 90. The diaphragm construction 94 also includes a groove 100 having a generally U-shaped cross-section and being generally circular, in plan view. The groove 100 is inboard of the rim 98. The groove 100 helps to keep the diaphragm construction 94 properly oriented and centered upon the neck 88. Secured to the diaphragm construction 94 is a centering projection 102. The centering projection 102 is sized to extend into the interior portion 104 of the neck 88. In the one shown, the centering projection 102 is secured to the diaphragm construction 94 in a region inboard of the groove 100. The centering projection 102, together with the groove 100, helps to keep the diaphragm construction 94 properly oriented over the neck 88.

Still in reference to FIG. 4, in the particular valve assembly 92 shown, the spring 96 rests around the outside wall 86 of the neck 88. The spring 96 applies a force to the diaphragm construction 94 to pull the diaphragm construction 94 in a direction toward the neck 88 and toward the filter element 70. Note that there is a gap 106 between the diaphragm construction 94 and the neck 88. The gap 106 allows for gas flow from the interior 84 of the regulator valve housing 74 and into the interior portion 104 of the neck 88.

In operation, the valve assembly 92 generally operates to limit the rate of gas flow from the engine crankcase 30 to the filter element 70. The spring 96 pulls the diaphragm construction 94 toward the neck 88 against the pressure exerted by the gas flow inwardly from the gas flow inlet 58. The diaphragm construction 94 is constructed of a flexible material, such as rubber. As such, a diaphragm construction 94 is allowed to flex in a direction away from the neck 88 and toward the lid 57 in the volume 108 defined between the lid 57 and the shelf 90 of the regulator valve housing 74.

Figure 6:
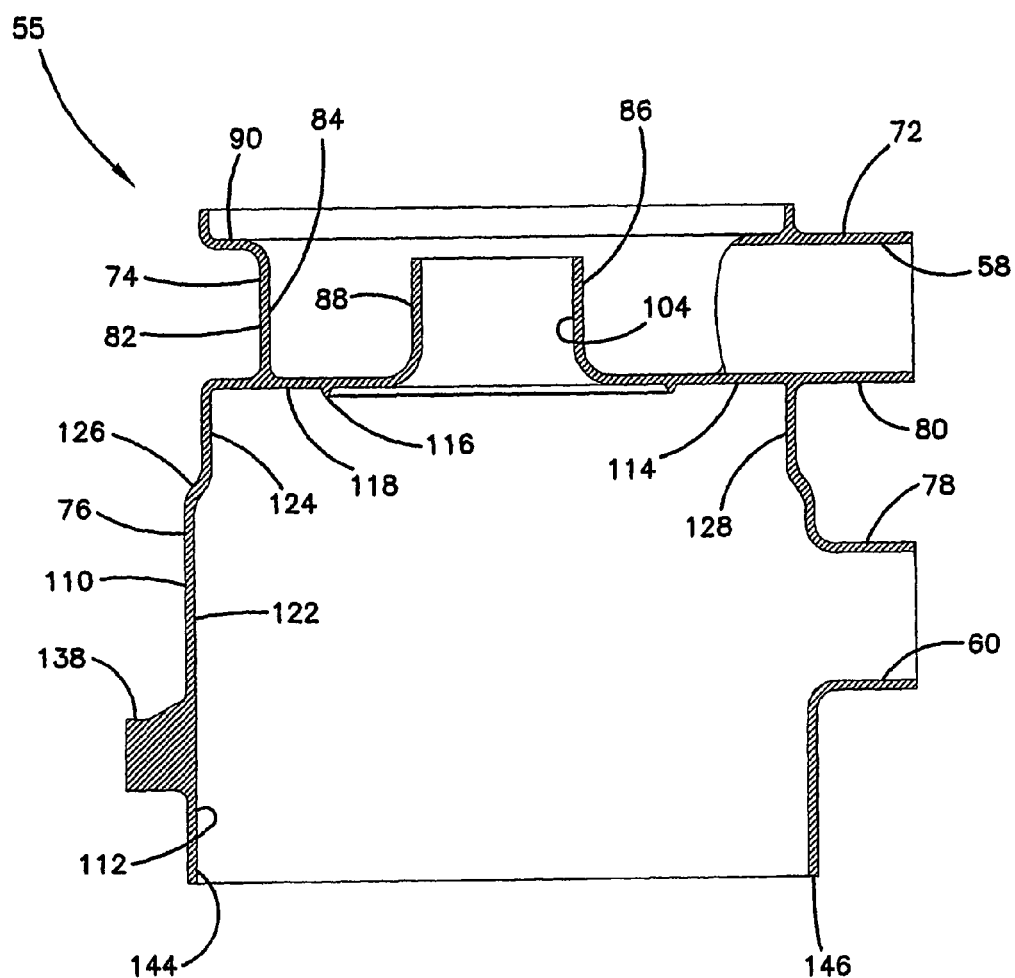
FIG. 6 is a schematic cross-sectional view of one embodiment of the housing construction body; the cross-section being analogous to the cross-section taken along the line 4-4, but depicting only the housing construction body and with a lid removed.

In reference now to FIG. 6, the canister portion 76 of the body 55 includes an outer surrounding wall 110, that is generally tubular in construction to define an open interior 112 for receipt of the filter element 70. In the one depicted, the wall 110 generally is cylindrical to define a circular cross-section. The canister 76 includes an end wall 114 that helps to hold and contain the filter element 70 inside of the canister 76. The end wall 114 includes a projection 116 extending from a flat, planar portion 118. When the filter element 70 is operably assembled within the housing 52, the projection 116 will act as a secondary, or supplemental sealing mechanism to create a secondary seal 120 (FIG. 4) between the end wall 114 of the body 55 and the element 70. It should be appreciated that the primary sealing function is in a radial sealing system between the filter element 70 and the housing 52, which is described in further detail below. The secondary seal 120 helps to prevent unintended amounts of oil seepage from passing along the end wall 114 between the filter element 70 and the housing 52.

Still in reference to FIG. 6, note that the body 55 includes a first tubular region 122 having a first greatest outer dimension and a second tubular region 124 having a second greatest outer dimension. In the particular example illustrated, the greatest outer dimensions of the tubular region 122 and tubular region 124 are diameters. The diameter of the tubular region 122 is greater than the diameter of the tubular region 124, to create a stepped region 126 therebetween. The tubular region 124 defines an inner, annular sealing surface 128. As will be described further below, the sealing surface creates a surface of which it can accept pressure of a seal member to create a radial seal therebetween. The tubular region 122 is spaced from the filter element 70, when the filter element 70 is operably assembled therein, to create a gas flow volume 130 therebetween.

As can be seen in FIG. 2, the body assembly 54 and the cover member 56 are joined to one another along a seam 132 by a latch arrangement 134. The latch arrangement 134 includes a plurality of latches 136 that are used to securely hold the cover member 56 and body assembly 54 together along the seam 132. The latches 136 allow the cover member 56 to be selectively removed from the body assembly 54 in order to access internal components, such as filter element 70 during servicing. There can be a number of latches, and in the particular embodiment illustrated, there are three latches 136. As can be seen in FIGS. 2, 4, and 6, the body 55 includes a latch mount 138 thereon for each of the latches 136. In FIG. 2, it can be seen that the cover member 56 includes appropriate latch receiving structure, such as a slot 140, for receiving a hook portion 142 of each of the latches 136.

The body 55 has an open end 144 (FIG. 6) that is opposite of the end wall 114, in the illustrated embodiment. The open end 144 is circumscribed by a rim 146 that is for communicating with a receiving slot 148 (FIG. 7) in the cover member 56.

Figure 7:
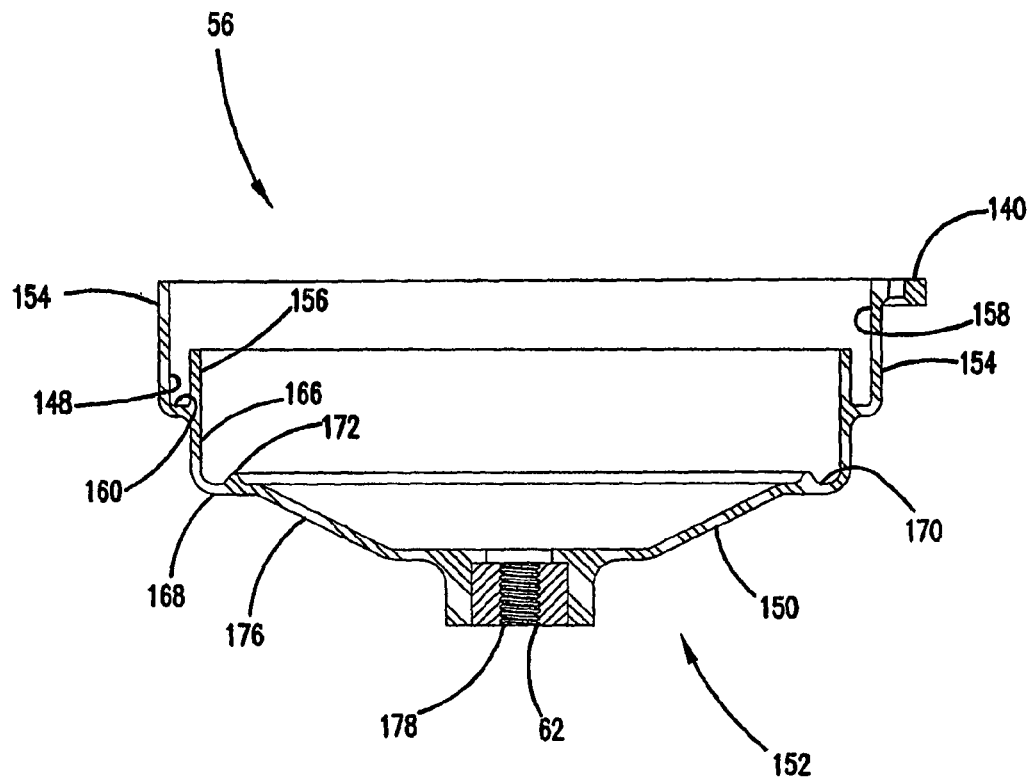
FIG. 7 is a schematic cross-sectional view of one embodiment of the housing construction cover member; the cross-section being analogous to the cross-section taken along the line 4-4, but depicting only the housing construction cover member.

Turning now to the cover member 56 illustrated in FIG. 7, note that the cover member 56 has a bowl or funnel-shaped end second 150. The combination of bowl 150 and drain 62 comprises a liquid collection arrangement 152. In use, as liquid coalesces within the housing 52, it will drain downwardly toward the bowl 150 and will be funneled to the drain 62. Typically, appropriate drain lines will be secured to the drain 62 to direct the collected liquid as desired, for example, to an oil sump.

In reference to FIG. 7, still further detail of the illustrated cover member 56 is shown. In the particular embodiment illustrated, in the cover member 56 includes and outer surrounding wall 154 and an inner wall 156 spaced from the outer wall 154. The outer wall 154 and the inner wall 156 together define the slot 148. The slot 148 functions as a volume 158 for receipt of the body assembly 54, in particular, the rim 146. The outer surrounding wall 154 also includes the latch receiving structure 140.

The volume 158 also provides a seat 160 for holding and containing a gasket member such as O-ring 162 (FIG. 4). In the construction shown, the O-ring 162 is between the rim 146 and the seat 160. The latch arrangement 154 provides axial forces to squeeze the cover member 56 and body assembly 54 together. This provides a force of the rim 146 on the O-ring 162 to create a seal 164 (FIG. 4) between the cover member 56 and body assembly 54. This seal 164 prevents unintended amounts of gas flow to flow between the body assembly 54 and the cover member 56. Rather, the seal 164 forces the gas flow to exit through the gas flow outlet 60.

In reference again to FIG. 7, the inner wall 156 provides an annular, sealing surface 166. The annular sealing surface 166 provides a structure against which a sealing portion of the filter element 70 is oriented to create a radial seal therewith. This is described in further detail below.

The cover member 56 also includes an end wall 168 that is generally normal to the inner wall 156. The end wall 168 acts as a stop 170 for orientation of the filter element 70. In other words, the stop 170 prevents the filter element 70 from moving axially within the housing 52. Extending from the end wall 168 is a projection 172. When filter element 70 is operably installed within housing 52, the projection 172 will be pressed against a sealing portion of the filter element 70 to create a secondary seal 174 (FIG. 4) with the filter element 70. The secondary seal 174 will help to prevent unintended amounts of oil seepage from traveling from within the filter element 70 to the volume 130 outside of the filter element 70. Again, the primary sealing function is accomplished by a radial sealing system, to be described further below. Of course alternate seals could be used.

Extending from the end wall 168 is a sloped wall 176 that terminates in the liquid flow outlet 62. The sloped wall 176 forms the funnel shaped section or bowl 150.

Note that the liquid flow outlet 62 includes a threaded section 178. Threaded section 178 can be a brass insert, and is convenient for connecting fittings to lead to an oil sump, for example.

Herein, the term "gas flow direction arrangement" or variants thereof will sometimes be used to refer to the portions of arrangements that direct gas flow. For filter arrangement 50, FIG. 4, this would include the gas flow inlet 58, the inlet tube construction 72, the various walls of the housing 52 (including the walls 82, 86, 110, and 154) and the outlet tube construction 78, including the gas flow outlet 60. The gas flow direction arrangement generally operates to ensure proper gas flow, through the filter element 70 in proper order.

Attention is now directed to FIGS. 4 and 5. The filter element 70 is shown in FIG. 4 operably assembled within the housing 52. By the term "operably assembled" and variants thereof, it is meant that the filter element 70 is oriented within the housing 52 such that the seals are in place and gas flow is permitted to flow properly from the inlet 58, through the filter element 70, and out through the outlet 60.

It can be seen in FIGS. 4 and 5 that the filter element 70 includes both the optional first stage coalescer filter 64 and a tubular construction media of 66 in a single construction. When the filter element 70 is handled, for example during servicing, both the optional first stage coalescer filter 64 and the tubular construction of media 66 are handled together. In general, the tubular construction of media 66 includes a media pack 190 arranged in a closed, tubular form to define an open filter interior 192. In certain constructions, the media pack 190 will be configured to have a generally cylindrical shape, defining a circular cross section. It is noted that in some arrangements, the tubular media construction 60 can be constructed to provide both a coalescing/drainage function and a solid particulate removal function.

The media pack 190 can be many different types of media, adjusted to achieve the desired efficiency and restriction. One example of media 194 useable in media pack 190 is formed media. An example media is described in Section VI below. The media pack 190 can act both to facilitate coalescing/drainage and as a polishing filter to remove at least some particulates and debris from the gas stream, before exiting the housing 52 through the gas flow outlet 60.

In the illustrated embodiment, the media 194 has a first end 196 and an opposite, second end 198. The length of the media 194 extends between the first end 196 and second end 198. In the filter element 70 shown, at the first end 196 is a first end cap arrangement 200. In the particular embodiment shown in FIG. 5, the end cap arrangement 200 includes an end cap 202 and the first stage coalescer filter 64. In typical constructions, the end cap arrangement 200 is a single, unitary structure.

In typical embodiments, the end cap 202 includes a ring 204 of a molded, polymeric material. The ring 204 defines a center aperture 206 that, in the embodiment illustrated, is centered in the ring 204. By "centered", it is meant that the aperture 206 has a center of symmetry that is the same as the center of symmetry of the ring 204. In other words, the center 206 in the arrangement shown is not eccentrically disposed within the ring 204, however alternatives are possible.

In some arrangements, the center aperture 206 will be circular and have a diameter that is not greater than about 50 percent of the diameter of the ring 204. In some arrangements, the diameter of the aperture 206 will be less than 40 percent of the diameter of the ring 204.

The ring 204 also includes an outer, annular surface 208. When filter element 70 is operably assembled within housing 52, the outer annular sealing surface 208 functions as a sealing portion 210. In certain arrangements, the sealing portion 210 includes a stepped construction 212. Of course alternate seal arrangements are possible.

In the example shown, the stepped construction 212 helps with the insertion and formation of a radial seal 214 (FIG. 4) between the end-cap arrangement 200 and the sealing surface 128 of the housing 52. In FIG. 5, the stepped construction 212 includes a first region of largest diameter 216, adjacent to a second region 218 of a diameter smaller than the first region 216, adjacent to a third region 220 of a diameter smaller than that of the second region 218. This stepped construction 212 of decreasing diameters, results in a construction that helps with the insertion of the filter element 70 in the body 55.

The sealing portion 210 of the end cap 202 is typically made from a compressible material, such that there is radial compression of the sealing portion 210 against the sealing surface 128, when the element is operably installed in the housing 52. Example, usable materials for the sealing portion 210, and typically the entire end cap 202, are described below. In general, typical end caps 202 will comprise a soft, polyurethane foam having an as-molded density of typically, less than 22 lbs per cubic foot, for example about 10-22 lbs. per cubic foot, although alternatives are possible.

Still in reference to FIG. 5, the end cap arrangement 200 also includes a frame construction 222 oriented in the center aperture 206 of the ring 204. The frame construction 222 holds, contains, and encapsulates an optional region of fibrous media 224. In the construction shown, the optional fibrous media 224 is used as the optional first stage coalescer filter 64. In certain preferred arrangements, the fibrous media 224 comprises at least one layer, and typically, a plurality of layers 226 of nonwoven, nonpleated, non open tubular, coalescing media. In the embodiment shown in FIG. 5, there are two layers 226, 228 of fibrous media 224. Certain usable, example materials for the fibrous media 224 are described further below.

Still in reference to FIG. 5, in the frame construction 220 depicted, the frame construction 222 is a multi-piece, in particular, a two-piece construction including a first frame piece 230 and a second frame piece 232. The first frame piece 230 includes a support grid 234 in covering relation to the upstream face 236 of the optional fibrous media 224. The support grid 234 is a porous, mesh that permits gas flow to flow therethrough and across the optional fibrous media 224. The support grid 234 provides structural support to the optional fibrous media 224.

Similarly, the second frame piece 232 includes a porous support grid 238 in covering relation to the downstream face 240 of the optional fibrous media 224. The support grid 238 also provides structural support for the optional fibrous media 224, while permitting gas flow to penetrate therethrough and into the open filter interior 192.

In the arrangement shown, the first frame piece 230 and the second frame piece 232 are arranged adjacent to each other to form a retaining pocket 242 between the support grid 234 and support grid 238 that holds or encapsulates the optional fibrous media 224. In certain arrangements, the first frame piece 230 and the second frame piece 232 fit together, such as by snap engagement.

As can be seen in FIG. 5, in the embodiment depicted, the frame construction 222 is molded or embedded within the polymeric end cap 202, along the inner annular region 244 of the ring 204.

The particular filter element 70 depicted further includes an inner support liner 246 and an outer support liner 248. Each of the inner liner 246 and outer liner 248 extends between the first end 196 and second end 198 of the media pack 190. The inner liner 246 and outer liner 248 help to support the media 194. The liners 246 and 248, in typical arrangements, are constructed of a plastic, porous structure that permits gas flow therethrough. The outer liner 248 circumscribes the media 194 and the region of fibrous media 224. In some arrangements using media as described in section VI below, for the media pack 190, one or more of the inner and outer liners can be avoided.

In the particular embodiment illustrated in FIG. 5, the inner liner 246 is an integral, unitary part of the second frame piece 232. That is, the inner liner 246 and the second frame piece 232 are a single member. The inner liner 246 also forms a drain surface 250 for allowing the drippage and flow of coalesced liquid from the optional first stage coalescer filter 64 down to the bowl 150.

The filter element 70 also includes an end cap 254 at the second end 198 of the media pack 190. The end cap 254 can be is constructed of a molded, polymeric material, such that the media 194 is potted or embedded therewithin. Similarly, the inner liner 246 and the outer liner 248, in certain embodiments, extend between and are embedded within the molded, polymeric material of the first end cap 202 and second end cap 254. The second end cap 254 includes an outer annular surface 256 that forms a sealing portion 258. For the example shown, the sealing portion 258 is compressible, such that it is squeezed against the sealing surface 166 of the cover member 56 when the filter element 70 is operably installed within the housing 52. The end cap 254 has an aperture 255 that for the example shown, is aligned with the liquid flow outlet 62 to allow coalesced liquid to drain from the optional first stage coalescer filter 64, through the aperture 255, and exit through the outlet 62. Of course, alternate seal arrangements are possible.

Attention is directed to FIG. 4. When the filter element 70 is operably installed within the housing 52, the sealing portion 258 is compressed between and against the sealing surface 166 and the outer support liner 248 to form a radial seal 260 therebetween. As can be also seen in FIG. 4, the sealing portion 210 of the first end cap 202 is compressed between and against the sealing surface 128 and the outer support liner 248 to form radial seal 214 therebetween. The radial seals 214, 260 provide for the primary sealing system within the filter arrangement 50. The radial seals 214, 260 prevent unintended amounts of gas flow to bypass either one or both of the optional first stage coalescer filter 64 and the filter 66. Of course, alternate seal arrangements is possible.

Attention is again directed to FIG. 5. The sealing portion 258 of the end cap 254 shown includes a stepped construction 262. The stepped construction 262 is analogous to the stepped construction 212 of end cap 202. In the particular embodiment illustrated, there are three steps of decreasing diameter, including step 264, step 266, and step 268. Again, the stepped construction 262 helps in insertion of the filter element 70 in the housing 52 and the formation of radial seal 260.

The end cap 254 can comprise a molded, polymeric material, such as molded polyurethane foam having an as-molded density of typically less than 22 lbs per cubic foot, for example, about 10-22 lbs. per cubic foot. One example material is described further below.

Note that when the end caps 202 and 254 are molded in place, the end caps 202, 254; the first and second plastic extensions 246, 248; the media pack 190; and the optional media 24 are secured together in the form of unitary, cylindrical filter element 70.

Figure 8:
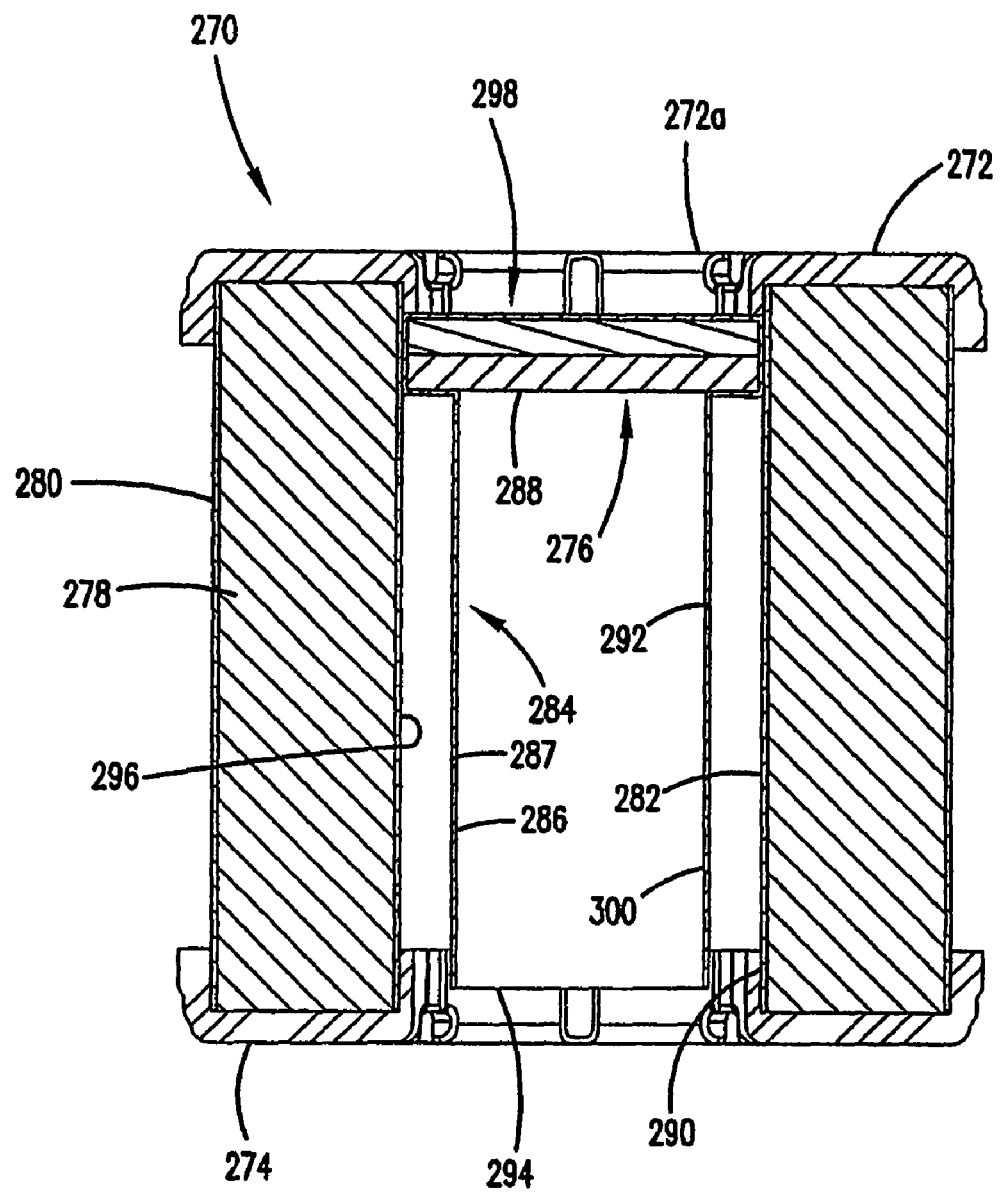
FIG. 8 is a schematic cross-sectional view of a first alternative embodiment of a filter element that can be utilized in the filter arrangement of FIGS. 2-4; the cross-section being analogous to the cross-section of FIG. 5.

An alternative embodiment of filter element 70 is illustrated in FIG. 8 at reference numeral 270. Element 270 is analogous to the element 70 of FIG. 5, in that it includes end cap 272, end cap 274, an optional region of fibrous media 276, media 278, and an outer liner 280. End cap 272 includes a central gas stream inlet aperture 272a. The element 270 further includes an inner support liner 282 potted within, and extending between the end caps 272, 274. In this embodiment, there is further included a flow construction 284 to aid in draining liquid that has been coalesced by the fibrous media 276.

In the embodiment illustrated in FIG. 8, the flow construction 284 includes a tube 286. In typical arrangements, the tube 286 extends from the downstream flow face 288 of the coalescer media 276 to the aperture 290 of the end cap 274. The length of the tube 286 can vary between about 33%-95% of the total length of the media 278. In many cases, the tube 286 with have a length of at least 25% of the media pack 190; and usually less than 100% of the length of the media pack 190. In certain embodiments, the tube 286 will have at least a section 287 that is constructed of a generally gas impermeable material, such that gas flow is required to exit from the downstream flow face 288, through the tube interior 292, past the end tip 294 of the tube 286, and then up into the volume 296 before flowing through the media pack 190. The volume 296 is the region between the inner liner 282 and the tube 286. In the particular embodiment depicted, the entire tube 286 includes the imperforate section 287. In other embodiments, there may be portions of the tube 286 that are perforated, or gas permeable.

In the embodiment depicted, the tube 286 is part of a frame construction 298 that is used to trap, encapsulate, or hold optional fibrous media 276. Typically, the frame construction 298 will be molded within the end cap 272.

The tube 286 will aid in the drainage of coalesced liquid (typically oil). In operation, the coalesced liquid will drain by gravity along the inside wall 300 of the tube 286, and then drip into the bowl 150, and then exit through the liquid flow outlet 62.

Figure 9:
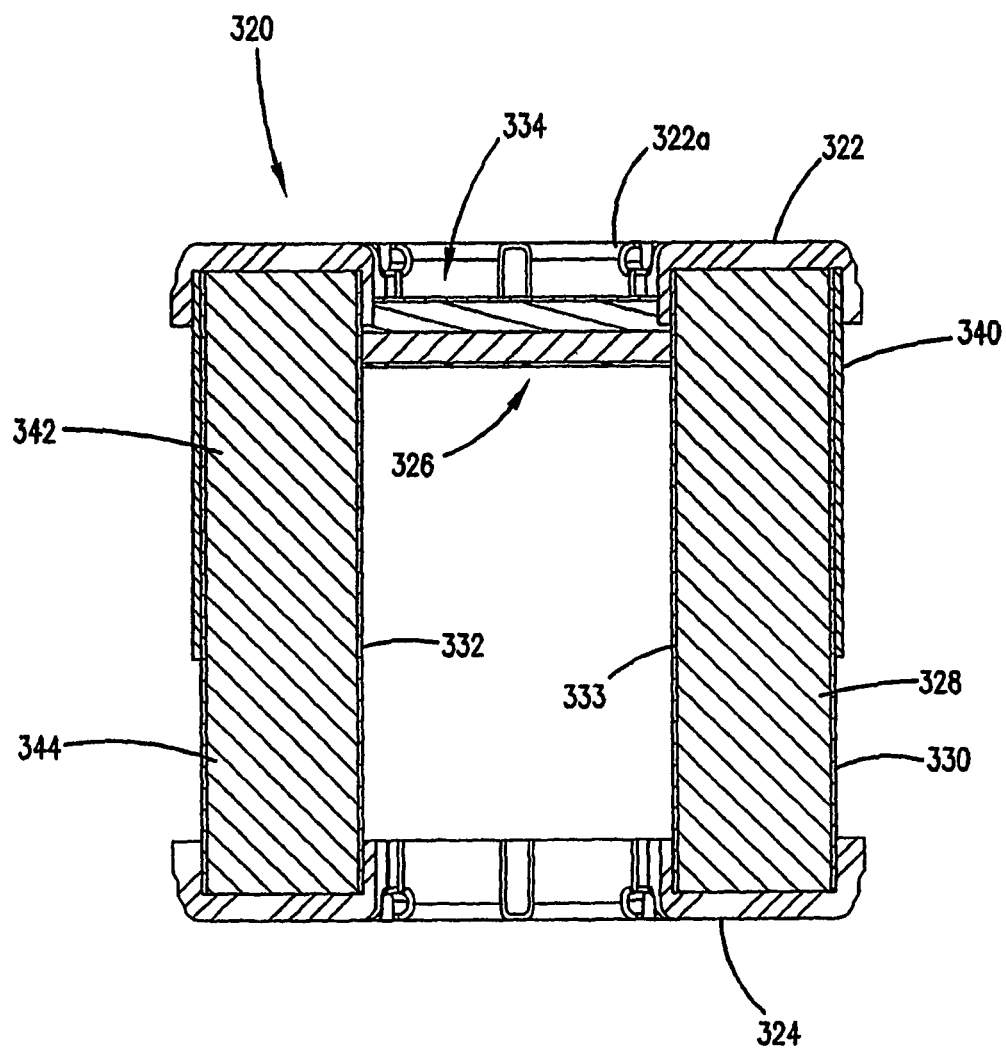
FIG. 9 is a schematic cross-sectional view of a second alternative embodiment of a filter element that can be utilized in the filter arrangement of FIGS. 2-4; the cross-section being analogous to the cross-section of FIG. 5.

Another alternative embodiment of filter element 70 is illustrated in FIG. 9 at reference numeral 320. Element 320 is analogous to the element 70 of FIG. 5, in that it includes end cap 322, end cap 324, an optional region of fibrous media 326, a media pack 327 (illustrated as media 328), an outer liner 330, an inner liner 332, and a frame construction 334 encapsulating the optional fibrous media 326. End cap 322 includes a central gas stream inlet aperture 322a. The media pack 327 defines an open tubular interior 333. The element 320 further includes an impervious outer wrap 340 circumscribing and in covering relation to the outer liner 330.

In the embodiment depicted, the outer wrap 340 extends between about 25-75% of the length of the media pack 327, typically from the end cap 322 (holding the optional fibrous media 326) toward the other end cap 324 (stopping short of the end cap 324). The outer wrap 340 aids in draining liquid that has been coalesced by the optional fibrous media 326. In particular, the outer wrap 340 helps to prevent gas flow through the region 342 of media 328 that is masked by the wrap 340. This encourages gas flow to travel further in the direction toward the end cap 324, and to the region 344 of media 326 that is not masked by the wrap 340.

A. Example Operation and Changeout

In operation, the filter arrangement 50 works as follows. Blow-by gases from an engine crankcase are taken in through the gas flow inlet port 58. The gases pass into the interior 84 of the regulator valve housing 74. The valve assembly 92 permits passage of the gas through the gap 106 between the diaphragm construction 94 and the neck 88. The gap 106 become larger as the pressure from the engine crankcase increases, causing the diaphragm construction 94 to move against the spring 96 and into the volume 108 against the lid 57. The gas then flows into the interior portion 104 of the neck 88. From there, it passes through the optional first stage coalescer filter 64. The optional first stage coalescer filter 64 is secured within the construction such that the gas is directed through the optional first stage coalescer filter 64 before the gas is directed through the media pack 190.

In particular the gas flow passes through the support grid 234 and into the optional layer 228 of fibrous media 224. The gas continues to flow downstream and through the optional layer 226, and then through the support grid 238. The optional fibrous media 224 separates liquids, with any entrained solids, from the rest of the gas stream. The liquid flows out of the media 224 and either drips directly into the bowl 150, or drains along the drain surface 250 of the inner liner 246. The collected liquid flows along the sloped wall 176 and ultimately through the liquid flow outlet 62. This liquid material often is oil, and may be recycled to the crankcase to be reused.

The gas stream that is not coalesced by the optional first stage coalescer filter 64 continues on to filter 66. Specifically, the gas flow travels from the open filter interior 192 through the media pack 190. The gas flow is prevented from bypassing this media due to the radial seals 214, 260. The media pack 190 provides selective coalescing/drainage of liquid contaminant and selective removal of solids from the gas stream. In the orientation shown in FIG. 4, the media 194 is vertically oriented, such that liquid that collects or agglomerates on the media falls or drains by gravity downwardly toward the bowl 150. The filtered gas then exits through the gas flow outlet port 60. From there, the gases may be directed, for example, to the turbo 34 of engine 30, to another intake position or to the environment.

It should be noted that secondary seals 120, 174 prevent unintended amounts of collected liquid, such as oil, from seeping between the filter element 70 and the housing 52.

The filter arrangement 50 is serviced as follows. The cover member 56 is removed from the body assembly 54 by releasing the latches 136. This permits the cover member 56 to be removed from the body assembly 54. When the cover member 56 is removed from the body assembly 54, the seal 164 between the body 55 and cover member 56 is released. Further, the radial seal 260 between the filter element 70 and the cover member 56 is released. This also provides access to the filter element 70, which includes the optional first stage coalescer filter 64 and the tubular construction of media 66. The end of the filter element 70 adjacent to the end cap 254 is grasped, and the filter element 70 is pulled in an axial direction from the interior 112 of the body 55. As the filter element 70 is pulled from the interior 112, the radial seal 214 is released. This step removes simultaneously the optional first stage coalescer filter 64 and the filter 66. This filter element 70 may then be disposed of, such as by incineration.

A second, new, replacement filter element 70 is then provided. The replacement element 70 includes the optional first stage coalescer filter 64 and filter 66 in an analogous construction as the initial filter element 70. The replacement element 70 (including both the optional first stage 64 and media stage 66) is inserted through the open end 144 of the body 55. The filter element 70 is oriented such that the sealing portion 210 of the end cap 202 is compressed between and against the sealing surface 128 and the outer liner 248 to form radial seal 214 therebetween. In typical embodiments, the filter element 70 is also oriented such that the end cap 202 engages and abuts the end wall 114 of the body 55. Next, the cover member 56 is placed over the end of the filter element 70 and oriented such that the sealing portion 258 of the end cap 254 is compressed between and against the outer liner 248 and the sealing surface 166 of the cover member 56. This creates the radial seal 260. In typical arrangements, the filter element 70 is also oriented such that the end cap 254 axially engages and abuts the stop 170 of the cover member 56. Of course alternate seal arrangements are possible.

With both radial seals 214 and 260 in place, the cover member 56 is then locked to the body assembly 54 by engaging the latches 136. This also helps to create the seal 164 between the cover member 56 and body 55.

B. Example Constructions and Systems

The filter arrangement 36 is useful on a 1.5 liter-16 liter engine, 50-1200 hp, turbo charged, or super charged, diesel, or natural gas. In one application, the engine is a 250-400 hp, V-8 engine. The engine has a piston displacement of at least 3 liters, typically 7-14 liters. It typically has 8-16 cfm of blow-by gases generated. Preferred filter arrangements 36 can handle blow-by gases from 1-20 cfm.

In other systems, the filter arrangement 36 is useful on engines with the following powers: 8 kw-450 kw (11-600 hp); 450-900 kw (600-1200 hp); and greater than 900 kw (>1200 hp). In general, as the power of the engine increases, the media 194 will be increased in surface area. For example, for engine powers 8 kw-450 kw (11-600 hp), the length of the media 194 will be about 4-5 inches; for engine powers 450-900 kw (600-1200 hp), the length of the media 194 will be about 6-8 inches; and for engine powers greater than 900 kw (>1200 hp), there will typically be more than one filter arrangement 36 utilized. It will be understood that a wide variety of specific configurations and applications are feasible, using techniques described herein. The following dimensions are typical examples:

| Structure (in.) | At least (in.) | No greater than (in.) | Typical |
|---|---|---|---|
| outer diameter of element 70 | 2 | 12 | 4-5 |
| inner diameter of element 70 | 0.5 | 10 | 1.5-2.5 |
| length of element 70 | 3 | 12 | 4-6 |
| diameter of media 224 | 0.5 | 10 | 2-2.5 |
| thickness of each optional layer 226, 228 | 0.05 | 1 | 0.1-0.3 |
| diameter of inlet 58 | 0.5 | 3 | 1-1.5 |
| diameter of gas flow outlet 60 | 0.5 | 3 | 1-1.5 |
| diameter of neck 88 | 0.5 | 3 | 1-1.5 |
| height of projection 116 | 0.01 | 0.25 | 0.05-0.1 |
| diameter of open end 144 | 3 | 14 | 4.5-5.5 |
| diameter of lid 57 | 3 | 14 | 4.5-5.5 |
| diameter of diaphragm 96 | 3 | 14 | 4.5-5 |
| diameter of inner wall 156 | 3 | 13 | 4.5-5 |
| diameter of outer wall 154 | 3 | 14 | 5-5.5 |
| diameter of liquid flow outlet 62 | 0.05 | 2 | 0.1-0.5 |
| height of projection 172 | 0.01 | 0.25 | 0.05-0.1 |
| length of housing 52 | 4 | 15 | 7-8 |

C. Example Materials

In this section, certain example materials useful for the embodiment of FIGS. 2-7 are described. A variety of materials may be used, other than those described herein.

The housing 50 can be plastic, such as carbon filled nylon.

The media 224 of the optional coalescer 64 can be a non-pleated, non-cylindrical, polyester fibrous media having an average fiber diameter of less than about 18 microns, typically about 12.5 microns and a percent solidity, free state, of no greater than about 1.05%. The media 224 has an upstream, and a downstream exposed surface area of at least 1 in.$^2$, no greater than about 7 in.$^2$, and typically about 3-4 in.$^2$ The material has an average fiber diameter of 1.5 denier (about 12.5 micron), and a solidity in a free state of at least 0.85%. It has a weight of, typically, greater than about 3.1 ounces per square yard. Typically, it has a weight less than 3.8 ounces per square yard. Typical weights are within the range of 3.1-3.8 ounces per square yard (105-129 grams per square meter). Typically, the media has a thickness at 0.002 psi compression (free thickness) of greater than about 0.32 inches. Typically, the media has a thickness at 0.002 psi compression (free thickness) of less than about 0.42 inches. Typical free thicknesses for the media are in the range of 0.32-0.42 inches (8.1-10.7 millimeters). The media has a typical permeability of no less than about 370 feet per minute (113 meters per minute). The media 224 is used, can also be a media of the type described in Section VI.

The end caps 202, 254 may be a polymeric material. In particular, the end caps 202, 254 can be urethane, and more particularly, foamed polyurethane. One example foamed polyurethane is described in commonly assigned U.S. Pat. No. 5,669,949 for end cap 3, herein incorporated by reference. The material can be the following polyurethane, processed to an end product (soft urethane foam) having an "as molded" density of 10-22 pounds per cubic foot (lbs/ft$^3$) and which exhibits a softness such that a 25% deflection requires about a 10 psi pressure. In some embodiments, the "as molded" density varies from the 10-22 lbs/ft$^3$ range.

The polyurethane can comprise a material made with I35453R resin and I305OU isocyanate. The materials should be mixed in a mix ratio of 100 parts I35453 resin to 36.2 parts I305OU isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70-95° F. The mold temperatures should be 115-135° F.

The resin material I35453R has the following description:
  (a) Average molecular weight
    1) Base polyether polyol=500-15,000
    2) Diols=60-10,000
    3) Triols=500-15,000
  (b) Average functionality
    1) total system=1.5-3.2
  (c) Hydroxyl number
    1) total systems=100-300
  (d) Catalysts
    1) amine=Air Products 0.1-3.0 PPH
    2) tin=Witco 0.01-0.5 PPH
  (e) Surfactants
    1) total system=0.1-2.0 PPH
  (f) Water
    1) total system=0.03-3.0 PPH
  (g) Pigments/dyes
    1) total system=1-5% carbon black
  (h) Blowing agent
    1) 0.1-6.0% HFC 134A.

The I305OU isocyanate description is as follows:
  (a) NCO content—22.4-23.4 wt %
  (b) Viscosity, cps at 25° C.=600-800
  (c) Density=1.21 g/cm$^3$ at 25° C.
  (d) Initial boiling pt.—190° C. at 5 mm Hg
  (e) Vapor pressure=0.0002 Hg at 25° C.
  (f) Appearance—colorless liquid
  (g) Flash point (Densky-Martins closed cup)=200° C.

The materials I35453R and I305OU are available from BASF Corporation, Wyandotte, Mich. 48192.

The frame construction 222, inner liner 246, outer liner 248, and screens 234, 238 can be constructed of plastic, such as carbon filled nylon.

The filter 66 can be constructed of an oleo-phobic material. Typically, the filter 66 is a formed media. Some characterizations of example, of useable formed media are described further below in Section VI.

The housing 52 may be constructed of a molded plastic, such as glass filled nylon. The diaphragm construction 94 can be constructed of a deflectable material, such as rubber.

III. The Embodiments of FIGS. 10-15

Figure 10:
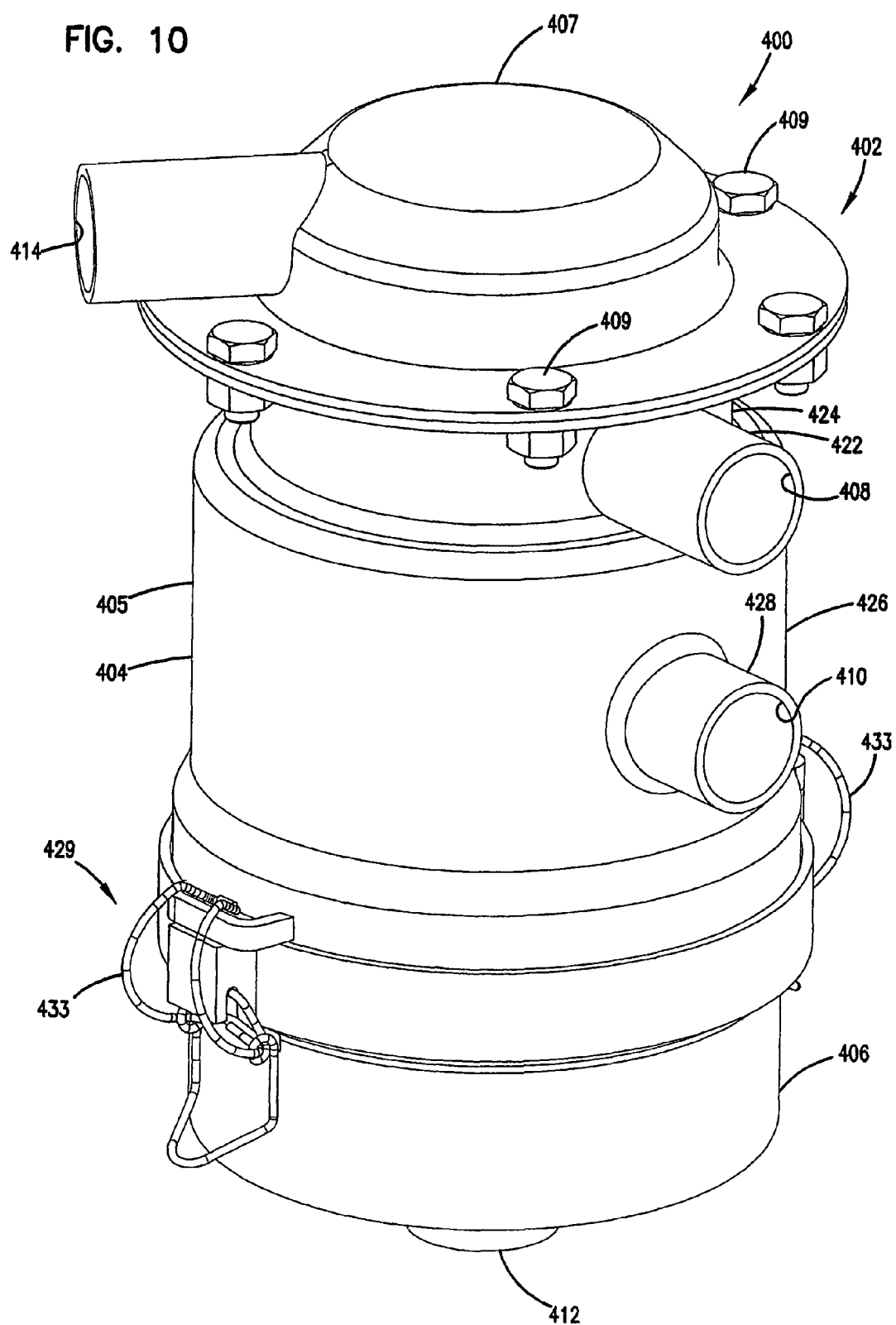
FIG. 10 is a schematic perspective view of another embodiment of a filter arrangement, constructed according to principles of this disclosure.
Figure 11:
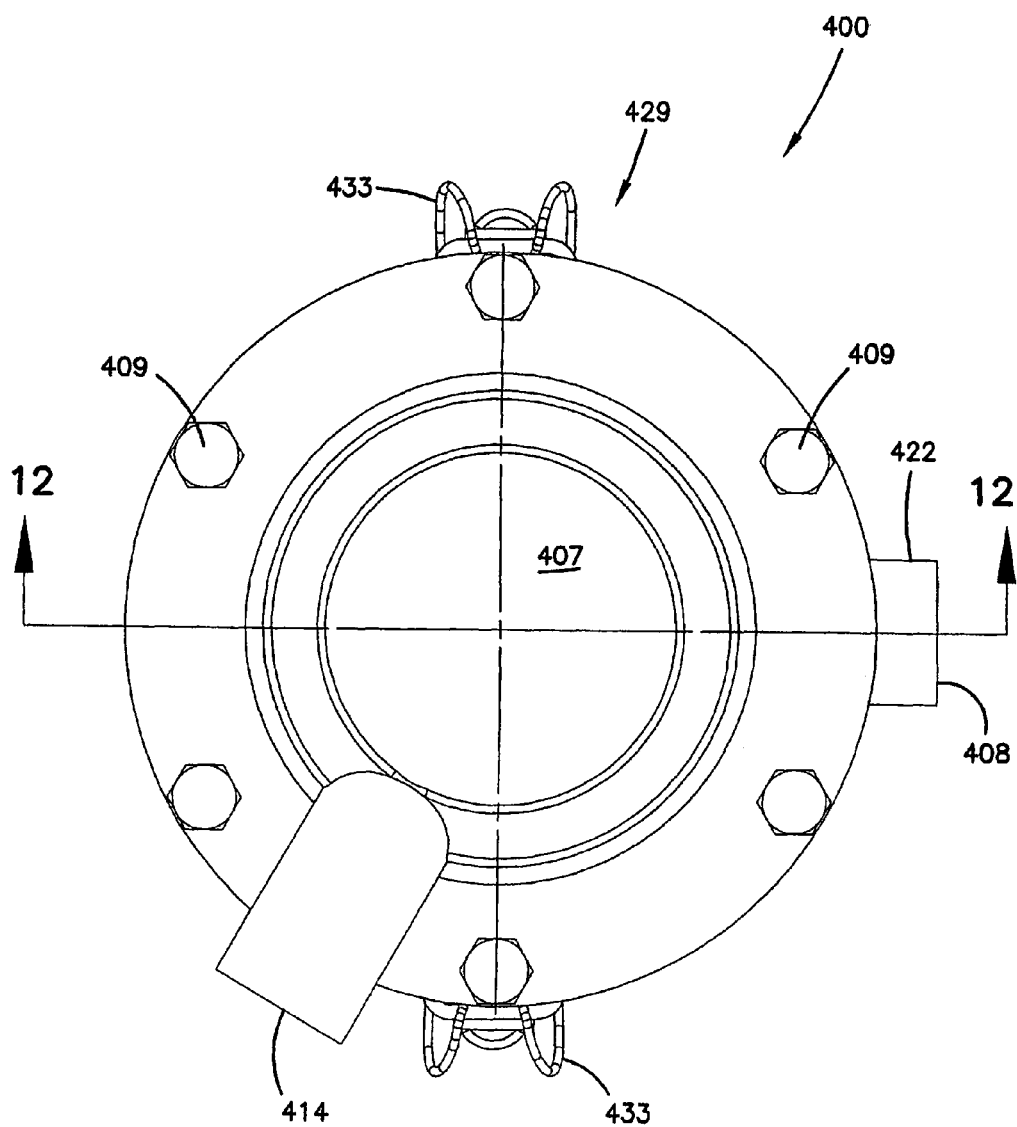
FIG. 11 is a schematic top plan view of the filter arrangement depicted in FIG. 10.
Figure 12:
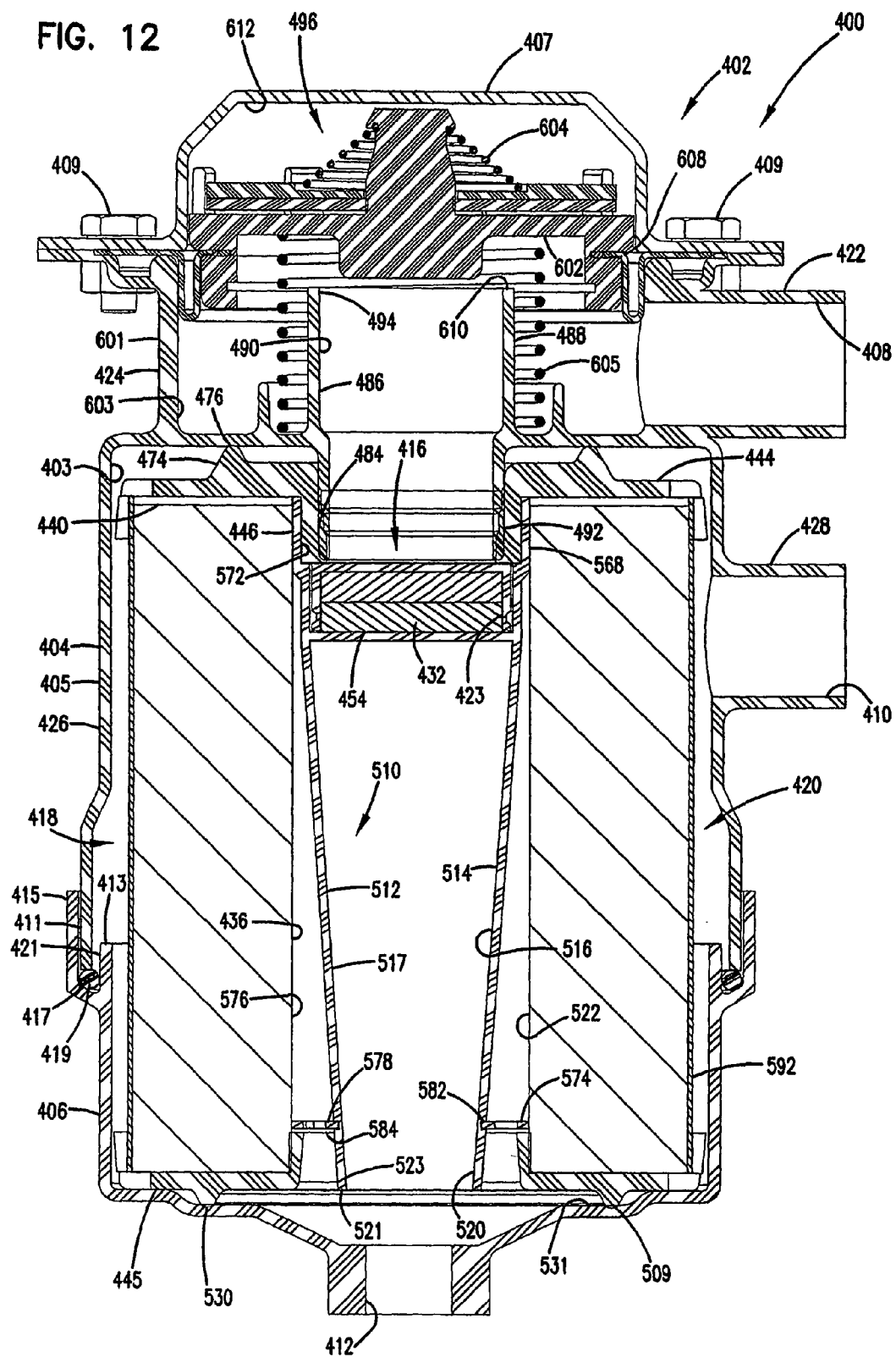
FIG. 12 is a schematic cross-sectional view of the filter arrangement depicted in FIGS. 10 and 11, and taken along the line 12-12 of FIG. 11.

Another alternative embodiment of a coalescer filter and gas cleaner arrangement is depicted in FIGS. 10-12 at 400. The gas cleaner filter arrangement 400 includes a housing 402. The depicted housing 402 has a two-piece construction.

More specifically, housing 402 comprises a body assembly 404 and a removable cover member 406. The body assembly 404 includes body 405 and lid 407.

Housing 402 includes the following four ports: gas flow inlet port 405; gas flow outlet port 410; port 412; and gas flow bypass outlet port 414. In general, and in reference now to FIG. 12, the gas cleaner filter arrangement 400 includes optional first stage coalescer filter 416 and filter media 418. In use in the arrangement shown, the port 412 acts as a liquid flow outlet port or liquid drain 412. In the arrangement shown, a liquid entrained gas stream is directed through the gas flow inlet port 408 and then through the optional first stage coalescer filter 416. At least a portion of the liquid phase is coalesced and removed from the gaseous stream by the optional first stage coalescer filter 416, when used. The liquid that is coalesced within the optional first stage coalescer filter 416 drains and exits the housing 402 through the liquid flow outlet port 412. The gas phase is directed from a flow passageway 423 in the optional first stage coalescer 416 through filter media 418. The media construction 418 provides coalescing/drainage of liquid and also removes at least a portion of solid particulates from the gas stream, and the cleaned gas stream is then directed outwardly from the housing 402 through the gas flow outlet port 410.

Figure 13:
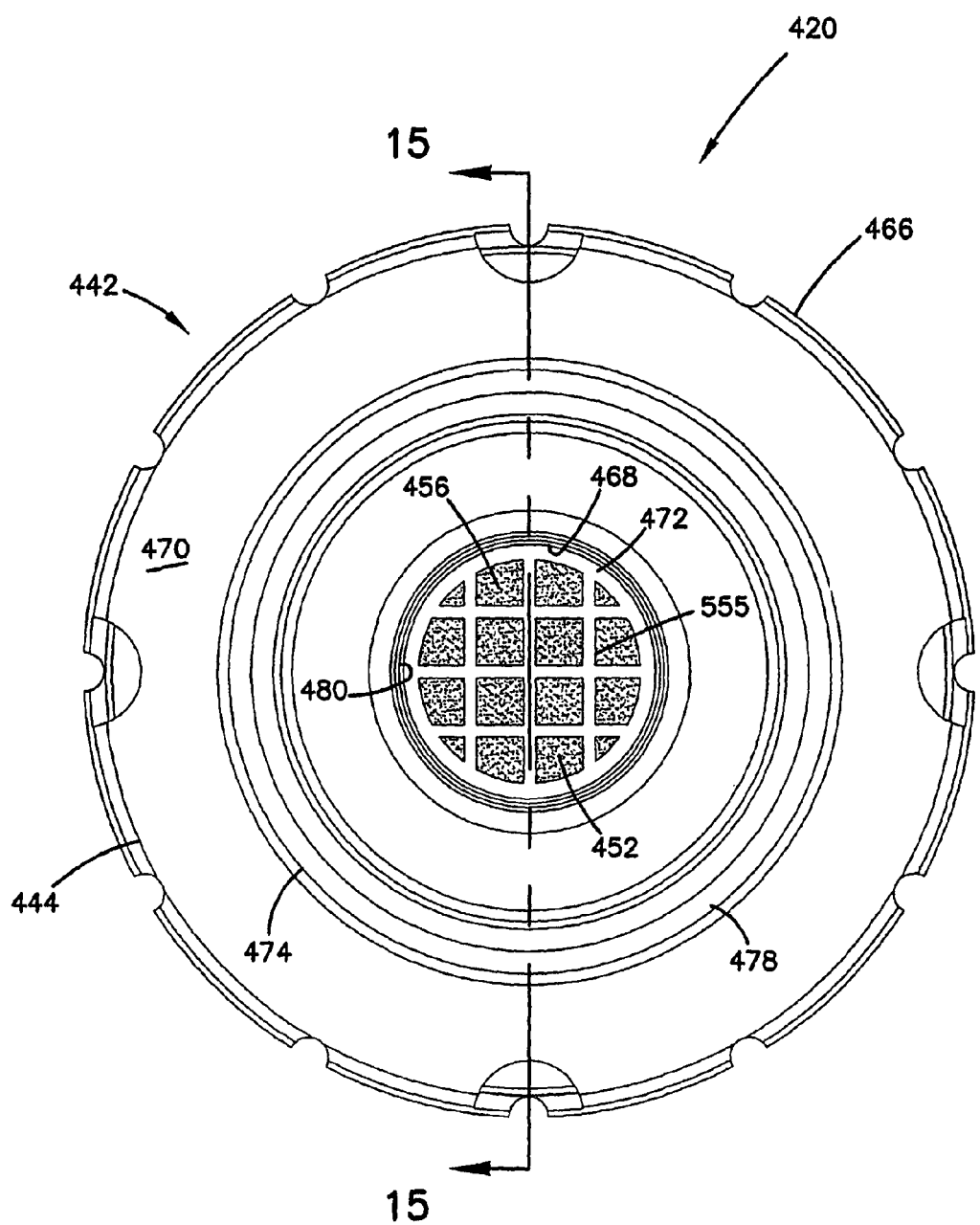
FIG. 13 is a schematic end view of one embodiment of a filter element utilized in the filter arrangement of FIGS. 10-12.
Figure 14:
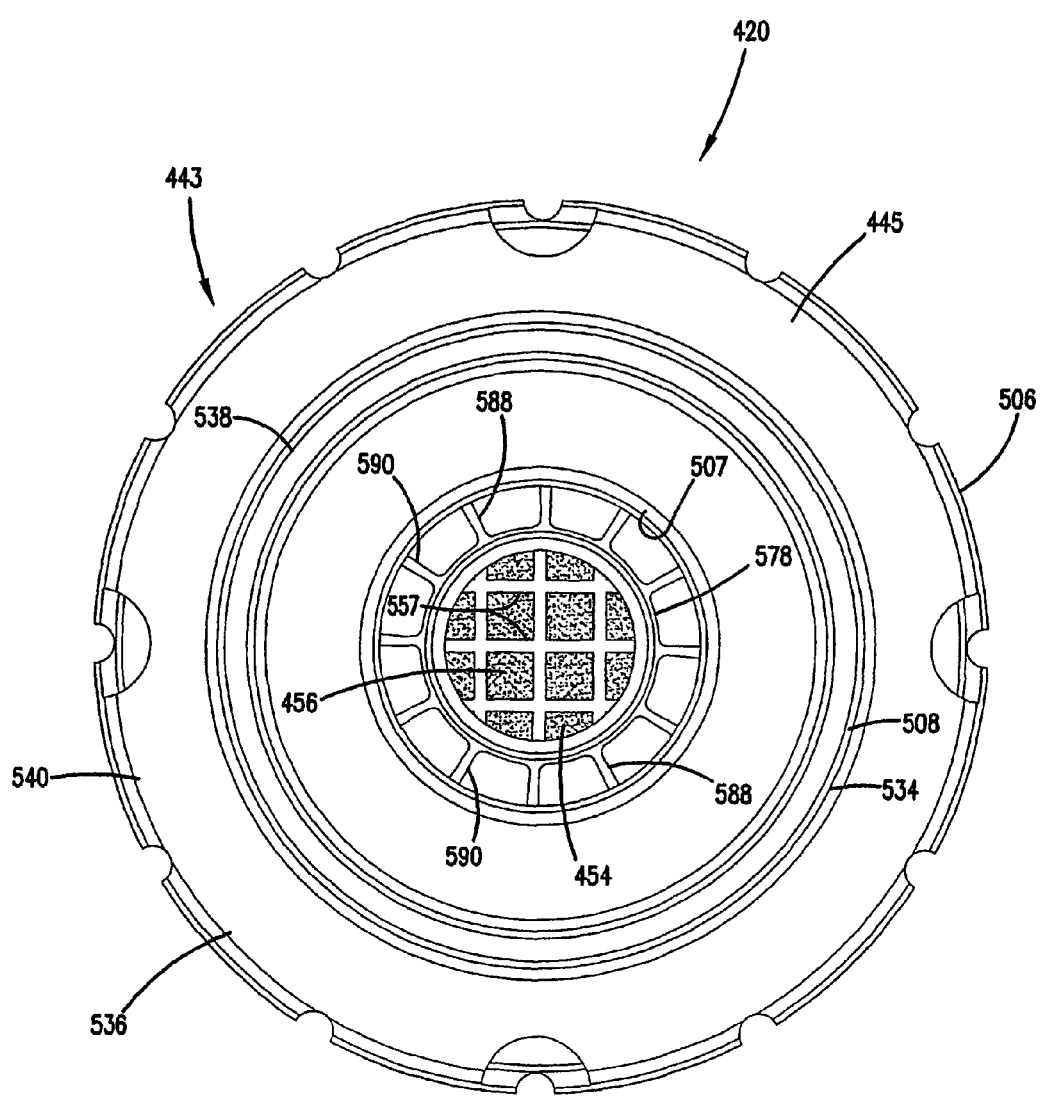
FIG. 14 is a schematic opposite end view of the filter element depicted in FIG. 13.
Figure 15:
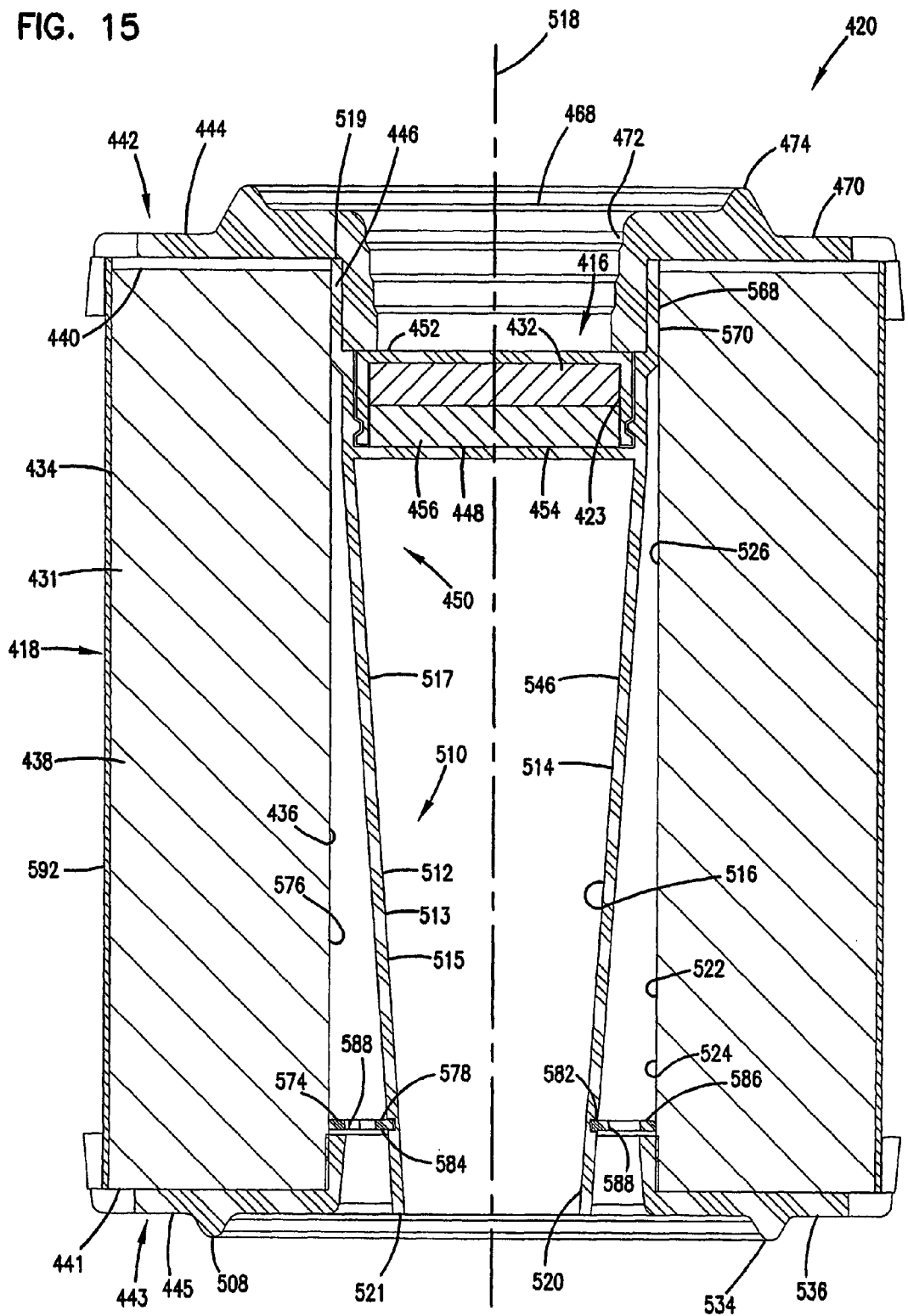
FIG. 15 is a schematic cross-sectional view of the filter element depicted in FIGS. 13 and 14, the cross section being taken along the line 15-15 of FIG. 13.

As with the embodiment depicted in FIG. 5, the optional first stage coalescer filter 416 and filter media 418 are a single, unitary construction forming a filter arrangement or element 420 (FIGS. 13-15). In preferred designs, the filter element 420 is removable and replaceable from the housing 402. As with the embodiment of FIG. 5, "unitary" means that the optional first stage coalescer filter 416 and second stage media 418 cannot be separated without destroying a portion of the element 420. In typical embodiments, the first and second end caps 444, 445 are part of the unitary construction.

In reference again to FIGS. 10 and 12, for the body assembly 404 depicted, there is an inlet tube construction 422, a valve housing 424, a canister portion 426, and an outlet tube construction 428. In the embodiment shown, each of the inlet tube construction 422, valve housing 424, canister portion 426, and outlet tube construction 428 comprise a portion of the body 405. Together with the lid 407, the body 405 and the lid 407 are part of the body assembly 404. The lid 407, in the embodiment depicted, is secured to the body 405 through selectively removable mechanical engagement, such as a bolt arrangement 409. The bolt arrangement 409 provides selective access to a regulator valve assembly 496.

The filter element 420 is constructed and arranged to be removably mountable within the housing 402. That is, the filter element 420 and the housing 402 are designed such that the housing 402 can be selectively opened in order to access the filter element 420. The filter element 420 is designed to be selectively mountable and removable from within an interior 403 of the housing 402. When the filter element 420 is oriented as shown in FIG. 12, with all of the seals (to be described below) in place, the filter element 420 is considered to be operably installed within the housing 402.

As mentioned above, the housing 402 is designed to be selectively openable in order to access the filter element 420. In the particular embodiment illustrated, the cover member 406 is secured to the body 405 through a latch arrangement 429. The latch arrangement 429 preferably selectively holds the cover member 406 tightly and securely to and against the body 405, when the latch arrangement 429 is in a locked state. In the one depicted, the latch arrangement 429 includes at least two latches 433, and in this embodiment, first and second wire latches 433.

In reference to FIG. 12, note that the body 405 and cover member 406 include a seal arrangement 421. In particular, note that the cover 406 includes a pair of opposing flanges 413, 415 defining a receiving slot 417 therebetween. The body 405 includes a flange 411 that fits in the slot 417. Typical embodiments also include an O-ring seal member 419 seated within the slot 417.

FIG. 15 depicts the filter element 420 as it would appear in an uninstalled state, that is, when it is not mounted within the housing 402. FIG. 13 shows an end view of the filter element 420, while FIG. 14 shows an opposite end view of the filter element 420. In general, filter element 420 includes optional region 432 of filter media. In the filter element 420 depicted in the drawings, the second region of filter media 431 includes a tubular extension 434 that defines a tubular open filter interior 436. The region of media 431 comprises filter media 418, when the filter element 420 is installed in the filter arrangement system 400. In certain constructions, the tubular extension of media 434 is configured to have a generally cylindrical shape, defining a circular cross-section. The second region of media 431 can be many types of media 438, including, for example, formed media. Some useable materials are described in Section VI. The region of media 431, when installed in the filter arrangement 400, provides selected coalescing/drainage and acts as a gas filter to selectively remove solid particulates and debris from the gas stream before the gas stream exits the housing 402.

In the illustrated embodiment, the media 438 has a first end 440 and an opposite second end 441. The length of the media 438, in typical embodiments, extends between the first end 440 and the second end 441. In the filter element 420 shown, at the first end 440, is a first end cap arrangement 442. In the particular one shown, the first end cap arrangement 442 includes an end cap 444 and a rigid, pre-formed insert 446 molded therein. In such constructions, the first end cap arrangement 442 is a single, unitary structure. As will be described further below, the pre-formed insert 446 includes a frame construction 450, which holds the optional first stage coalescer filter 416 in operable assembly.

Still in reference to FIG. 15, at the second end 441 of the media 438, is a second end cap arrangement 443. The second end cap arrangement 443 includes at least a second end cap 445.

As mentioned above, the filter element 420 includes at least region 431 of media. In the typical arrangement, the region of media 431 is formed media. The optional first region of media 432, in typical embodiments, is oriented in extension across the tubular extension 434 of the region of media 431 to be in gas flow communication with the open filter interior 436. By the phrase "oriented in extension across the tubular extension", it is meant that the optional first region of media 432 does not radially overlap the region of media 431 to itself form a tubular extension; rather, the optional first region of media 432 extends across and covers the end cap aperture 445. The region of media 432 may be itself embedded within the end cap 444 or be oriented adjacent to but spaced from the end cap 444 in a direction toward the end cap 445. The optional first region of media 432 is not necessarily contained within a single plane, but in typical embodiments, if used, the optional first region of media 432 is a non-tubular, non-cylindrical, generally panel construction 448. By "panel construction" it is meant that the first region of media 432 permits gas flow to maintain a generally straight path therethrough. That is, the gas flow is not required to turn a corner as it flows from an upstream face 452 to a downstream face 454.

Figure 15A:
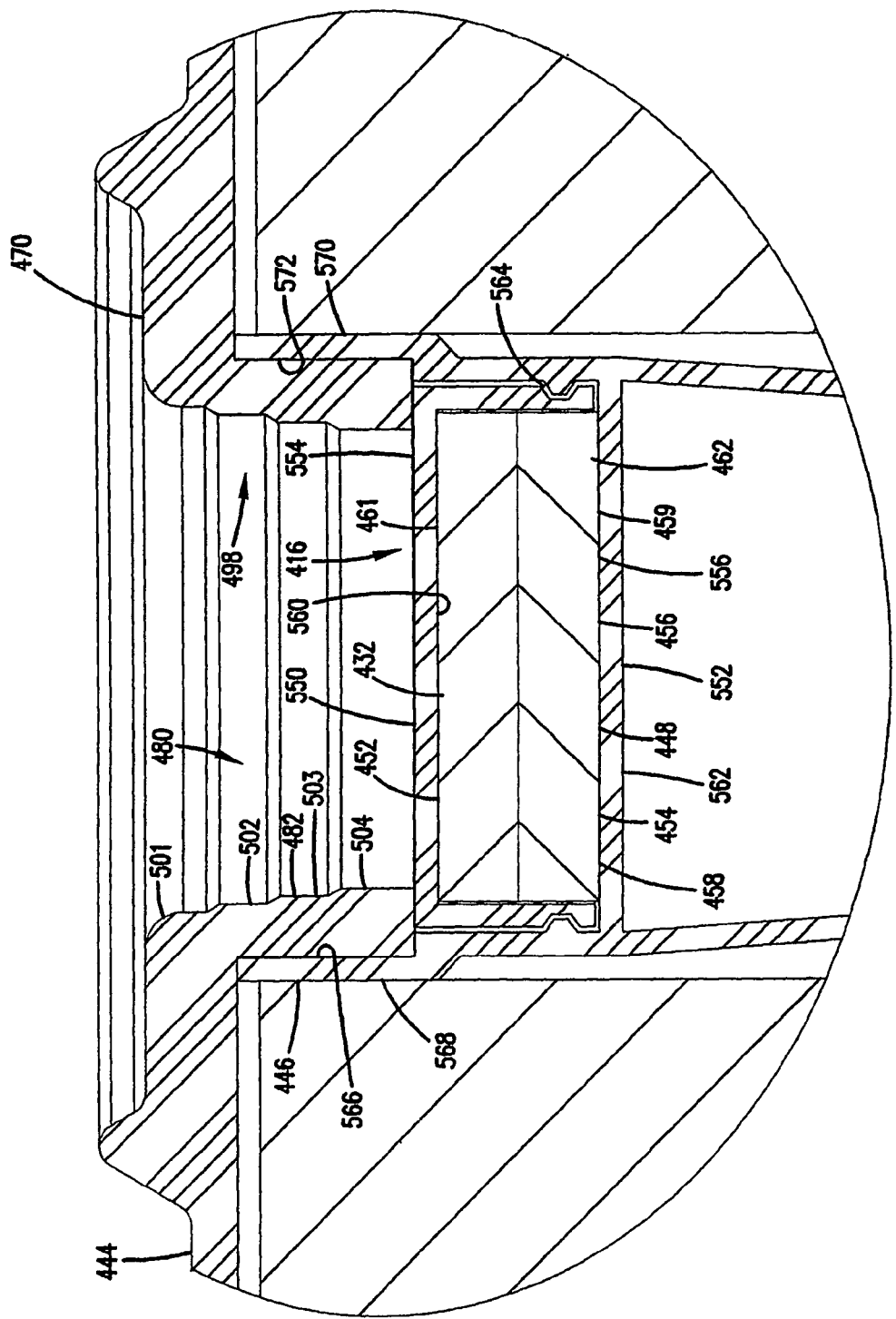
FIG. 15A is a schematic enlarged, fragmented cross-sectional view of a portion of the filter element depicted in FIG. 15.

In typical embodiments, and in reference to FIG. 15A, the optional first region of media 432 corresponds to the optional first stage coalescer filter 416. In such embodiments, the optional first region of media 432 includes fibrous media 456. In certain embodiments, the optional fibrous media 456 includes at least one layer, and sometimes, a plurality of layers 458 of a fibrous bundle of non-woven, non-pleated, non-open tubular, coalescing depth media 459. In the embodiments shown in FIGS. 12 and 15, there are two layers 461, 462 of fibrous depth media 459. Useable materials for the fibrous media 456 are described above in connection with media 224 of FIG. 5. Also, formed media as described in Section VI below can be used in region 432.

Attention is directed to FIG. 13, where the first end cap 444 is shown in plan view. In typical embodiments, the end cap 444 includes a ring 466 of a molded, polymeric material. The ring 466 defines a center aperture 468 that, in the embodiment illustrated, is centered in the ring 466, although alternatives are possible. In other words, the aperture 468 has a center of symmetry that is the same as the center of symmetry of the ring 466. In the particular embodiment illustrated, the center aperture 468 is circular. The aperture 468 functions as a gas stream inlet aperture. The aperture 468 shown is aligned (either overlapping or coaxial with) the flow passageway 423 of the first stage coalescer filter 416, although alternatives are possible.

The end cap 444 includes an axial portion 470 and an annular or radial portion 472. The aperture 468 provides for gas flow communication with the open filter interior 436. The axial portion 470 of the end cap 444 includes at least one continuous projection 474. In some embodiments, the continuous projection 474 helps to form a secondary seal 476 (FIG. 12) with the housing 402, when the filter element 420 is operably installed within the housing interior 403. In the particular embodiment illustrated in FIG. 13, the continuous projection 474 forms a circular ring 478.

The radial portion 472 of the end cap 444 forms an annular sealing portion 480. When the filter element 420 is operably assembled within the housing 402, the annular sealing portion 480 forms a seal member 482. In the preferred embodiment shown in FIG. 13, the seal member 482 is along the inner annular surface of the ring 466, to circumscribe the aperture 468, although alternatives are possible.

When the filter element 420 is operably installed within the housing 402, the seal member 482 forms a (radial) seal 484 with the housing 402. In particular, in the arrangement shown in FIG. 12, the body 405 of the housing 402 includes an internal tube 486. The tube 486 includes a rigid wall 488 that circumscribes and defines a gas flow aperture 490. When constructed as shown in FIG. 12, the wall 488 has a sealing portion 492 that is designed to extend through the aperture 468 of the end cap 444 and into the open filter interior 436. The wall 488 also has an end portion 494 that may, in certain instances, interact with valve assembly 496. The valve assembly 496, its operation, and its interaction with the wall 488 are discussed in further detail below.

In FIG. 12, it can be seen that the radial seal 484 is formed against the sealing portion 492 of the tube 486. In preferred embodiments, the radial seal 484 is formed by compression of the material of the first end cap 444 between and against the sealing portion 492 of the tube 486 and the pre-formed insert 446 embedded within the end cap 444. In this context, by "between and against" it is meant that the material of the first end cap 444 extends transversely the distance between the sealing portion 492 of the tube 486 and the pre-formed insert 446, and is compressed in dimension due to the rigidity of portion 492 and insert 446.

In reference now to FIG. 15A, the annular sealing portion 480, in the particular embodiment illustrated, includes an optional stepped construction 498. The stepped construction 498 helps with the insertion and formation of the radial seal 484 between the end cap arrangement 442 and the sealing portion 492 of the housing 402. In the embodiment illustrated, the stepped construction 498 includes a plurality of regions of decreasing diameters, extending from the axial portion 470 of end cap 444 to the upstream face 452 of the fibrous media 456. In FIG. 15A, the stepped construction 498 includes a first region of largest diameter 501, adjacent to a second region 502 of a diameter smaller than the first region 501, adjacent to a third region 503 of a diameter smaller than that of the second region 502, adjacent to a fourth region 504 smaller than that of the third region 503. This stepped construction 498 of decreasing diameters results in sealing portion 480 that helps with the insertion of the filter element 420 into the housing 402 and the formation of the radial seal 484.

The sealing portion 480 of the end cap 444 can be made from a compressible material, such that there is radial compression of the sealing portion 480 against the sealing portion 492 of the tube 486 of the housing 402. In general, typical end caps 444 comprise a soft, polyurethane foam having an as-molded density of about 10-22 pounds per cubic foot. One usable material is described above in connection with the sealing portion 410; another usable material is described further below.

Referring again to FIG. 12, the filter arrangement 400 includes a flow construction arrangement 510 oriented to direct fluid, such as coalesced liquid, for example from the optional first region of media 432, toward the liquid flow outlet 412. In general, the flow construction arrangement 510 preferably includes a tube 512 formed by a section 513 of impervious, continuous, uninterrupted wall 514 surrounding and defining an open, fluid passage 516. In such embodiments, the tube 512 extends from the downstream face 454 of the optional first stage coalescer filter 416 at least partially in a direction toward the second end cap 445. In preferred embodiments, the tube 512 extends a complete distance between the downstream face 454 and the second end cap 445. In the particular arrangement depicted, the tube 512 forms an aperture 520, preferably a fluid exit aperture 523, at the end 521 of the wall 514 adjacent to the second end cap 445. In this manner, in this particular arrangement, some liquid that is coalesced is allowed to collect along the interior 517 of the tube 512 and drip by gravity to the liquid flow outlet port 412. Alternate drain arrangements are also usable. In the depicted embodiment, the entire wall 514 includes the imperforate section 513, in other embodiments, only portions of the wall 514 will be imperforate.

In the embodiment of FIG. 8, the flow construction arrangement 284 was depicted in the drawing as being generally straight, and unangled. In the embodiment of FIGS. 12 and 15, the flow construction arrangement 510 is depicted as a conical section 515 having asloped or tapered wall 514. In typical constructions, the angle of taper on the wall 514 will be adjusted depending upon the overall length of the element 420. That is, in typical constructions, the size of the aperture 468 generally remains fixed. As the length of the media 438 becomes greater, the length of the overall element 420 becomes greater, and the angle or taper of the wall 514 decreases. In some arrangements, the angle of taper, as measured from a longitudinal axis 518 (FIG. 15) passing through the symmetrical center of the element 420, is at least 1° extending from end 519 (adjacent to the coalescer filter 416) to end 521. In some arrangements, the angle of taper can be 2-15°, and typically less than 45°. The taper or angle on the wall 514 helps to direct the coalesced liquid in the direction of the fluid exit aperture 520 and ultimately through the liquid flow outlet port 412.

After passing through the first stage coalescer filter 416, the gas flows through the fluid passageway 516, out through exit aperture 520, and then into a gas flow plenum 522. The gas flow plenum 522 is formed between the wall 514 of the tube 512 and the media 438. The taper on the wall 514 causes the gas flow plenum 522 to be angled between a volume 524 adjacent to the second end cap 445 and a volume 526 adjacent to the first end cap 444 that is smaller than volume 524.

In reference now to FIG. 14, the depicted second end cap 445 includes a ring 506 defining a center aperture 507. The aperture 507 allows for the passage of some collected liquid to exit the filter element 420, in the particular system depicted in FIG. 12. The end cap 445 supports a sealing arrangement 508 for forming a seal 509 (FIG. 12) with the housing 402. In the embodiment illustrated in FIG. 12, the particular seal 509 depicted is an axial seal 530 formed between the filter element 420 and an inner sealing surface 531 of the cover member 406. In such embodiments, the sealing arrangement 508 includes a projection 534 extending or projecting in an axial direction from a generally flat, planar portion 536 of the second end cap 445. In some embodiments, the projection 534 forms a continuous ring 538. Typically constructions include the end cap 445 and the projection 534 being a single, unitary, molded construction 540. In some embodiments, the end cap construction 540 is made from a polymeric material, preferably, a compressible polymeric material such as polyurethane. In some embodiments, the second end cap 445 is made from the same material as the first end cap 444. The axial seal 530 helps to prevent gas from the inlet port 408 from bypassing the optional first stage coalescer filter 416 and the second stage construction of filter media 418. The axial seal 530 also helps to prevent the seepage of liquid such as oil from passing to the downstream side of the filter media 418.

As mentioned above, the first end cap arrangement 442 includes pre-formed insert 446. In the embodiment depicted in FIGS. 12 and 15, the pre-formed insert 446 includes optional frame construction 450 for holding and encapsulating the optional fibrous media 456. The frame construction 450 is now further described. In reference to FIG. 15, the particular frame construction 450 depicted is a multi-piece construction 546. In the embodiment shown in FIG. 15A, the multi-piece construction 546 includes at least a first frame piece 550 and a second frame piece 552. The first frame piece 550 includes a support grid 554 in covering relation to the upstream flow face 452 of the optional fibrous media 456. Typically, the support grid 554 is a porous, mesh screen 555 (FIG. 13) that permits gas flow, including gas entrained with liquid, to flow therethrough and across the optional coalescer media 456. The screen 555 also provides structural support to the optional fibrous media 456.

Similarly, the second frame piece 552 includes a support grid 556 supporting and in covering relation to the downstream flow face 454 of the optional fibrous media 456. The support grid 556 includes a porous, mesh screen 557 (FIG. 14) and provides structural support for the optional fibrous media 456 while permitting gas and coalesced liquid to pass therethrough and into the fluid passageway 516 of the flow construction arrangement 510.

In the arrangement shown, the first frame piece 550 and the second frame piece 552 are oriented adjacent to each other to form a retaining pocket 560 between the screen 555 and the screen 557 to form a housing 562 that holds or encapsulates the optional fibrous media 456. In such embodiments, the first frame piece 550 and the second frame piece 552 mechanically engage, for example, through interlock structure such as a snap engagement 564.

In such embodiments, the pre-formed insert 446 forming the frame construction 450 can be molded or embedded within the polymeric end cap 444 along an inner annular region 566 of ring 568. Ring 568, in the embodiment depicted in FIGS. 12 and 15, is integral with and the same piece as the second frame piece 552. The ring 568 generally comprises a surrounding wall 570 in projection or extending from screen 555 to the first axial end 440 of the media 438. As can be seen in FIG. 15A, the wall 570 forms a rigid, backstop a to the compression of the end cap material in the sealing portion 480. That is, in such constructions, the radial seal 484 is formed by compression of the sealing portion 480 between and against the backstop 572 and the sealing portion 492 of the wall 488. Alternate seal arrangements are possible.

As also can be appreciated from reviewing FIGS. 12, 15 and 15A, typical embodiments include the tube 512 of the flow construction arrangement 510 as an integral, unitary part of the second frame piece 552. As such, in the embodiment illustrated in FIGS. 12 and 15, the particular second frame piece 552 shown, extends from the end 440, which forms the backstop 472, along the length of the media 438, to the end 521 forming the exit aperture 520.

Still in reference to FIGS. 12 and 15, such frame constructions also include a support ring or frame 574. The support frame 574 helps to center the frame construction 450 and to hold the frame construction 450 evenly within the open filter interior 436. The support frame 574 can be a variety of arrangements and constructions that provide for structural rigidity between the tube 512 and an inner perimeter 576 of the media 438. In the particular one depicted in FIGS. 12, 14 and 15, the support frame 574 includes a ring construction 578. The ring construction 578 depicted mechanically engages the wall 514 adjacent to the end 521, such as by a snap engagement 582. The ring construction 578 depicted includes at least an inner ring 584, which engages the wall 514, and an outer ring 586, which may touch or be close to the inner perimeter 576 of the filter media 418. The inner ring 584 and outer ring 586 define a plurality of gas flow apertures 588 therebetween, separated by a plurality of spokes or ribs 590. The ribs 590 provide for structural support and integrity of the ring construction 578. The gas flow apertures 588 allow for the passage of gas from the optional first stage coalescer filter 416 to the filter media 418. That is, after the gas flow has passed through the optional first stage coalescer filter 416 and through the fluid passage 516, it flows through the fluid exit aperture 520, turns a corner (about 180°) around the end 521 of the wall 514 and flows through the plurality of apertures 588 into the gas flow plenum 522. From there, the gas flows through the tubular of media 434.

In certain embodiments, the filter element 420 will also include an outer support 592, such as a liner 594. In such arrangements, the support 592 will extend between the first and second end caps 444, 445, and help to hold or provide support to the media 438. In some embodiments, the liner 594 includes expanded metal. In many arrangements, the liner 594, as well as the other parts of the element 420, will be non-metallic (at least 98% non-metallic, and preferably 100% non-metallic material). In alternate embodiments, instead of a liner 594, the media 438 will include a support band or roving. In some arrangements, the outer liner 594 is avoided.

As mentioned above, the filter arrangements 400 include valve assembly 496. In the embodiment illustrated in FIG. 12, the valve assembly 496 provides both a regulator valve function and a bypass valve function. The regulator valve function is first described. The valve housing 424 includes an outer surrounding wall 601 defining an open interior 603, where the gas be treated, which flows from the engine crankcase through the inlet port 408, is allowed to flow and collect before passing into the filter element 420. In the illustrated valve assembly 496, there is a diaphragm 602 and a biasing mechanism, such as spring 605. In such typical embodiments, the diaphragm 602 is generally circular that is held by and rests upon a shelf 608. The shelf 608 is supported between the lid 407 and valve housing 424. Note that in the embodiment illustrated, there is a gap 610 between the diaphragm 602 and the end portion 494 of the tube 486. The gap 610 allows for gas flow from the interior 603 of the valve housing 424 and into the gas flow aperture 490 of the tube 486. During operation, the spring 605 and the diaphragm 602 regulate flow into the tube 486.

The valve construction 496 also includes a bypass valve function. As the media in the filter element 420 becomes occluded and restriction increases to an unacceptably high level, pressures within the interior 603 of the valve housing 424 increase. This applies pressure against the diaphragm 602 and against the spring 604, until the gas is allowed to flow into an interior volume 612 defined by the lid 407. The gas then flows through the gas flow bypass outlet port 414 (FIG. 10).

Example Operation and Service

In operation, the depicted filter arrangement 400 works as follows. Blow-by gases from an engine crankcase are taken in through the gas flow inlet port 408. The gases pass into the interior 603 of the valve housing 424. The valve assembly 496 permits passage of the gas and into the gas flow aperture 490. From there, the gas passes through the optional first stage coalescer filter 416.

The gas flow passes through the upstream face 452, through the optional fibrous media 456, and out through the downstream face 454. The optional fibrous media 456 separates a portion of liquids from the rest of the gas stream. The liquid flows out of the optional media 456 and, in the depicted embodiment, either drips directly into the liquid flow outlet port 412, or drains along the wall 514 of the flow construction arrangement 510. After passing through the liquid flow outlet port 412, the liquid, which is often oil, may be directed back into the crankcase for reuse.

The gas stream including liquid that is not coalesced by the optional first stage coalescer filter 416 flows through the fluid passage 516, through the exit aperture 520, around the end 521 of the wall 514 (making about a 180° turn) and into the gas flow plenum 522. From the gas flow plenum 522, the gas flows through the filter media 418, which provides selected coalescing/drainage of liquid particulates and which selectively removes solids from the gas stream. The gas flow is prevented from bypassing the media 418 due to the radial seal 484 and axial seals 530, 476, although alternate seal arrangements are possible. The cleaned gas then flows downstream from the second stage filter media 418 out through the gas flow outlet port 410. From there, the gases may be directed to the turbo of the engine, into another intake or to the atmosphere.

The filter arrangement 400 is serviced as follows. The cover member 406 is removed from the body assembly 404 by disengaging the latches 433. When the cover member 406 is removed from the body assembly 404, the axial seal 530 is released. The filter element 420 is exposed, projecting out of the body 405. The filter element 420 can then be grasped and pulled from the body 405. This releases the radial seal 484. Removing the filter element 420, of course, removes both the optional first stage coalescer filter 416 (is present) and the media construction 418. The entire filter element 420 may be disposed. In many embodiments, the filter element 420 is constructed of at least 99% non-metallic materials, such that the filter element 420 is incineratable.

A second, new filter element 420 may than be installed. The new filter element 420 is installed within the housing 402 by putting the element 420 through the opening exposed by the removed cover member 406. The aperture 468 of the end cap 444 is oriented around the inlet tube 486, and slid laterally relative to the body 405 until the radial seal 484 is in place. Often, this is also when the projection 474 axially abuts the body interior 405 and forms an axial seal 476.

The cover 406 is than oriented over the exposed end of the filter element 420. The latches 433 are engaged, to operably secure the cover member 406 to the body 405. This also axially compresses the cover 406 against the element 420, and the axial seal 530 is formed.

IV. The Embodiment of FIGS. 16-21

An alternative embodiment of a pre-formed insert is shown in FIGS. 16-20, generally at 650. The insert 650 is usable in the filter element 420 in place of the insert 446. The insert 650 lends itself to convenient manufacturing techniques and may be preferred, in certain applications.

In general, the insert 650 preferably includes a frame construction 652; a flow construction arrangement 654; and a support ring or frame 656. These parts function analogously to the frame construction 450, flow construction arrangement 510, and support frame 574 described in connection with FIG. 15.

The flow construction arrangement 654 includes a tube 660 formed by uninterrupted wall 662 surrounding and defining an open, fluid passage 664. The wall 662 includes a wall section 663 that is impervious. In the depicted embodiment, the entire wall 662 includes impervious wall section 663. In other embodiments, the wall 662 may include sections that are permeable to fluid. The wall 662 has an interior surface 666, which permits certain coalesced liquid to slide and drip to a liquid outlet port. The wall 662 defines an exit aperture 668, at an end 670 of the tube 660. In many applications, the exit aperture 668 allows both gas and liquid to exit therethrough. For example, in some applications, the exit aperture 668 allows the collected liquid to exit the tube 660 and flow into an appropriate liquid outlet port.

As with the embodiment of FIGS. 12 and 15, the wall 662, in typical such arrangements is a conical section 667, being sloped or tapered from inlet end 663 of the wall 662 to exit end 670. That is, in such embodiments, when the tube 660 has a circular cross-section, the diameter at the inlet end 663 is larger than the diameter at the outlet end 670. In many arrangements, the diameter at the inlet end 663 will be on the order of at least 0.5%, no greater than 25%, and typically 1-10% larger than the diameter at the end 670.

Figure 16:
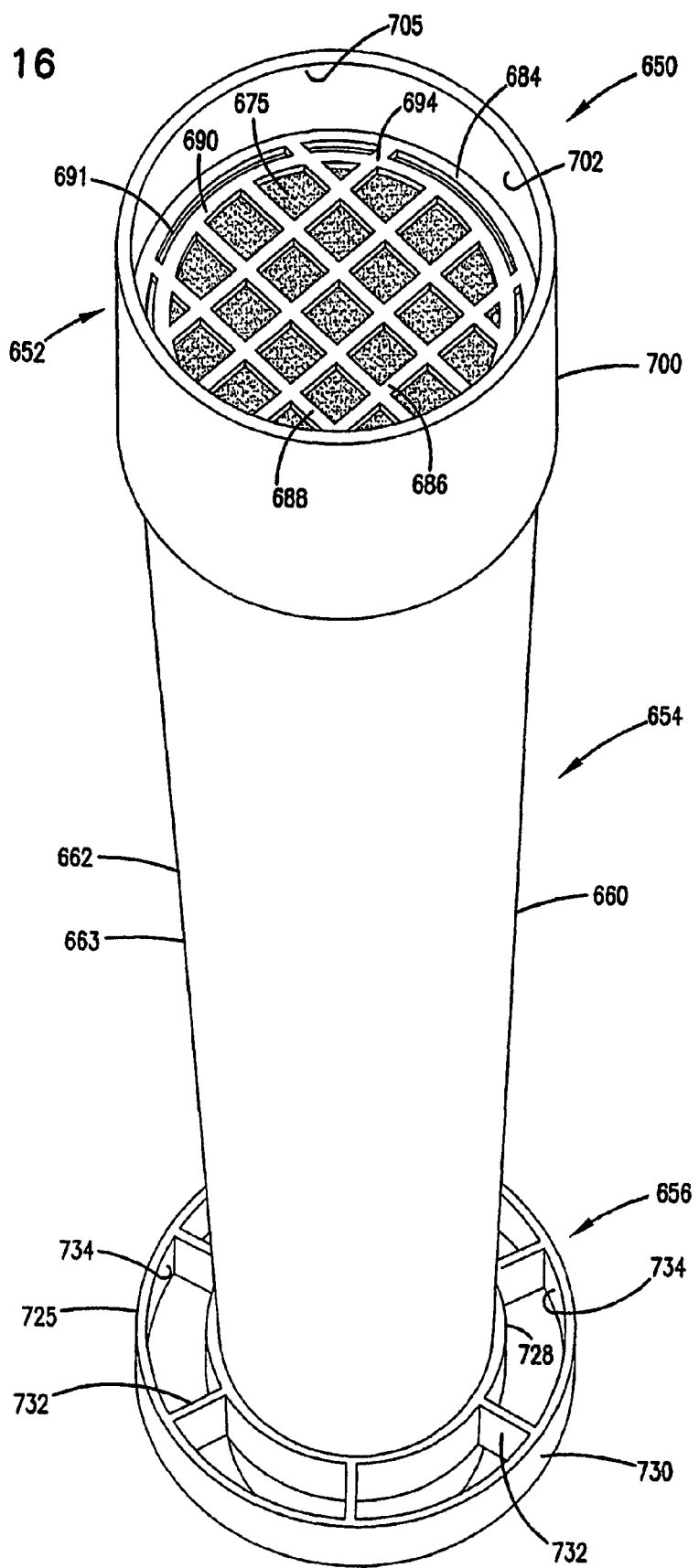
FIG. 16 is a schematic perspective view of an alternative embodiment of a pre-formed insert that may be utilized within the filter element depicted in FIGS. 13-15.
Figure 19:
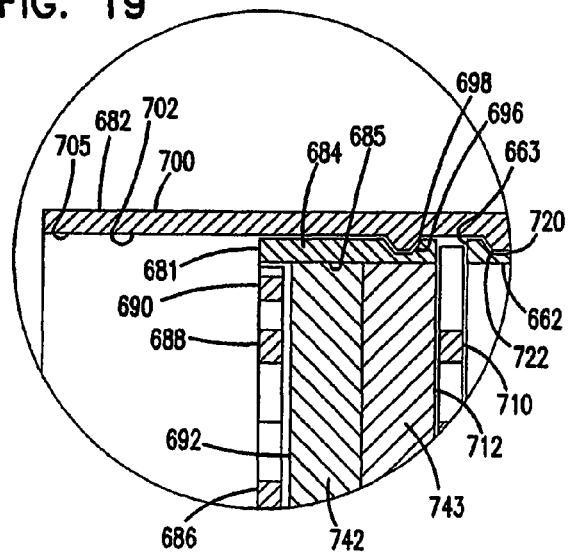
FIG. 19 is a schematic enlarged, cross-sectional view of a portion of the pre-formed insert shown in FIG. 18.
Figure 18:
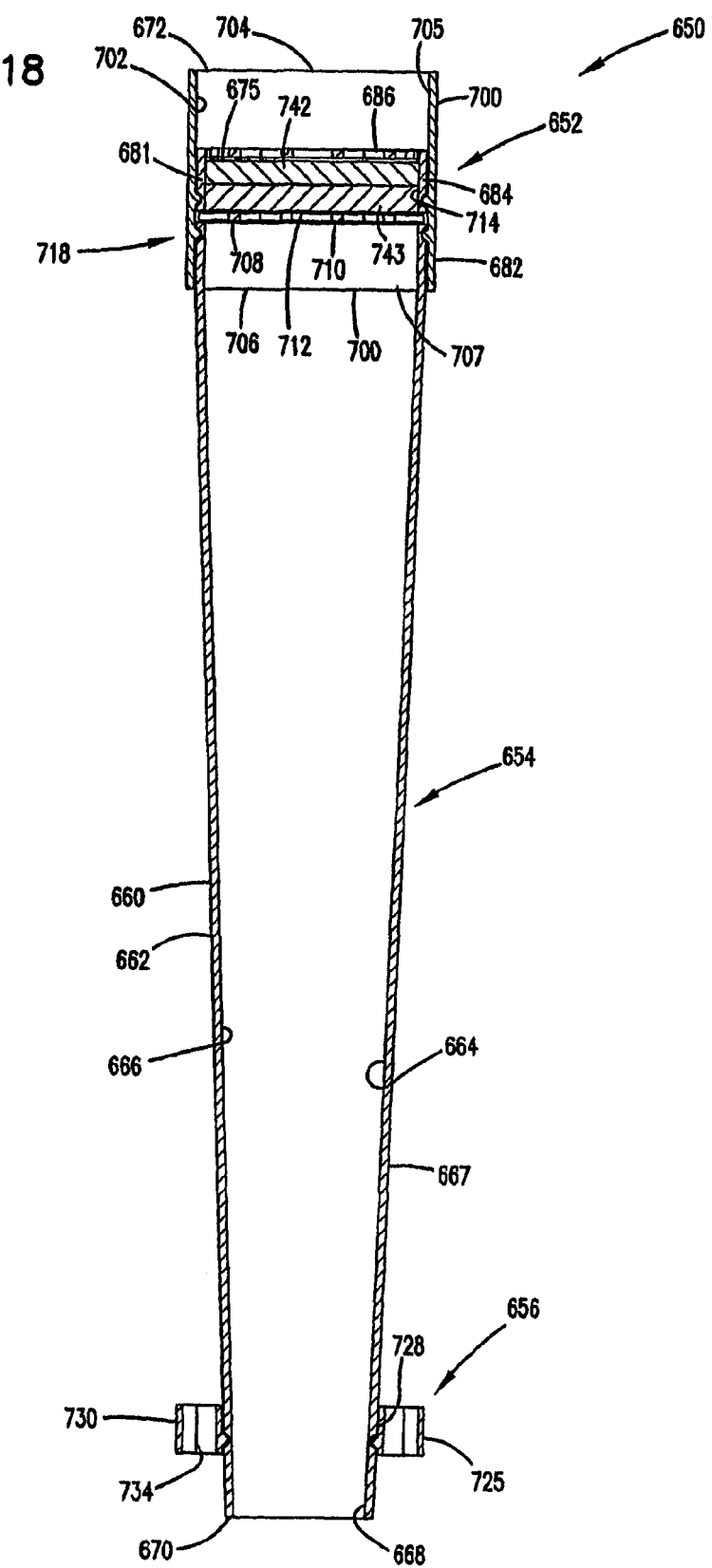
FIG. 18 is a schematic cross-sectional view of the pre-formed insert depicted in FIGS. 16 and 17, the cross section being taken along the line 18-18 of FIG. 17.

Still in reference to FIGS. 16 and 18, optional frame construction 652 is provided for holding and encapsulating optional coalescing media 675. The frame construction 652 in this embodiment, is different from the frame construction 450 described above. In this particular embodiment, there is a first frame piece 681 and a second frame piece 682. The first frame piece has a wall or an outer annular rim 684 defining an inner volume 685 (FIG. 19). Axially spanning across one end of the rim 681 and integral with the wall 684 is a support grid 686, for example in the form of a porous, mesh screen 688. The screen 688 provides structural support to the optional media 675 and permits gas flow to reach the optional media 675.

Figure 17:
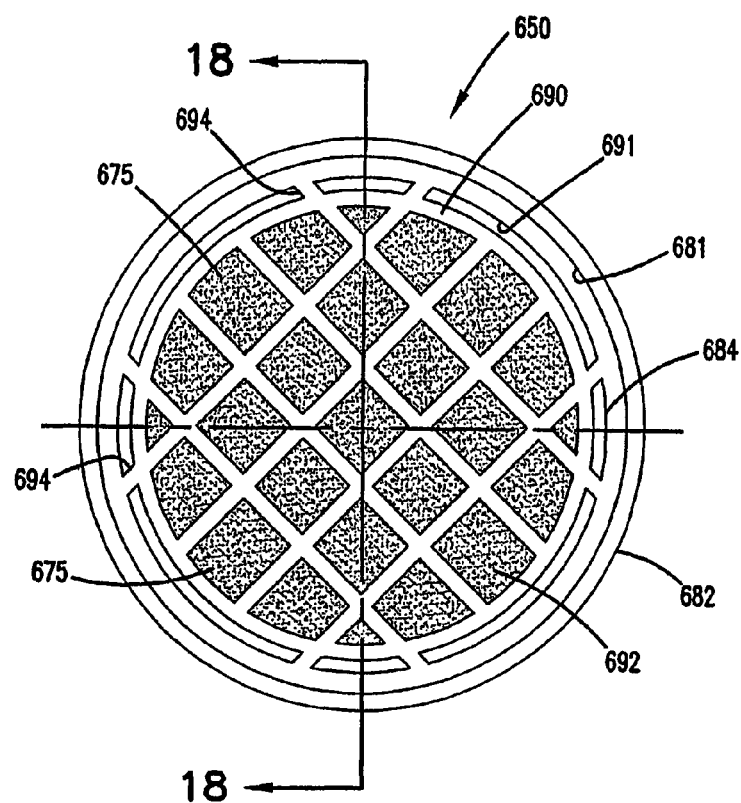
FIG. 17 is a schematic end view of the pre-formed insert depicted in FIG. 16.

The first frame piece 681 also includes an inner rim 690, spaced adjacent to the outer rim 684. The inner rim 690 helps to prevent the flow of polyurethane end cap material from blocking upstream face 692 of the optional media 675. (Example molding techniques, and the function of the rim 690, are described further below.) As can be seen in FIGS. 16 and 17, the inner rim 690 is connected to the outer rim 684 with a plurality of ribs 694. The rim 690 is spaced, typically, no greater than 5 millimeters from the outer rim 684 to form end cap material (e.g. polyurethane) flow passages 691 therebetween.

The wall or rim 684 preferably defines a recess 696 (FIG. 19) for engaging and receiving a mating detent 698. The detent 698 is part of the second frame piece 682, in the particular preferred embodiment illustrated. The detent 698, recess 696 provides for convenient, quick assembly and permits the first and second frame pieces 681, 682 to be snapped together. Of course, many other embodiments of mechanical engagement between the first and second frame pieces 681, 682 are possible.

The second frame piece 682 includes an annular wall 700 surrounding and defining an open volume 702. In the particular embodiment illustrated, the wall 700 has a generally circular cross-section, which may be constant (to form a cylinder) or somewhat tapered to conform to the optional taper of the wall 662. The second frame piece wall 700 includes first and second opposite ends, 704, 706. In the embodiment illustrated, the end 704 generally corresponds to an inlet end 672.

Second frame piece 662 also preferably includes a support grid 708 spanning the open volume 702 and integral with the wall 700. Typically, the grid 708 comprises a screen 710. The screen 710 provides structural support to the optional coalescing media 675 and preferably engages and holds the downstream face 712 of the media 675.

The first and second frame pieces 681, 682 form an interior volume or retaining pocket 714 to hold, entrap, and encapsulate the optional coalescing media 675. When present, the media 675 is typically mechanically compressed within the pocket 714, such that the grid 686 engages the upstream face 692 and the grid 708 engages the downstream face 712. As described above, the wall 700 includes a plurality of projections or detents 678 extending or projecting internally into the volume 702 to engage or snap into the recess 696.

The second frame piece 682 also includes mechanical engagement structure to securably attach to the wall 662 of the tube 660. In particular, the second frame piece and the tube 660 also includes mechanical engagement structure, such as a detent/recess engagement 718. In the particular way shown in FIG. 19, the wall 700 includes a second plurality of projections 720 extending or projecting into the interior volume 702, while the wall 662 has a recess 722 sized to receive the detents or projections 720. In this manner, the second frame piece 682 easily snaps and interlocks with the tube 660.

Still in reference to FIGS. 16 and 18, preferred frame constructions 652 also include support ring or frame 656. The support frame 656 is analogous to the support frame 574, described above. As such, the support frame 656 helps to center the frame construction 652 and hold it evenly within an open filter interior. The support frame 656, in the one depicted, includes a ring construction 725 having at least an inner ring (728) and an outer ring 730. The inner ring 728 and the outer ring 730 are preferably joined by a plurality of spokes or ribs 732. Between the inner rings 728 and outer ring 730, the ring construction 725 defines a plurality of gas flow passageways 734.

Figure 20:
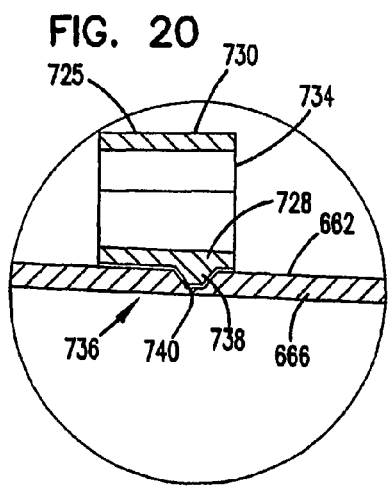
FIG. 20 is a schematic enlarged, cross-sectional view of another portion of the pre-formed insert depicted in FIG. 18.

Attention is directed to FIG. 20. The ring construction 725 and the tube 660 are constructed and arranged to permit convenient manufacturing and assembly. In particular, the ring construction 725 and the tube 660 are configured to be secured together, such as by a mechanical engagement arrangement 736. The mechanical engagement arrangement 736 is analogous to those detent/recess arrangements described above. In particular, the inner ring 728 includes a plurality of projections or detents 738 extending radially internally of the ring 728. The wall 662 defines a recess 740 to accommodate the projections 738. In this manner, the support frame 656 can conveniently and mechanically engage or snap into place with structural integrity with the wall 662 of the tube 660.

The preformed insert 660 may be assembled as follows. The tube 660, the ring construction 725, and the first and second frame pieces 681, 682 are provided, for example through injection molding techniques. The optional media 675 is provided and can include more than one layer; as shown in FIG. 18, the optional media 675 is two layers 742, 743 of depth media.

The second frame piece 682 is oriented with respect to the tube 660, such that the opening 707 defined by the wall 700 at the second end 706 is placed over an open end 663 of (FIG. 19) of the wall 662 of the tube 660. The second frame piece 682 and the tube 660 are mechanically secured together through, for example, the mechanical engagement 718 of the projection 720 and recess 722. The two layers 742, 743 of optional media 675 are oriented over the screen 710 of the second frame piece 682. After the optional depth media 675 is placed within the volume or pocket 714, the first frame piece 681 is secured in position. In particular, the outer rim 684 is radially aligned with and inserted through the open end 705 defined by the wall 700 at the first end 704. The first frame piece 681 moves with respect to the second frame piece 682 along the interior of the wall 700, until the first and second frame pieces 681, 682 are secured together in mechanical engagement through the detent 698 and recess 696 arrangement.

It should be noted that the first and second frame pieces 681, 682 can be secured together with the optional fibrous bundle of media 675 trapped therebetween before the second frame piece 682 is secured to the tube 660.

The ring construction 725 is secured to the tube 660 by sliding the end 670 of the tube through the interior of the inner ring 728 and snapping the pieces together through the mechanical engagement arrangement 736. Of course, the ring 725 and the tube 660 may be secured together at any point during the assembly process.

In some arrangements, the assembled pre-formed insert 650 may then be secured to the remaining portions of the filter element 420 through, for example, molding techniques that are described further below.

In FIG. 21, a filter element 800 is shown in cross-section with the insert 650 installed therein. It should be understood that, other than the insert 650, the filter element 800 can be constructed identically to the filter element 420. As such, the element 800 includes the optional first stage coalescer filter media 844, the filter media construction 846, a first end cap 856, and an opposite, second end cap 858. Because the element 800 includes the insert construction 650, it includes tube 660, media 675, first frame piece 681, second frame piece 682, ring construction 725, and two layers of optional depth media 742, 743, each as described above.

Also as described above with respect to the filter element 420, the end cap 856 includes an inner, annular sealing portion 864, which forms a seal, preferably a radial seal with portions of an inlet tube. The end cap 858 is also configured analogously to the end cap 445 of FIG. 15, including a projection 870, which forms a seal, preferably an axial seal with a service cover. The media construction 846 includes media 878 such as formed media described below in Section VI, extending between the end caps 856, 858. The media 878 defines an open tubular interior 879.

V. Molding Techniques

Figure 22:
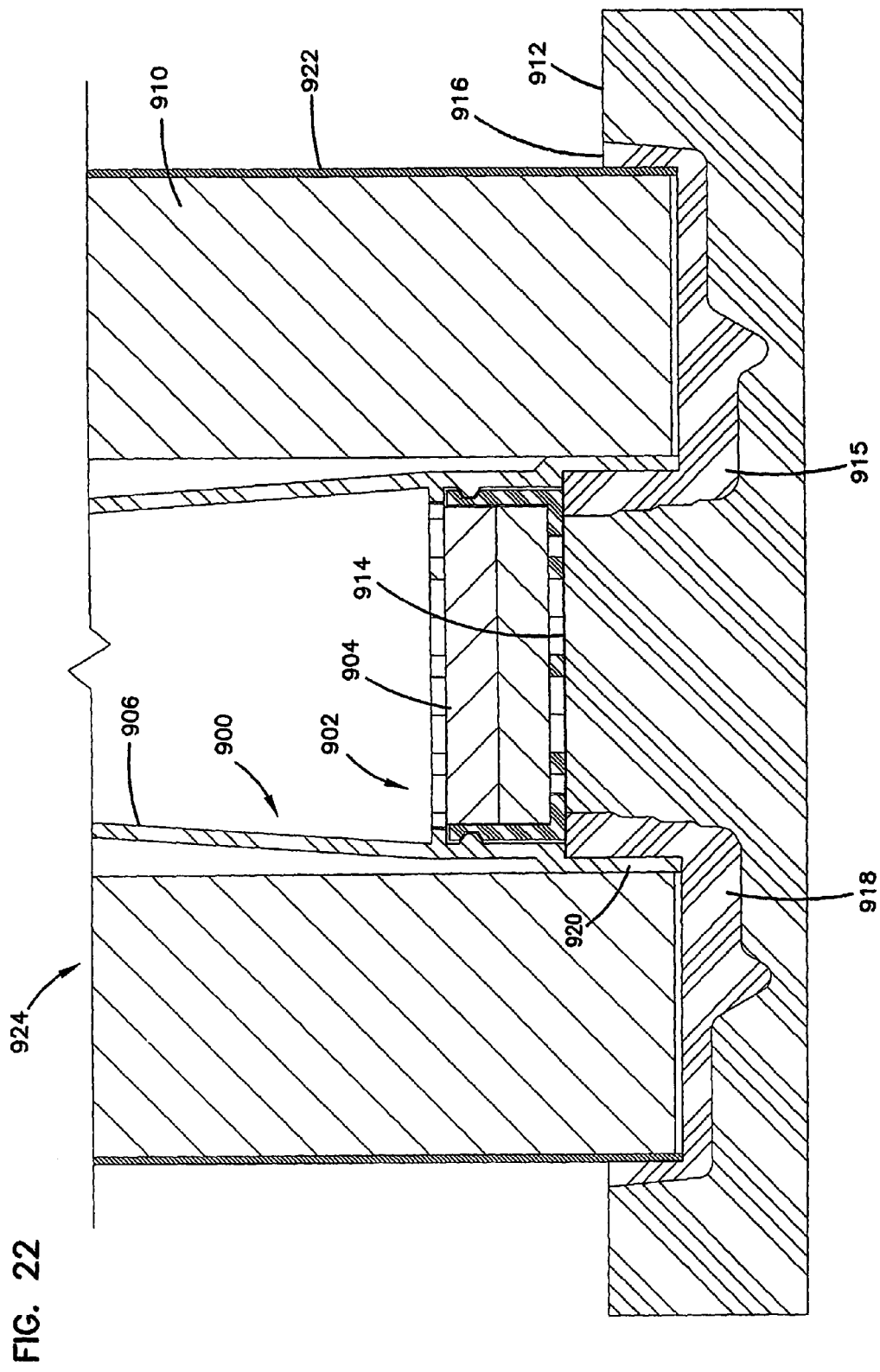
FIG. 22 is a schematic, cross-sectional view of one embodiment of a molding technique for constructing filter elements according to this disclosure.
Figure 23:
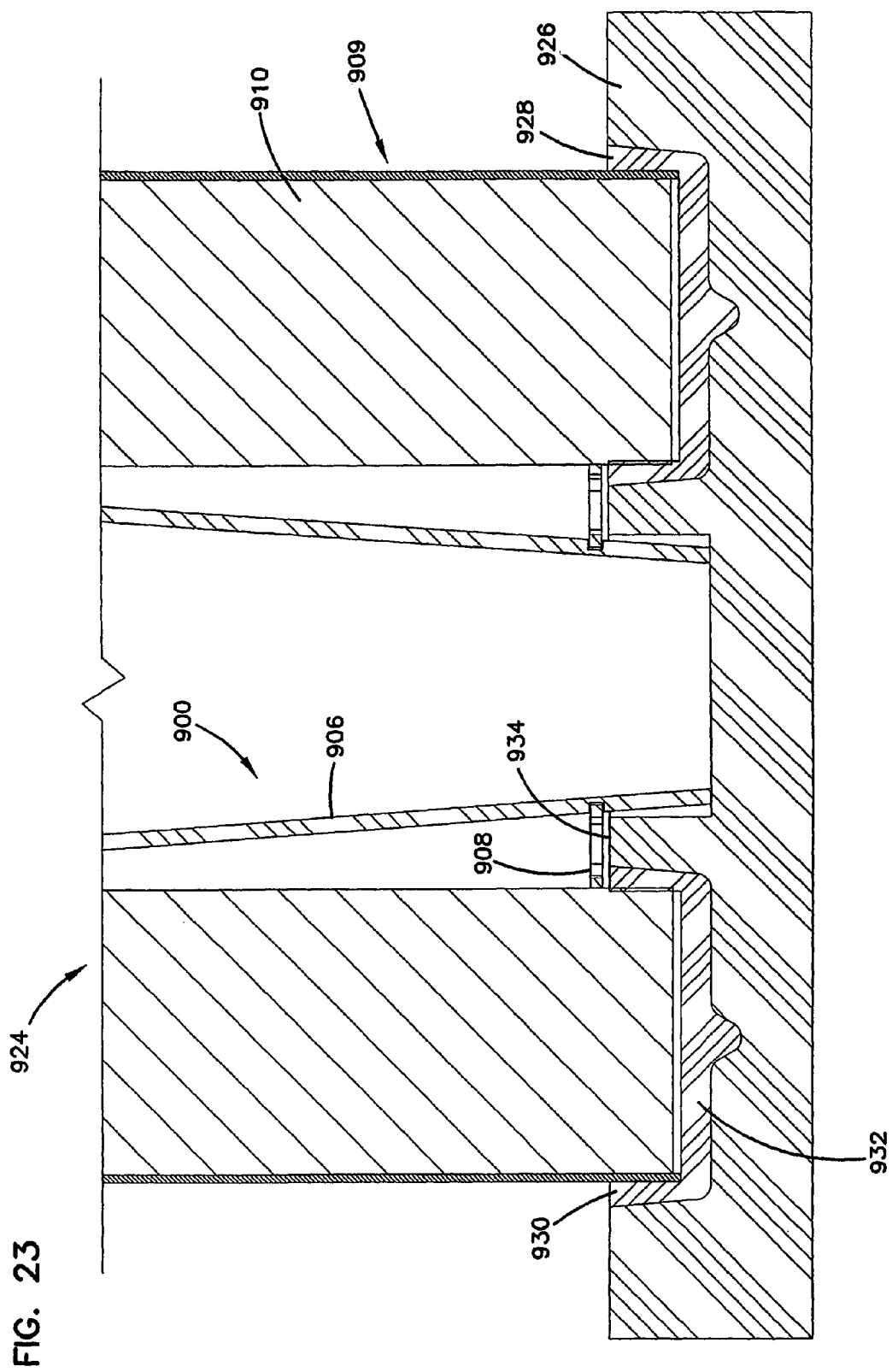
FIG. 23 is a schematic, cross-sectional view of one embodiment of a molding technique for constructing filter elements according to this disclosure.

Attention is now directed to FIGS. 22 and 23, which depict an example molding technique that is usable to manufacture filter elements described herein. In some arrangements, the insert construction (such as preformed insert 446 and preformed insert 650) is assembled in advance, according to techniques described above. The preformed insert depicted in FIGS. 22 and 23 is shown generally at 900. The preformed insert 900 includes a frame construction 902 for holding coalescer media 904. The preformed insert 900 also includes a tube or tapered wall 906 and a ring construction 908.

The second stage media 909, such as media 910 is provided and formed in a ring or cylinder, around the preformed insert 900. The media 910 with the insert 900 is oriented over a mold 912. Note that the mold 912 includes a platform or mount 914. The frame construction 902 rests upon the mount 914. Molten material for forming the end cap, such as polyurethane foam, is poured into the mold 912 in the volume 916. The molten end cap material 915 is formed in the negative shape of the mold 912. The end cap material 915 rises as it cures and is allowed to penetrate the region 691 between, for example, the rim 690 and the outer rim 684 in the arrangement depicted in FIG. 17. This permits the end cap material 915 to secure the optional coalescer media 904 to the resulting end cap 918. The ends of the media 910 are also then secured to the resulting end cap 918 by being potted or molded into the end cap material 915. As can also be seen in FIG. 22, the backstop 920 of the frame construction 902 also becomes molded within the end cap 918. If desired, an outer liner 922 is placed around the outer perimeter of the media and is molded with the end cap material 915.

After the end cap 918 is formed, the assembly 924 is inverted and placed into a mold 926. End cap material 928, such as polyurethane foam, rests in the volume 930. As the end cap material 928 cures, the ends of the media 910 are molded and fixed in place in the end cap material 928 to end up being potted within a resulting end cap 932. Note that the ring construction 908 is oriented in a position spaced from the mold 926 and with a mold plug 934 adjacent thereto, such that the ring construction 908 does not become blocked with end cap material 928.

VI. General Principles Related to Size, Efficiency, and Performance; Materials

An arrangement utilizing principles described herein can be configured in a relatively small package, with efficient operation. When formed media is used as the tubular stage, and the optional first stage is present, the first stage coalescer filter 416/844 is configured to have an upstream surface area of no more than 30%, usually no more than 25% of the upstream surface area of the tubular filter media 418/846.

Usable Materials—Generally

When radial seals are used, the sealing portions 480, 864, and preferably, the entire end caps 444, 856 preferably comprise foamed polyurethane. One example foamed polyurethane is described above. Another usable foamed polyurethane is as follows: BASF 36361R resin/WUC 3259T isocyanate, with processing conditions of component temperatures of 75-95° F. for the resin and for the isocyanate. The mold temperature should be 120-140° F. The demold time should be 6 minutes. The compression deflection at 70° F., average 10+4/−3 psi; after heat aging 7 days at 158° F., +/−20% change from original deflection; at −40° F. cold temperature, 100 psi maximum average. The compression set, after heat aging 22 hours at 212° F., 15% maximum. The hardness should be no greater than 26 Shore A. The tensile strength should be 92 psi target. The elongation should be 120% minimum average. The tear strength should 10 lb/in minimum average. The as molded density should be less than 30 lbs/ft$^3$, for example, 23-28 lbs/ft$^3$, and can be in the range of 10-24 lbs/ft$^3$.

The housing 402 preferably comprises plastic, such as carbon filled nylon. The preformed inserts 650/446 are preferably injection molded from a synthetic resinous plastic material, such as DELRIN®, available from DuPont.

The media for the optional coalescer filter 456/884 can be polyester depth media, as characterized above for media 224. It can also be a formed media as described hereinafter.

Hereinabove, it was stated that the formed media can be utilized as the media for the filter stage shown in the figures as a tubular filter stage. In general, the term "formed media" as used herein, excludes pleated media. Formed media is meant to refer to formed and cast filtration media made by techniques wherein the filter media is manufactured into desired shapes and geometries by means of molding and/or casting of any one or more of the following: synthetic, natural organic or inorganic staple or multi-filament fibers; polymeric particles; and organic and/or inorganic powders; processed minerals. Formed media are generally materials suitably formed into three dimensional engineered shapes possessing a network of interconnected voids/chambers, which allow passage of fluids (gases and/or liquids) through the formed network, the network being able to capture particles at a desired level of efficiency.

A variety of methods can be used to manufacture formed media. Examples include the following:

1. Vacuum forming from fibrous and/or other particles from a slurry made from organic and/or inorganic fibers. Examples of this are available under trademark FORMIX from Donaldson Company, Inc., the assignee of the present disclosure. An example of Formix technology is described in commonly assigned provisional patent application Ser. No. 60/460,375 filed Apr. 4, 2003, incorporated herein by reference.
2. Air-laying particles or fibrous (organic or inorganic) materials or powdered minerals or mixtures thereof into preformed shapes, and then apply heat and pressure to consolidate into a self-supported integral structure.
3. A sintering of polymeric particles, in powder or fibrous form, and blends of polymeric organic and/or inorganic materials into desired 3-dimensional shapes.
4. Stamping or molding polymeric fibers or particulate mixtures and/or blends of polymeric organic and inorganic fibers, particles with minerals powders and/or fibers, with or without adhesives, through heat and pressure into preformed 3-D shapes.
5. Forming filter elements via techniques similar to paper mache.

In addition to being available under techniques obtainable from Donaldson under the FORMIX trademark, formed media can be obtained from such sources as American Filtrona Corporation of Richmond, Va., and Porex Technologies of Fairburn, Ga. Example useable processes for making formed media is described in Porex U.S. Pat. No. 6,551,608, incorporated herein by reference. The 6,551,608 patent describes making the media to have antimicrobial properties. For the types of media arrangements characterized herein, the media would not need antimicrobial properties. The various processes described above would be applied to achieve the desired restriction and efficiency related, in at least in part, to the desired life of the filter arrangement and efficiency of filtration desired.

A general characteristic of formed medias in many instances is that they are self-supporting. By "self-supporting" in this context, it is meant a media sufficiently rigid to resist collapse under ordinary handling pressures. That is, they are preferably not soft compressible foam materials such as open cell foam rubbers.

Formed medias can be used with or without support liners. Certain preferred formed medias can be applied, in some instances, with no support liner necessary.

Formed medias can be provided in a gradient form, if desired. For example, they can be provided with a gradient to provide for increasing efficiency, through the depth of the media, to provide for preferred filter characteristics. In some instances, the formed media can be used and configured to facilitate coalescing, by operating as a second stage coalescer in addition to a filter element. The second stage coalescing can be used, for example, to facilitate removal of liquid that becomes re-entrained after passing through the coalescer filter; or to coalesce liquid that has not been coalesced at the first stage coalescing filter.

The formed media can be produced with irregular upstream and downstream surfaces. Alternatively, it can be formed with relatively smooth surfaces, or with surfaces configured to have preferred shapes. An example of a configured upstream surface is shown and discussed below in connection with FIG. 24.

Formed Media Shapes—Generally

Figure 24:
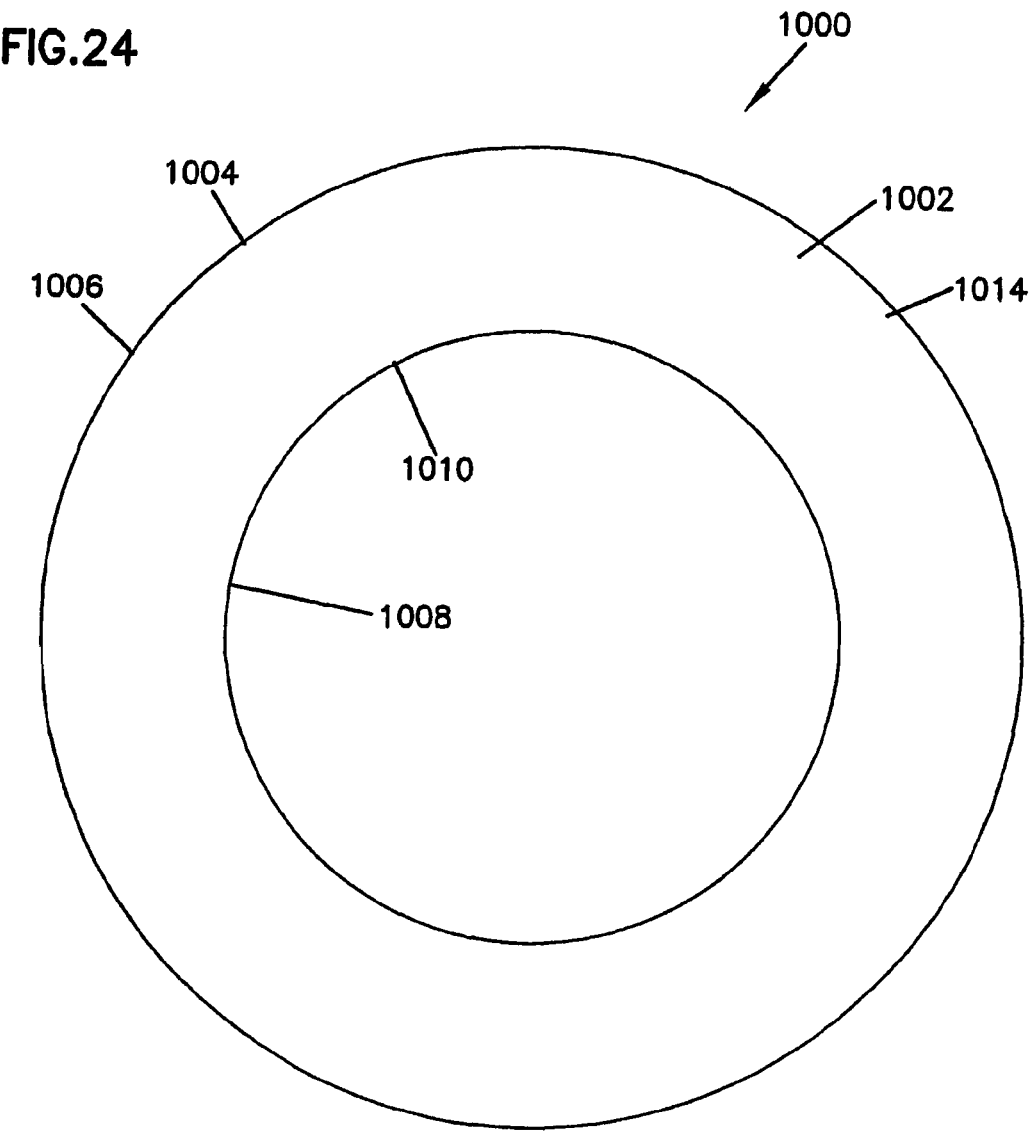
FIG. 24 is a schematic, end view of an embodiment of formed media useable filter elements shown in the proceeding figures.

FIG. 24 illustrates a schematic of an end view of media that is useable for the second stage filter, illustrated above at 66, 278, 328, 418, and 846. In FIG. 24, it is illustrated as second stage media 1000. In the embodiment shown in FIG. 24, the second stage media 1000 includes formed media 1002. The formed media 1002 can be shaped into a variety of configurations for the desired result, such as conical, cylindrical, panel, etc. For use in certain of the preferred arrangements illustrated in FIGS. 1-23, the formed media 1002 is a cylindrical construction 1004 defining an outer surface 1006 and an open filter interior 1008. The open filter interior 1008 is circumscribed by an inner filter surface 1010. In the embodiment shown in FIG. 24, the inner filter surface 1010 is cylindrical.

When formed media 1002 is used with the arrangements illustrated in FIGS. 1-23, the formed media 1002 can be secured between opposite end caps such as end caps 444, 445 (FIG. 15) and circumscribe the first stage coalescer filter 416.

Advantageous Formed Media

Herein, some advantageous formed media materials are described, for use in air/oil separation systems. In general these preferred media have the following characteristics:

1. They are formed using a vacuum draw approach, in which a fiber mix is suspended in a liquid medium such as water, is drawn through a mandrel, to load the fiber mixture on to the mandrel as a fiber matrix. The matrix is dried and fixed in a desirable shape with appropriate characteristics, for use as a coalescing/drain stage media, in a filter arrangement for a crankcase ventilation filter.

2. The fiber matrix comprises at least 50%, typically 50-80% by weight—of total fiber weight, bi-component fiber material, typically with the general description provided herein.

3. The fiber matrix comprises at least 20%, typically 20-50% by weight, based on total weight of fiber material within the matrix, of secondary fiber material having a largest average fiber cross-sectional dimension (average fiber diameter when round) of at least 0.7 micron, typically not more than 10 microns, usually not more than 7 microns; typically 0.7-5 micron.

4. It comprises no more than 7% by weight, based on total weight of fiber material in the fiber matrix, of added binder resin, if any, typically no more than 3% by weight of added binder resin and usually 0% by weight of added binder resin.

5. It has a calculated pore size (X-Y direction) of at least 10 micron, usually at least 12 micron. The pore size is typically no greater than 60 micron, for example within the range of 12-50 micron, typically 15-45 micron often 25-45 micron.

6. It has a thickness, and when used as a media stage in a crankcase ventilation filter, of at least 0.06 inch (1.5 mm), typically at least 0.2 inch (5 mm), for example 0.2-0.8 inch (5-20 mm). The thickness could be greater in some instances, for example up to 2 inches (51 mm) but typically such larger thicknesses will not be used.

Media in accord with the general definitions provided herein, including the mix of bi-component fiber and other fiber, can be used as any media stage in a crankcase ventilation filter as generally described in connection with the figures. Typically and preferably it will be utilized to form a tubular media stage. When used in this manner, it will typically be formed on a tube or mandrel. The mandrel can be used as a liner, or in some instances the mandrel can be removed before the media stage is positioned in a filter construction.

A. The Preferred Calculated Pore Size.

Many types of crankcase ventilation filters of the type of general concern to the present disclosure, have a media stage having a height within the range of 101-304 mm (4-12 inches). This media performs two important functions:

1. It provides for some coalescing and drainage of oil particles carried in the crankcase ventilation gases being filtered; and, 2. It provides for selected filtration of other particulates in the gas stream.

In general, if the pore size is too low:

(a) drainage of coalesced oil particles by gravity, downwardly through (and from) the media can be difficult or slowed, which leads to an increase of re-entrainment of oil into the gas stream; and (b) unacceptable levels of restriction are provided to the crankcase gas flow through the media.

In general, if the porosity is too high:

(a) oil particles are less likely to collect and coalesce; and (b) a large thickness will be necessary to achieve an acceptable overall level of efficiency for the media pack.

It has been found that for crankcase ventilation filters, media with a calculated pore size within the range of 12-50 microns is generally useful. Typically the pore size is within the range of 15-45 micron, often 25-45 micron. Often the portion of the media which first receives gas flow with entrained liquid, (i.e., the portion adjacent the inner surface of a tubular media construction with an "in-to-out" filtering flow), through a depth of at least 0.06 inch (1.5 mm) and typically at least 0.25 inch (6.4 mm) as an average pore size of at least 25 microns. This is because in this region, a larger first percentage of the coalescing/drainage will occur. If multi-layer systems are used which have outer layers, in which less coalescing/drainage occurs, a smaller pore size for more efficient filtering of solid particles, in outer or more downstream media regions may be desirable in some instances.

The term X-Y pore size and variants thereof, when used herein, is meant to refer to the theoretical distance between fibers and a filtration media. X-Y refers to the surface direction; the Z direction being media thickness. The calculation assumes that all the fibers in the media are aligned parallel to the surface of the media, equally spaced, and ordered as a square when viewed in cross-section perpendicular to the length of the fibers. The X-Y pore size is a distance between the fiber surface on the opposite corners of the square. If the media is composed of fibers of various diameters, the $d^2$ mean of the fibers is used as the diameter. The $d^2$ mean is the square root of the average of the diameters squared.

It has been found that is useful to have calculated pore size on the higher end of the preferred range, typically 30-50 micron, when the media stage at issue has a total vertical height (in the crankcase ventilation filter) of less than 7 inches (178 mm). Pore sizes at the smaller end, about 15-30 micron, are sometimes useful when the filter cartridge has a height on the larger end, typically 7-12 inches (178-305 mm). A reason for this is the taller filter stages provide for a higher liquid head, during coalescing, which can force coalesced liquid flow, under gravity, downwardly through smaller pores, during drainage. The smaller pores, of course, allow for a higher efficiency with lower thickness.

Of course in typical operation in which the single vacuum laid matrix formulation is constructed for use in a variety of filter sizes, typical average pore size of about 25-45 microns will be advantageous.

B. Solidity and Permeability.

Solidity is the volume fraction of media occupied by the fibers. It is the ratio of the fiber volume per unit mass divided by the media volume per unit mass.

Typical vacuum formed media is preferred for use of the disclosure, especially as the tubular media stage in arrangements such as those described above in connection with the figures, have a percent solidity at 0.125 psi (8.6 millibar) of under 10% and typically under 8%, for example 4-7%.

Typically, vacuumed formed media matrixes according to the present disclosure, are typical for use in crankcase ventilation filters, have a Frazier permeability of at least 6 feet/min (3 cm/sec), typically at least 10 feet/rain (5 cm/sec) and often within the range of 10 to 40 feet/min (5-20 cm/sec). The Frazier permeability typically does not exceed 50 feet/min (25 cm/sec).

C. Thickness and Compressibility.

Typical vacuum formed media stages, useable in crankcase ventilation filters, will have a thickness of at least 0.06 inch (1.5 mm), typically at least 0.2 inch (5 mm), for example 0.2 inch (5 mm)-0.8 inch (20 mm). The thickness can be greater in some instances, for example up to 2 inches (51 mm), but typically such larger thicknesses will not be used.

Thickness is of course a part of the factor of the pressure conditions under which the thickness is measured. Typically the measurement would be at 0.125 psi (8.6 millibars).

It is preferable the media be chosen be one which shows relatively low percent compressibility. The percent compressibility is generally the % reduction in thickness which occurs, between subjecting the media to 0.125 psi (8.6 millibars) and 0.563 psi (38.8 millibars). Compressibility is a comparison that two thickness measurements made using a dial comparator, with compressibility being the relative loss of thickness from a 2 ounce (56.7 gram) to a 9 ounce (255.2 gram) total weight (0.125 psi-0.563 psi or 8.6 millibars-38.8 millibars). Typical preferred media according to the present disclosure, will exhibit compressibility (percent change or reduction in thickness) of no greater than 20% and typically no greater than 16% under such conditions.

The thickness of the media is typically measured using a dial comparator such as an Aimes #3W (BCA Melrose, Mass.) equipped with a round pressure foot, of 1 square inch. For a typical thickness measurement a total of 2 ounces (56.7 gram) of weight applied across the pressure fluid. Of course the higher pressure condition is obtained with a higher weight.

D. Typical DOP Efficiency at 10.5 Ft/Minute (5.33 am/Sec.) for 0.3 micron particles.

In general, DOP efficiency is a fractional efficiency of a 0.3 micron DOP particles (dioctyl phthalate) challenging the media at 10 ft/min. A TSI model 3160 Bench (TSI, Incorporated, St. Paul, Minn.) can be used to evaluate this property. Mono-dispersed particles of DOP are sized and neutralized prior to challenging the media.

The DOP efficiency for the media stage is generally a matter of choice, for the operation desired. Typical crankcase ventilation filters will utilize a media stage vacuum formed in accord with the techniques and materials herein, which is provided to have a DOP efficiency of at least 70%, typically at least 80% and often at least 85%.

E. The Media Composition.

1. The Bi-Component Fiber Constituent.

As indicated above, it is preferred that the fiber composition of the media include 50 to 80%, by weight, of bi-component fiber material. A major advantage of using bi-component fibers in the media, is effective utilization of fiber size while maintaining a relatively low solidity. With the bi-component fibers, this can be achieved while still accomplishing a sufficiently high strength media for handling, installation and use in crankcase ventilation filters.

The bi-component fibers generally comprise two polymeric components formed together, as the fiber. Various combinations of polymers for the bi-component fiber may be useful, but it is important that the first polymer component melt at a temperature lower than the melting temperature of the second polymer component and typically below 205° C. Further, the bi-component fibers are integrally mixed and evenly dispersed with the other fibers, informing the vacuum formed media. Melting of the first polymer component of the bi-component fiber is necessary to allow the bi-component fibers to form a tacky skeletal structure, which upon cooling, captures and binds many of the other fibers, as well as other bi-component fibers. Herein, the process of subjecting a bi-component fiber matrix to heat, to sufficiently soften the binder component of the bi-component fibers provide tack, is referenced as "activation" or by variants thereof or as a step of "fixing" the matrix, or by variants thereof. Typically a fiber matrix having bi-component fiber therein, according to the present disclosure, is activated in a step which occurs after vacuum formation and drying, to fix the matrix.

Although alternatives are possible, typically the bi-component fibers will be formed in a sheath core form, with a sheath comprising the lower melting point polymer and the core forming the higher melting point.

In the sheath-core structure, the low melting point (e.g., about 80° to 205° C.) thermoplastic is typically extruded around a fiber of the higher melting point material (e.g., about 120 to 260° C.). In use, the bi-component fibers typically have an average fiber diameter of about 5 to 50 micrometer often about 10 to 20 micrometer; and, typically are provided in a fiber form generally have an average lengths of at least 1 mm, and not greater than 20 mm, typically 1-10 mm and often 5-10 mm.

Such fibers can be made from a variety of thermoplastic materials including polyolefins (such as polyethylenes, polypropylenes), polyesters (such as polyethylene terephthalate, polybutylene terephthalate, PCT), nylons including nylon 6, nylon 6,6, nylon 6,12, etc. Any thermoplastic that can have an appropriate melting point can be used in the low melting component of the bi-component fiber while higher melting polymers can be used in the higher melting "core" portion of the fiber. The cross-sectional structure of such fibers can be a "side-by-side" or "sheath-core" structure or other structures that provide the same thermal bonding function. One could also use lobed fibers where the tips have lower melting point polymer. The value of the bi-component fiber is that the relatively low molecular weight resin can melt under sheet, media, or filter forming conditions to act to bind the bi-component fiber, and other fibers present in the sheet, media, or filter making material into a mechanically stable sheet, media, or filter.

Typically, the polymers of the bi-component (core/shell or sheath and side-by-side) fibers are made up of different thermoplastic materials, such as for example, polyolefin/polyester (sheath/core) bi-component fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like. One useful bi-component fiber is a bi-component fiber known as 271P available from DuPont. Others fibers include FIT 201, Kuraray N720 and the Nichimen 4080 and similar materials. All of these demonstrate the characteristics of cross-linking the sheath poly upon completion of first melt. This is important for liquid applications where the application temperature is typically above the sheath melt temperature. If the sheath does not fully crystallize then the sheath polymer will remelt in application and coat or damage downstream equipment and components.

A typical preferred bi-component fiber has a largest average cross-sectional dimension (diameter if circular) of at least 8 microns typically at least 10 microns, for example 10-20 microns. The average lengths of the fibers are typically at least 1 mm, usually within the range of 1-20 mm, typically at least 5 mm. Most often in applications according to the present description, the bi-component fibers will not have an average fiber length of greater than 10 mm.

An example of a useable bi-component fiber for forming vacuum formed media for use in CCV media is Dupont polyester bi-component 271P, typically cut to a length of at least 1 mm, usually 1-20 mm, typically 5-10 mm, for example about 6 mm.

2. The Secondary Fiber Materials.

The bi-component fibers provide a matrix for the crankcase ventilation filter media. The additional fibers or secondary fibers, sufficiently fill the matrix to provide the desirable properties for coalescing and efficiency.

The secondary fibers can be polymeric fibers, glass fibers, metal fibers, ceramic fibers or a mixture of any of these. Typically glass fibers are used.

Generally, the secondary fibers will be chosen to have largest average cross-sectional dimensions (diameters if circular) of at least 0.6 micron, typically no greater than 10 micron, usually no greater than 7 microns, typically 0.7-5 micron.

Glass fibers useable in filter media of the present invention include glass types known by the designations: A, C, D, E, Zero Boron E, ECR, AR, R, S, S-2, N, and the like, and generally, any glass that can be made into fibers either by drawing processes used for making reinforcement fibers or spinning processes used for making thermal insulation fibers.

Vacuum formed media of the invention can contain secondary fibers made from a number of both hydrophilic, hydrophobic, oleophilic, and oleophobic fibers. These fibers cooperate with the glass fiber and the bi-component fiber to form a mechanically stable, but strong, permeable filtration media that can withstand the mechanical stress of the passage of fluid materials and can maintain the loading of particulate during use. Secondary fibers are typically monocomponent fibers. They can be made from a variety of materials including naturally occurring cotton, linen, wool, various cellulosic and proteinaceous natural fibers, synthetic fibers including rayon, acrylic, aramide, nylon, polyolefin, polyester fibers. One type of secondary fiber is a binder fiber that cooperates with other components to bind the materials into a sheet. Another type of secondary fiber is a structural fiber that cooperates with other components to increase the tensile and burst strength the materials in dry and wet conditions. Additionally, the binder fiber can include fibers made from such polymers as polyvinyl chloride, polyvinyl alcohol. Secondary fibers can also include inorganic fibers such as carbon/graphite fiber, metal fiber, ceramic fiber and combinations thereof.

The secondary thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types.

Mixtures of the fibers can be used, to obtain certain desired efficiencies and other parameters.

3. Formation of the Vacuum Formed Media.

The vacuum formed media stage is typically prepared by providing (dispersing) in a liquid medium, typically an aqueous medium, the fiber mix. The fiber mix can be provided with additives to facilitate dispersion in the liquid medium. The liquid medium is then drawn through a mandrel. This process will load the mandrel with the fiber matrix. Typically a mandrel having a circular cross-section off in a cylindrical shape, will be used.

After loading, air can be drawn through the mandrel to facilitate drying. Additional drying can be done with air drying steps and application to heat.

The media is then activated, in an appropriate heat application step, to provide a softening of the binder portion of the binder fibers, to fix the fiber matrix.

Preferably the media is formed without additional binder or binder resin being added. If a binder or binder resin is added, it is typically used at a level of not more than 7% by weight based on total fibers, typically no more than 3% by weight based on total fibers. Again preferably no added binder is used. The reason, is that added binder can blind off pores, inhibiting performance.

The formed media can be removed from the mandrel and used in a filter arrangement. It can be used with a positioned liner toward the inside or upstream side, the downstream or outside, or both. Typically the matrix will be left on the mandrel, and the mandrel would be used as an inner liner for the tubular fiber matrix. Perforated tubes or expanded metal liners can be used for the mandrel.

Variations in the techniques described in PCT Application US 2004/10284, filed Apr. 4, 2003 and U.S. Provisional Application 60/577,067, filed Jun. 4, 2004, each of which is incorporated herein by reference, can be used. Modifications from the approaches described therein, would, for example, relate to the avoidance of the addition of binder resin, to advantage.

Herein, media formed from a process that involves dispersing fibers in a liquid medium and drawing the liquid medium through a support form or mandrel, will be referred to as "vacuumed formed" fiber matrices, or by similar terms.

4. Surface Treatments of the Fibers.

Modification of the surface characters of the fibers, to increase the contact angle, can enhance drainage capability of filtration media and thus the formed elements of the filter (with respect to pressure drop and mass efficiency). A method of modifying the surface of the fibers is to apply a surface treatment such as a flourochemical or silicone containing material, typically up to 5% by weight of the media.

The surface treatment agent can be applied during manufacture of the fibers, during manufacture of the media, after manufacture of the media or after provision of the media pack. Numerous treatment materials are available such as flour chemicals or silicone containing chemicals that increase contact angle. An example is the DuPont Zonyl™ flourochemicals, such as #8195.

5. Example Materials.

An example media was formed using: 61.3% by weight of bi-component 271P (12 micron diameter, 6 mm length); 12.5% by weight EVANITE micro glass 610 (average diameter 2.87 micron); and 26.2% by weight chopped glass LAUSCHA EC6 (average diameter 6.0 micron, average length 6 mm).

To create the fiber dispersion, the fiber components are weighed to the respective ratios under dispersed in water to 0.1-0.25% fibers to water by weight. The fibers are then vacuum formed onto a suitable perforated cylinder to reach desired thickness, and hence the desired permeability. Thickness is controlled by the length of time perforated cylinder is immersed in the water. The part is removed from the water and dried. The fibers are then allowed to cure (i.e., allow enough time at 350° F., for the sheath low melt polyester to flow and melt into adjacent fibers).

The media was measured to have a Frazier permeability of 19.5%, a thickness of 0.425 inch (10.8 mm) and a weight of 844 grams, having a basis weight of about 58 oz/sq·yd. (1641 g/0.836 sq. meter).

6. Some General Observations.

In general, the present disclosure relates to utilization of formed media preferably of the type characterized, within a coalescer/drain stage of a crankcase ventilation system; i.e., as a media stage in a crankcase ventilation filter. The crankcase ventilation filter can have one or more than one media stage therein.

In some of the arrangements described thus far with respect to the drawings, the arrangements shown including an optional first stage and a tubular second stage. The formed media can be used in either or both.

It is noted that because the first stage is characterized as optional, it will be understood that some crankcase ventilation filters can be made which include only a media stage comprising the formed media as characterized herein. An example is shown in FIG. 25.

Figure 25:
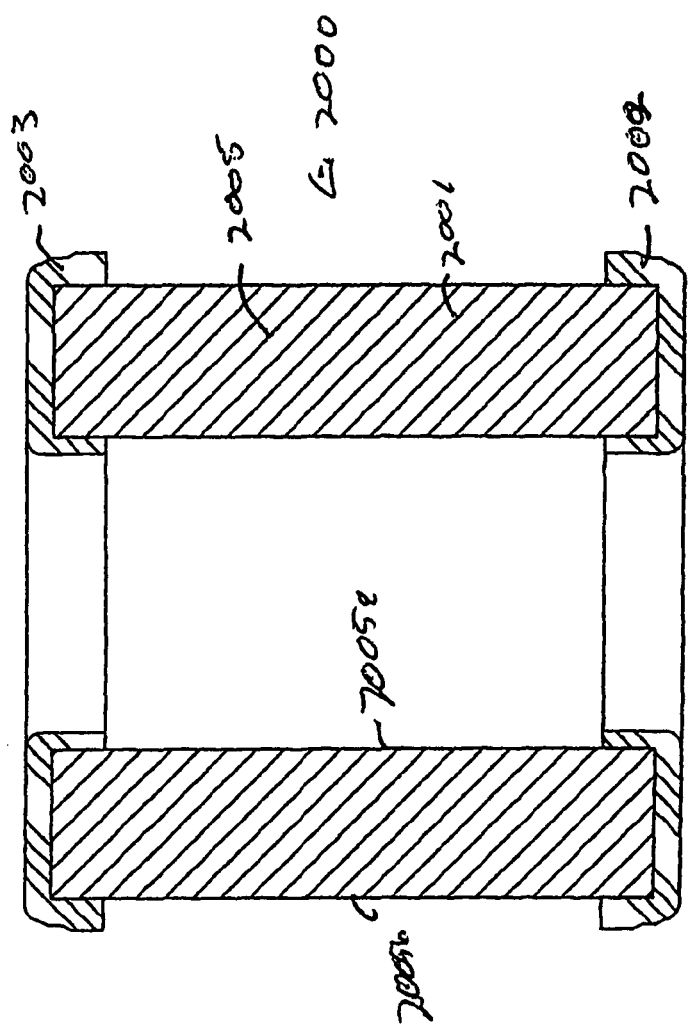
FIG. 25 is a schematic view of a filter cartridge including media as described.

The reference numeral 2000, FIG. 25, generally indicates a crankcase ventilation cartridge including media 2001 as characterized herein. The media 2001 is positioned in extension between opposite end caps 2002 and 2003. The cartridge 2000 would be provided with an appropriate seal arrangement for engagement with the housing, as needed. The particular seal arrangement for cartridge 2000 depicted, is an outside radial seal on each of end caps 2002, 2003 although alternatives are possible including (for example): inside radial seals at each end cap; axial radial seal arrangements; etc.

The media stage 2001 is shown as a single stage of formed media 2005. The formed media stage 2005 is shown in a tubular form. It is noted that downstream additional, media could be applied.

Cartridge 2000 can be configured for either in-to-out flow or out-to-in flow. When configured for in-to-out flow, as will be typical for an arrangement as described in the other figures, the upstream edge of the media 2005 would be at 2005a and the downstream edge at 2005b.

What is claimed is:

1. A filter for liquid entrained in a gas; the filter including:
(a) a vacuum formed media stage comprising:
(i) at least 50% by weight, based on total weight of fiber material in the vacuum formed media stage, bi-component fiber material having an average fiber largest cross-sectional dimension of at least 10 microns and an average length of 120 mm, inclusive; and,
(ii) at least 20%, by weight, based on total weight of fiber material in the vacuum formed media stage, secondary fiber material having an average fiber largest cross-sectional dimension of no more than 10 micron; and
(b) the vacuum formed media stage having:
(i) a calculated pore size, X-Y direction, of 12-50 microns, inclusive; and,
(ii) an added binder resin content, if any, of no greater than 7% by total weight of fiber material.

2. A filter according to claim 1 wherein:
(a) the vacuum formed media stage has a thickness of at least 1.5 mm.

3. A filter according to claim 1 wherein:
a) the vacuum formed media stage is positioned secured to a first end cap.

4. A filter according to claim 3 wherein:
(a) the vacuum formed media stage is a tubular construction positioned in extension between the first end cap and a second end cap.

5. A filter according to claim 1 wherein:
(a) the vacuum formed media stage has a fiber treatment therein selected from the group consisting essentially of silicone and fluorochemical fiber treatment materials.

6. A filter according to claim 1 wherein:
(a) the secondary fiber material comprises glass fibers; and,
(b) the fiber matrix includes no more than 3%, by weight, added binder resin, if any.

7. A filtration assembly for liquid entrained in a gas comprising:
(a) a housing including a gas flow inlet arrangement, a gas flow outlet arrangement and a liquid drain outlet arrangement; and,
(b) a serviceable filter for liquid entrained in a gas operably positioned within the housing and comprising:
(i) a vacuum formed media stage comprising:
(A) at least 50% by weight, based on total weight of fiber material in the vacuum formed media stage, bi-component fiber material having an average fiber largest cross-sectional dimension of at least 10 microns and an average length of 1-20 mm, inclusive; and,
(B) at least 20%, by weight, based on total weight of fiber material in the vacuum formed media stage, secondary fiber material having an average fiber largest cross-sectional dimension of no more than 10 micron; and
(ii) the vacuum formed media stage having:
(A) a calculated pore size, X-Y direction, of 12-50 microns, inclusive; and,
(B) an added binder resin content, if any, of no greater than 7% by total weight of fiber material.

8. A filtration assembly according to claim 7 wherein:
(a) the vacuum formed media stage is tubular, is positioned for in-to-out filtering flow and has a height of 101 to 305 mm.

9. A filtration assembly according to claim 8 wherein:
(a) the liquid drain outlet is configured for liquid flow through a portion of the gas flow inlet arrangement.

10. A filtration assembly according to claim 7 wherein:
(a) the housing is configured as a crankcase ventilation filter housing.

* * * * *